United States Patent [19]

Ingenito et al.

[11] Patent Number: 4,932,879

[45] Date of Patent: * Jun. 12, 1990

[54] COMPACT INTERACTIVE TRAINING MANIKIN SYSTEM

[75] Inventors: Michael Ingenito, 7 Old Knollwood Rd., White Plains, N.Y. 10607; Eve J. Ingenito; Michael P. Ingenito, both of White Plains, N.Y.

[73] Assignee: Michael Ingenito, White Plains, N.Y.

[ * ] Notice: The portion of the term of this patent subsequent to May 9, 2006 has been disclaimed.

[21] Appl. No.: 306,648

[22] Filed: Mar. 13, 1989

Related U.S. Application Data

[63] Continuation of Ser. No. 28,593, Mar. 20, 1987, Pat. No. 4,828,501.

[51] Int. Cl.$^5$ .............................................. G09B 23/28
[52] U.S. Cl. .................... 434/262; 434/265; 434/396; 273/1 GE; 128/28
[58] Field of Search ............... 434/262, 257, 265, 267, 434/365, 369, 396; 273/1 E, 1 GE; 128/28

[56] References Cited

U.S. PATENT DOCUMENTS

| | | | |
|---|---|---|---|
| 4,360,345 | 11/1982 | Hoa | 434/262 |
| 4,588,383 | 5/1986 | Parker et al. | 434/265 |
| 4,797,104 | 1/1989 | Laerdal et al. | 434/265 |

*Primary Examiner*—Richard J. Apley
*Assistant Examiner*—Joe H. Cheng

*Attorney, Agent, or Firm*—Laff, Whitesel, Conte and Saret

[57] ABSTRACT

A manikin and control system is provided for use by a student practicing a procedure usually applied to the human body, such as cardiopulmonary resuscitation. The system includes a manikin that has an artificial lung into which the student can blow to expand the lung, and a resilient chest which the student can compress. Sensors are provided in the manikin to accurately detect the instantaneous amount of lung expansion and chest compression. An A/D converter converts the sensor signals to digital signals and inputs them to a compact controller based on an inexpensive microcomputer chip which also stores the control program in ROM. Pushbuttons on the controller's front panel enable the student to select any one of a variety of teaching routines prestored in the microcomputer's ROM. The microcomputer then uses lamps on the panel and a speech synthesizer having prerecorded human speech stored in external ROM chips to issue instructions and advice to the student. These are contingent on his performance of the selected routine as detected by the sensors. However, a prestored interrupt routine always enables the student to switch from the current routine to any other, or to get an immediate repeat of the last message from the system. Transducers are provided for simulating a carotid pulse and shallow breathing in the manikin, and these can be activated by an instructor via remote control using a wireless transmitter and receiver pair.

1 Claim, 26 Drawing Sheets

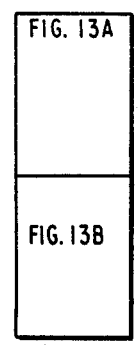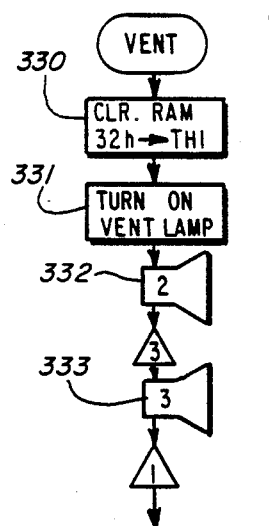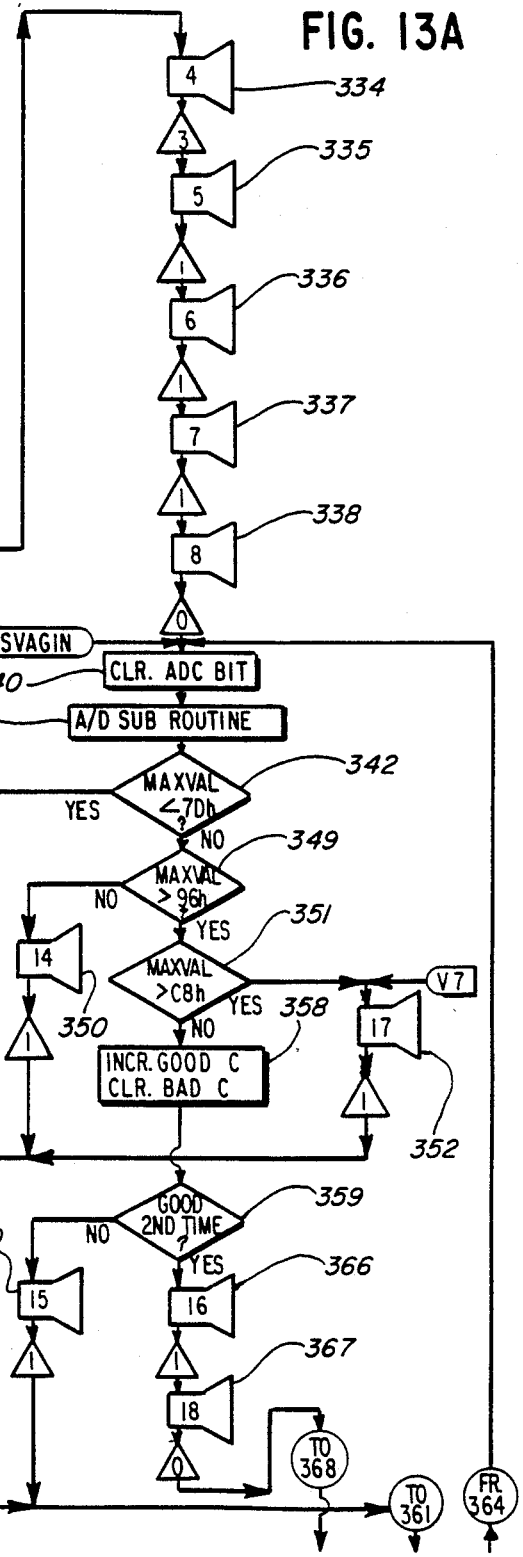
FIG. 13
FIG. 13A
VENTILATION ROUTINE

SINGLE CHEST COMPRESSION SEQUENCE

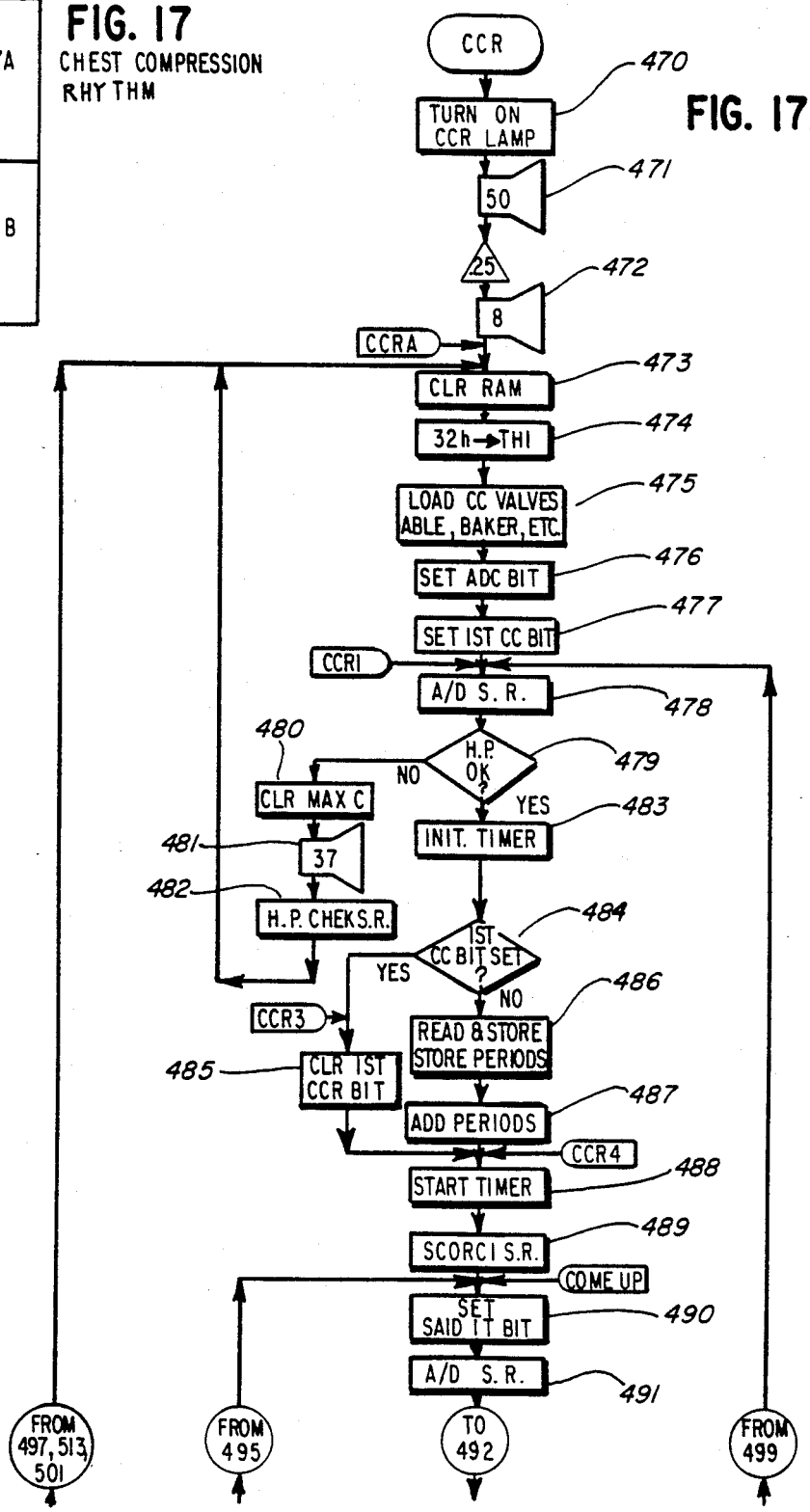

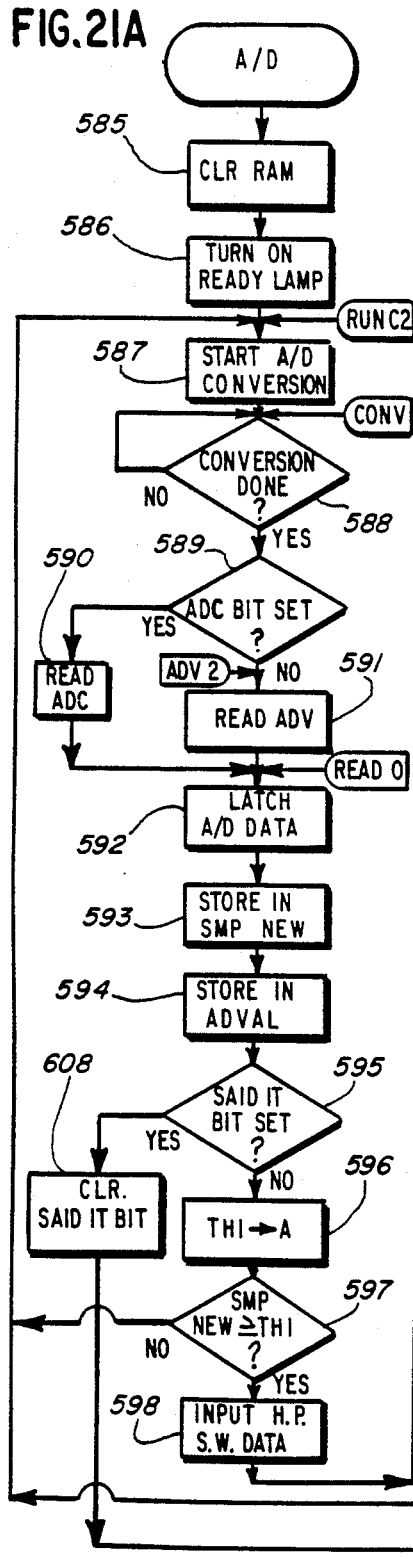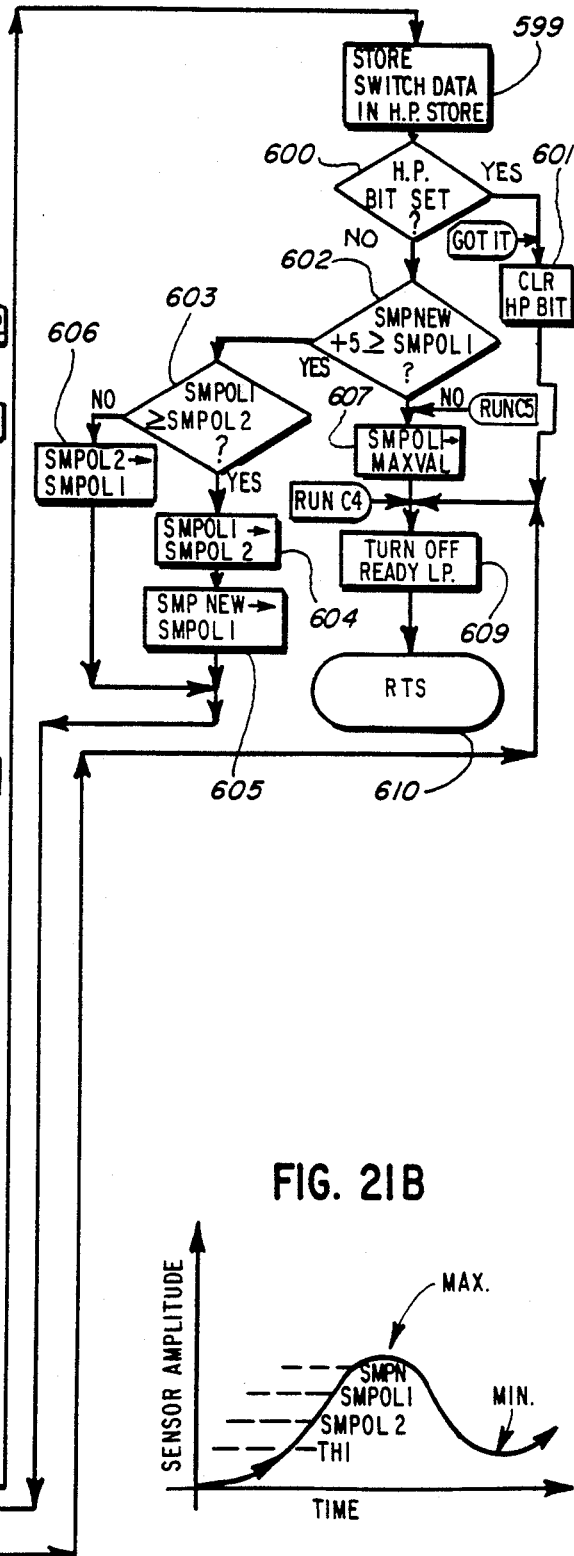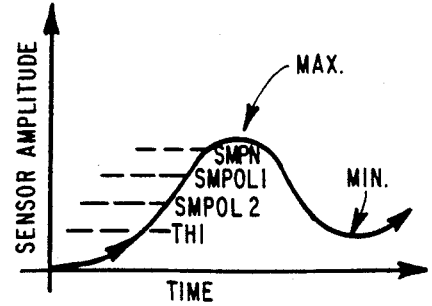

COMPACT INTERACTIVE TRAINING MANIKIN SYSTEM

This application is a continuation of prior application Ser. No. 028,593 filed 3-20-87 now U.S. Pat. No. 4,828,501.

This invention relates to training manikins, and more particularly to a training manikin system having a very compact controller with a prerecorded human voice interface for coaching the user.

BACKGROUND

MANIKINS USED WITH LIVE INSTRUCTORS

Models of the human body called manikins are used in teaching many skills. In the medical and safety fields, manikins are a common and important aid in teaching Cardiopulmonary Resuscitation (hereafter "CPR"), a combination of artificial respiration and heart massage.

Traditionally a class of students is first taught the CPR procedure by a live instructor, after which the instructor divides the class into teams to practice on a manikin. During practice the instructor goes from team to team, commenting, correcting and coaching. The students use the manikin to practice mouth-to-mouth breathing, chest compressions for restoring circulation, and first aid procedures for choking.

Prior art training manikins for CPR have generally been equipped with an electronic signal box the front panel of which has lamps that give some feedback to the student. For example, in a typical arrangement the panel has three different colored lamps to signal the following:

Green lamp: Lights up when 800 cc of air enters the manikin's lungs. Is off when less than this amount is in the lungs.

Yellow lamp: Lights up when the chest is compressed 1½ inches. Is off when the chest is compressed less than this amount.

Red lamp: Lights up as a warning when an incorrect hand position is used during chest compressions.

Also, an electronic metronome has been provided which emits an audible "tick".

In addition to the above-mentioned lights, the higher cost manikins have been equipped with strip charts that record the student's performance as he practices. This enables an instructor to come by, read the chart, and discuss the results with the student. The instructor may also show the student how to read the chart himself.

Some CPR training manikins have been equipped with other internal and external devices that allow for some degree of measurement, recording, and visual indication of the student's efforts when he or she is practicing various procedures. But even the most sophisticated of these have many shortcomings and limitations. Also, most conventional training manikins, except for very expensive systems, are designed for use in training courses having a live instructor.

INSTRUCTORLESS SYSTEMS

Systems that do not require a live instructor have advantages, since there is a shortage of trained, highly motivated persons with the required time and temperament for the very repetitive, vocalized teaching required. Another benefit is standardization of instruction.

Until now, however, complete elimination of the instructor has required an elaborate, complex, and cumbersome array of electronic hardware. In one such system, the manikin is internally fitted with sensors and coupled via an electrical cable to a system consisting of a computer, keyboard and light pen, two television monitors, a video disc machine, and a computer controlled audio machine. All of this is cabled together and powered by the AC line.

Such systems are not easily portable, and are also very expensive (in the neighborhood of $25,000). Their maintenance entails additional cost and requires highly skilled personnel. A principal objective of the present invention is therefore to equal or at least approach the performance of such a system at a far more reasonable cost, with a far less complex, much more compact, rugged and portable product.

SUMMARY OF THE INVENTION

This invention provides an improved teaching manikin system having an interactive teaching system with voice coaching which is expected to sell for about $1,000. The electronic controller for this system, in addition to being inexpensive, is compact enough to fit in a space about the size of a textbook.

This system enables one-on-one training and interaction with the student via sensors in the manikin, input buttons on a touch panel, and immediate voice feedback. The sensing means in the manikin are proportional in nature rather than simple on/off limit switches.

The system monitors the student and gives him or her instant coaching feedback by means of a natural-sounding prerecorded voice. It also allows the student to select the particular phase of training he or she wishes to practice.

The invention also provides a means of simulating shallow breathing and a carotid pulse in the manikin at times preselected or secretly chosen by an instructor so that the student has a more realistic opportunity to learn to recognize these faint signs of revival and adjust his or her actions accordingly.

Thus, in keeping with one aspect of the invention, a simulation manikin system is provided for use by a student attempting to practice a procedure normally applied to the human body, such as cardiopulmonary resuscitation. The system includes a manikin that has an artificial lung into which the student can blow to expand the lung, and a resilient chest which the student can compress.

Sensors are provided in the manikin to accurately detect the instantaneous amount of lung expansion and chest compression. An A/D converter converts the analog sensor output signals to digital codes, and inputs them to a compact controller based on an inexpensive microcomputer chip governed by a control program stored in a ROM.

Pushbuttons on the controller's front panel enable the student to select any one of a variety of teaching routines prestored in the microcomputer's ROM. The microcomputer then uses lamps on the panel and a speech synthesizer having prerecorded human speech stored in ROM chips to issue instructions and advice to the student. These are contingent on his performance of the selected routine as detected by the sensors. However, a prestored interrupt routine always enables the student to switch from the current routine to any other or to get an immediate repeat of the last message from the system.

Transducers are provided for simulating a carotid pulse and shallow breathing in the manikin which can be activated by remote control using a wireless transmitter and receiver pair.

The invention is suitable for use in retrofitting "dumb" manikins which are already out in the field, as well for incorporation into new manikin-controller assemblies; a fact which should be taken into account in interpreting the appended claims.

BRIEF DESCRIPTION OF THE DRAWINGS

These and other features of this invention will be best understood by reference to the following detailed description of a preferred embodiment of the invention, taken in conjunction with the accompanying drawings, in which:

FIGS. 13, 13A and 13B are flow charts for an embodiment of the Ventilation Teaching Routine incorporated in the Control Program of FIG. 11;

FIGS. 17, 17A and 17B are flow charts for an embodiment of the Chest Compression Rhythm Teaching Routine incorporated in the Control Program of FIG. 11;

FIG. 21A is a flow chart for an embodiment of the A/D Conversion Subroutine incorporated in the Control Program of FIG. 11, and FIG. 21B is a graph of a typical sensor signal as a function of time;

DETAILED DESCRIPTION

A. SYSTEM CONSTRUCTION

1. GENERAL CONSTRUCTION

Figure 1:
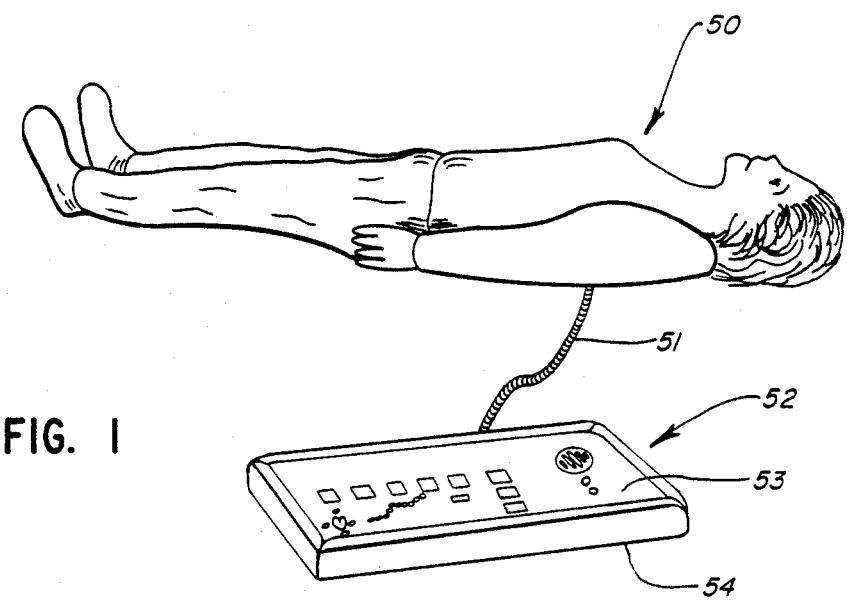
FIG. 1 is a perspective view of an interactive CPR training system including a simulation manikin and a control unit incorporating the principles of the invention.

As shown in FIG. 1, an interactive CPR training system constructed in accordance with the teachings of this invention comprises a simulation manikin 50 coupled by a cable 51 to a control unit 52 comprising a box 54 incorporating a control panel 53. Although control unit 52 is shown separated from the manikin 50, if desired the two may be combined into a single unit. For example, control unit 52 may be mounted in an otherwise unused lower portion of the manikin. Similarly, the electronics for the system may be distributed in any convenient manner between the control unit's box 54 and otherwise unused internal portions of the manikin.

2. CONTROL PANEL

Figure 2:
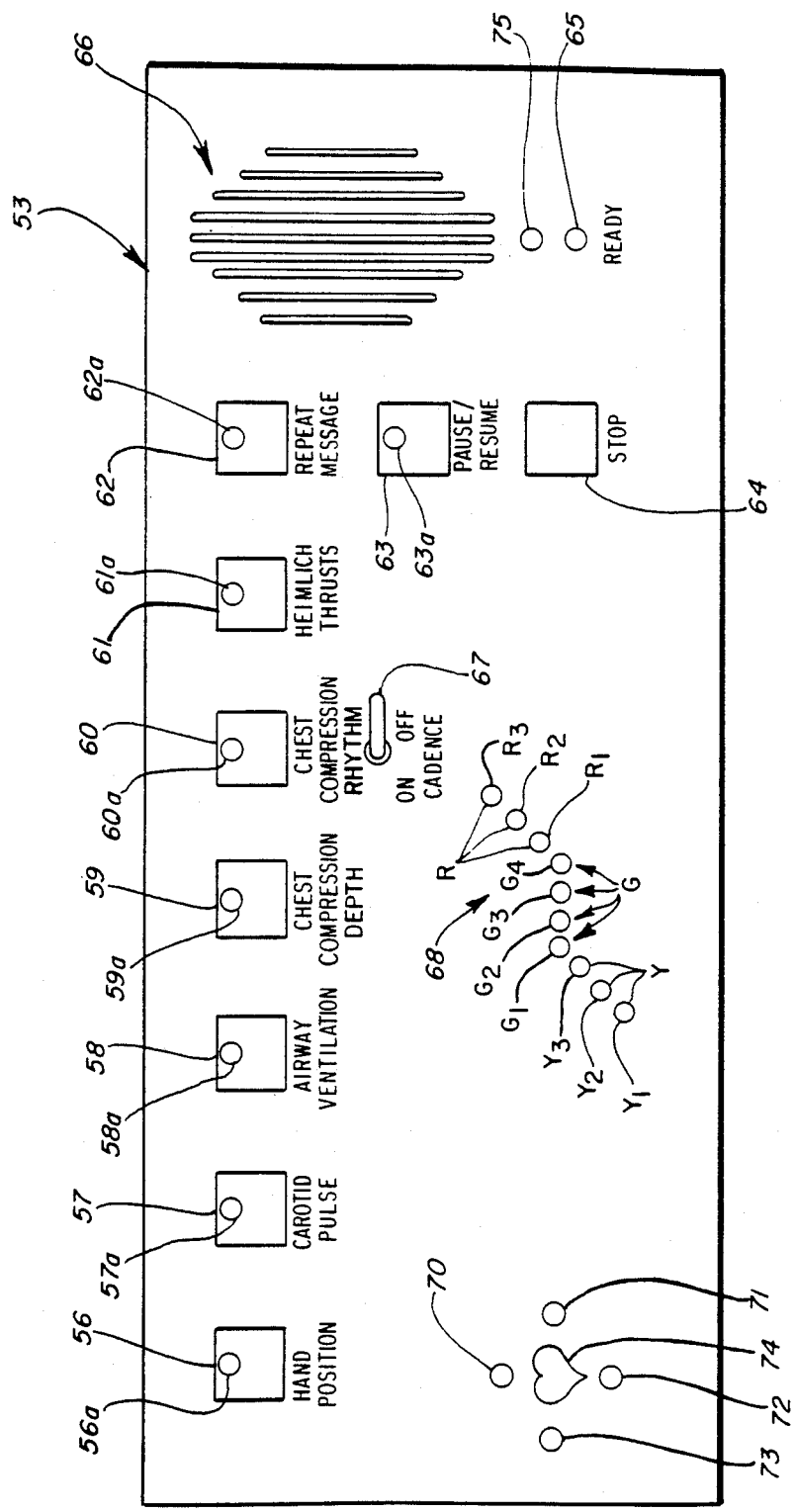
FIG. 2 is a top plan view of a control panel for the training system of FIG. 1.

FIG. 2 shows the control panel 53 in greater detail. The various resuscitation routines taught by the system in conjunction with simulation manikin 50 are chosen by the student, using selection buttons 56 for Hand Position, 57 for Carotid Pulse, 58 for Airway Ventilation, 59 for Chest Compression Depth, 60 for Chest Compression Rhythm, and 61 for Heimlich (Abdominal) Thrusts. An important feature of our invention is that the system is always ready to repeat the most recent message to the student if he or she presses the Repeat Message button 62.

Control panel 53 also includes a Pause/Resume button 63. Pressed once, this button causes the system to pause; pressed again this button causes the system to resume where it left off. If button 63 is pressed once for "Pause", the system will wait a predetermined period, for example four minutes, for the button to be pressed again for "Resume". If the second pressing does not occur within the predetermined period, the system abandons the routine that was "Paused" and resets itself to its standby low power state.

The selection buttons 56–61 for the teaching routines and the Repeat Message 62 and Pause/Resume 63 buttons have corresponding lamps 56a–63a, which may be light-emitting diodes (LED's). A Stop Button 64 causes the current routine being executed to halt and resets the system to its standby low power state.

At certain points in the various operating routines, the system is unable to accept inputs from the student. When the system is ready for student input, it blinks a ready lamp 65 on the control panel 53 of FIG. 2.

The system gives oral advice and coaching to the student via a speaker 66, using prestored messages chosen in context in response to various inputs from the user.

As visual feedback during the ventilation and chest compression training routines, an array 68 of colored LED's indicates the results of the student's efforts to breathe air into the manikin's "lungs" or to "restore circulation" by compressing the manikin's chest. This array consists of three yellow lamps Y1, Y2, Y3 for low readings, four green lamps G1, G2, G3, G4 for medium readings, and three red lamps R1, R2, R3 for high readings. The smallest effort above a certain threshold causes the lowest lamp Y1 to light, and successively larger signals light additional lamps in the order Y2, Y3, G1, G2, G3, G4, R1, R2, R3 until all the lamps are lit.

In the teaching routines this colored lamp array provides important visual feedback to the student: An effort (artificial respiration or chest compression) lighting only the yellow lamps is too low. An effort lighting one or more of the green lamps but none of the red lamps is good, an acceptable performance. But an effort that lights one or more of the red lamps is too much, indicating danger to the victim represented by the manikin.

During efforts to compress the manikin's chest, the student's hand position must be in a critical location corresponding to the lower half of the victim's sternum. As visual feedback, a set of lamps 70, 71, 72, 73 arranged around a stylized heart symbol 74 all remain lit if the hand position during compression is correct. If a lamp goes off, it indicates the hand position on the manikin is too far in a direction indicated by the turned off lamp relative to the center of the heart symbol. This allows the student to note his error and correct his hand position accordingly until all lamps are lit during compression.

In cardiopulmonary resuscitation it is important for the rescuer to periodically check to determine if the victim's breathing or heartbeat has resumed. Button 57 enables a training routine in which the student can practice locating and detecting a carotid pulse in the neck area of the manikin. As a more realistic simulation, the system provides for an instructor to secretly turn on in the manikin a simulation of shallow breathing or carotid pulse or both by means of an wireless signal to the control unit 52. With this objective in mind, the control panel 53 can also include a receiver sensor 75 in a convenient location, such as adjacent the Ready lamp 65. If, for example, an infrared beam is used for the wireless signal from the instructor, sensor 75 will be an infrared detector.

Control panel 53 also includes a cadence switch 67 to turn on a 1.5 Hz audible cadence beat to guide the student in performing a rhythmic series of chest compressions to restore blood circulation.

3. GENERAL TEACHING SEQUENCE

Figure 3:
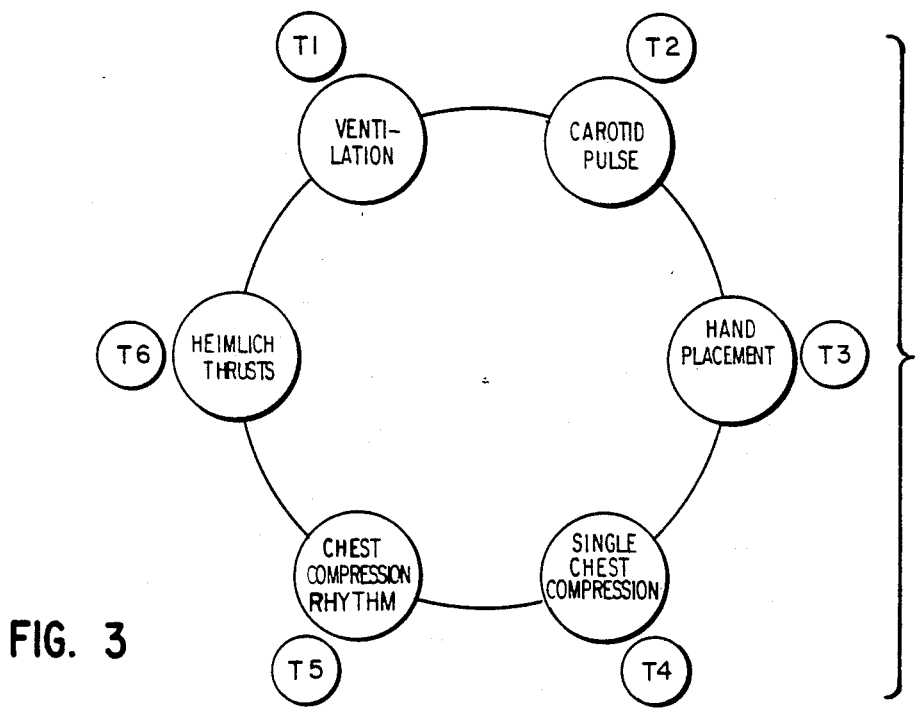
FIG. 3 is a flow diagram of a typical training sequence achieved by the training system of FIG. 1.

FIG. 3 shows a flow diagram of a typical training sequence enabled by the training system of FIG. 1, in which the student can proceed in the following sequence: Ventilation of the Airway (T1), Carotid Pulse Detection (T2), Hand Placement for Chest Compression (T3), Single Chest Compressions (T4), Chest Compressions in Rhythm (T5), and Heimlich Abdominal Thrusts to Remove Airway Obstructions (T6).

The system does not force the student to pursue the training in this sequence. Instead, the student is permitted to select any training routine at a time using the selection buttons 56–61 on the control panel of FIG. 2. However, like a good coach, as the student completes one training routine (e.g. Ventilation), the system vocally suggests the next appropriate sequence (Carotid Pulse), and for a brief interval even blinks the corresponding selection button for the suggested sequence. For example, at the close of the ventilation training the system plays the stored message "Excellent Ventilation. If you feel confident, you should now practice checking the carotid pulse. If you don't, try giving two breaths again," and blinks the selection button lamp 57a of FIG. 2 located on the carotid pulse selection button 57.

4. CONTROL UNIT

Figure 4:
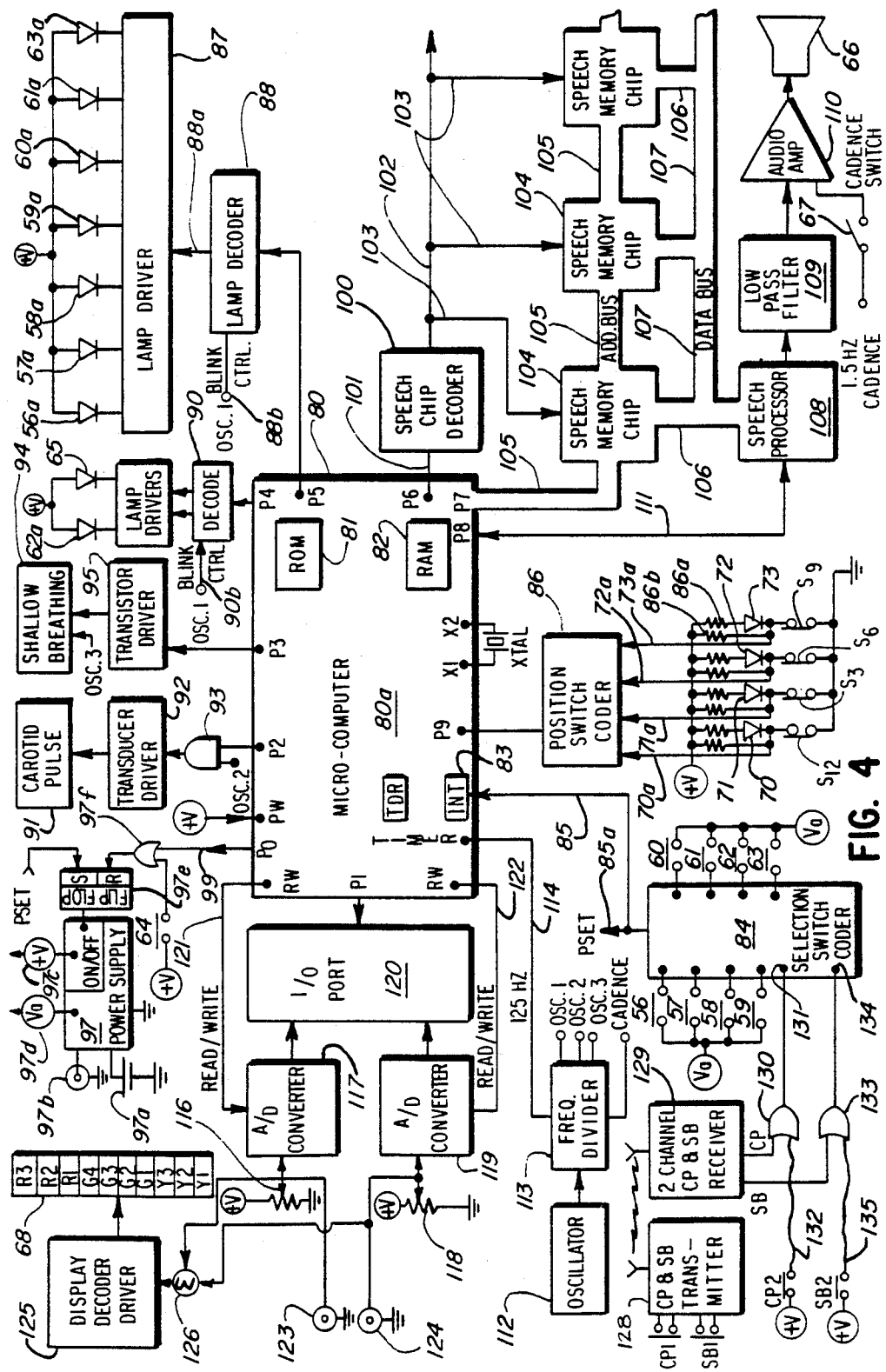
FIG. 4 is a functional block diagram of the control unit shown in FIG. 1.

FIG. 4 shows a functional block diagram of control unit 52 of FIG. 1. At the heart of control unit 52 is a microcontroller 80. It is a feature of our invention that while the monitoring, feedback, and vocal coaching of the student is a sophisticated simulation of a human coach, all this can be accomplished with relatively modest computational power, cost and size. While control unit 52 could be implemented by a suitably programmed personal computer or a minicomputer or the like, the necessary associated input/output circuits alone would be at least as complicated and expensive as our microcontroller-based system. Instead, our invention can be satisfactorily realized based on a much simpler single-chip microcomputer For example, microcontroller 80 be can a single chip microcomputer 80a such as the 8 bit HD637B05VOC microcomputer unit (MCU) available from Hitachi America, Ltd. of San Jose, Calif. Such a microcomputer 80a has a 4 kilobyte ROM (read only memory) 81 for holding a prestored control program and its associated prestored data. It also has a 192-byte RAM (random access memory) 82 which can be used as a scratchpad memory. The microcomputer's basic clock frequency can be set at a convenient frequency, such as 8.0 MHz (megahertz) by a suitable external crystal XTAL attached to terminals X1 and X2. To enable battery operation, the microcomputer unit is made with complementary metal-oxide semiconductor (CMOS) integrated circuits which have low power consumption.

FIG. 4 shows a number of peripheral chips used with microcomputer chip 80a, primarily as interface (input-/output) chips. It is feasible, however, to use a more powerful microcomputer chip that will incorporate many of the functions of these external circuits. For example, Hitachi America, Ltd. also makes the HD63705ZO microcomputer unit that incorporates 8 channels with built-in A/D converters of 8-bit accuracy.

To enable it to respond to external control inputs, such as the selection buttons 56–63 on the control panel 53 of FIG. 2, microcomputer 80a has an interrupt port (INT) 83 for an external hardware interrupt. These selection buttons 56–63 provide inputs to a switch coder 84. Each time a selection button is pushed, switch coder 84 sends a coded interrupt signal on line 85 to interrupt port 83. The coded interrupt indicates which of the selection buttons has been pushed. The microcomputer 80a then interrupts its current task, storing internal register information in a stack (not shown) so it can return to it later The microcomputer 80a responds to the interrupt by means of an Interrupt Routine (FIG. 12) that implements the function corresponding to the button pushed.

Microcomputer 80a has an eight-bit timer on board which can be configured to use an external timer clock input received at a TIMER input. The on-board timer in microcomputer 80a includes an eight-bit timer data register TDR, which contains the current value of the on-board timer.

Microcomputer 80a also has various ports P1-P8 which it uses for input/output of data or control signals to external circuits and devices. A coded signal output at port P5 is used to control the indicator lamps on control panel 53 of FIG. 2. A lamp decoder circuit 88 receives the coded output of port P5 and uses it to determine which lamps are to be lit. Lamp decoder circuit 88 sends control signals to a lamp driver circuit 87 via line 88a to switch on or off LED's 56a (HAND POSITION), 57a (CAROTID PULSE), 58a (AIRWAY VENTILATION), 59a (CHEST COMPRESSION DEPTH), 60a (CHEST COMPRESSION RHYTHM), 61a (HEIMLICH THRUSTS), and 63a (PAUSE/RESUME) on control panel 53. To provide for blinking of the lamps, an oscillator signal OSCI is fed to lamp decoder 88 via blink control line 88b.

In a similar manner, the output at port P4 is used to control the panel lamps 62a (REPEAT MESSAGE) and 65 (READY) via a lamp decoder 90 and a lamp driver 89. To provide for blinking of the lamps 62a and 65, the oscillator signal OSC1 is also fed to lamp decoder 90 via blink control line 90b.

A port P2 is used to control a carotid pulse transducer 91 for simulating a carotid pulse in the manikin's neck. The two inputs of an AND gate 93 receive respectively the output of port P2 and a digital oscillator signal OSC2 of about 1 pulse per second (simulating the carotid pulse rate). The output of AND gate 93 is inputted as a control signal to a transducer driver circuit 92 whose output drives carotid pulse transducer 91.

Similarly, a port P3 is used to control a shallow breathing transducer 94 to enable the manikin to simulate a victim's shallow breathing. The output of port P3 is input as a control signal to a transistor driver 95 which drives shallow breathing transducer 94. An oscillator signal OSC3 having a period of about 4 seconds (simulating a breath every four seconds) is also input to shallow breathing transducer 94.

Electrical power for operating the system is provided by a power supply 97 that outputs supply voltage $+V$ at 97c. It is an important feature of the invention that its circuits and auxiliary devices are small and efficient enough that a compact low-voltage battery 97a, such as six "D" size 1.5 volt dry cells, can provide the necessary electrical energy for the power supply. This permits the manikin to be conveniently portable. However, the power supply can also include an input jack 97b for an external DC supply voltage, such as can be provided by a conventional AC adapter (not shown) that depends on a 110 V. AC line cord for power.

Power supply 97 outputs a standby voltage $V_a$ at 97d and a main voltage $+V$ at 97c. Standby voltage $V_a$ is always available if battery 97a is connected or there is a DC voltage input at 97b from an AC adapter. Standby voltage $V_a$ powers those few circuits which must always be able to respond to the pressing of a selection button , such as switch coder 84 and a power supply control flip-flop 97e.

The main voltage $+V$ is turned on to run the teaching routines and turned off for power saving. The output of flip-flop 97e is inputted to power supply 97 so that the state of flip-flop 97e controls whether main voltage $+V$ is on or off.

When the output of flip-flop 97e is a logical 1 (high), main voltage $+V$ is turned on. This is done by inputting a signal that is a logical 1 to the S (SET) input of flip-flop 97e. Pressing any of program switches 56–63 causes selection switch coder 84 to output a power up PSET signal that is a logical 1 on line 85a to input S of flip-flop 97e. This puts flip-flop 97e in its 1 state, turning on main voltage $+V$ for microcomputer 80a and its peripheral circuits. Pressing any of selector switches 56–63 also causes selection switch coder 84 to send an interrupt signal on line 85 to microcomputer 80a.

Once provided with the main voltage $+V$, microcomputer 80a automatically initializes itself and then services the interrupt signal from selection switch coder 84 to provide the teaching routine corresponding to the switch (56–63) which has been pressed.

Inputting a signal that is a logical 1 to the R (RESET) input of flip-flop 97e causes the flip-flop to output a logical 0 (low), turning off main voltage $+V$. The R input of flip-flop 97e is fed by the output of an OR gate 97f having two inputs, one from a power off port PO of microcomputer 80a and the other from the STOP button 64 on control panel 53 of FIG. 2. If either of these two inputs is a logical 1, OR gate 97f outputs a logical 1, resetting flip-flop 97e to turn off main voltage $+V$, putting the system in its standby low power state.

Thus pressing the STOP button 64 on control panel 53 stops the system by turning off the main voltage but leaves it in the standby state. Normally, pressing the PAUSE/RESUME button on control panel 53 once causes the system to temporarily halt its present routine and wait a preset period for the button to be pressed again for RESUME. However, if the preset period, for example four minutes, is exceeded, microcomputer 80a outputs a logical 1 via power-off port P0, line 99, and OR gate 97f to turn off the main voltage +V.

Ports P6, P7 and P8 are used to provide a simulated speech output including coaching instructions to the student. As will be explained in more detail below, all messages to the student are composed of short, prestored phrases. Therefore, a message is reproduced by sequentially synthesizing each of the prestored phrases making up the message. The real voice sounds which make up the phrases sampled, and sample numbers from which the phrases can be synthesized by a speech processor 108 have been stored as bytes in speech memory chips.

To reproduce a prestored phrase, port P6 is used to output a signal on line 101 to a speech chip decoder 100 that sends an enable signal to the speech memory chip 104 holds the sample numbers for that phrase. Then port P7 is used to output an address on address bus 105. The contents at that address in the enabled speech chip are read out via a data bus 107 to speech processor 108. After synthesizing the corresponding sound from contents of that address, speech processor 108 sends a signal to port P8 of microcomputer 80a via line 111 to indicate that it is ready to receive the next sample number. The microcomputer 80a responds by outputting the next address on address bus 105. This process is repeated until all stored sounds of the phrase have been synthesized.

The synthesized output of speech processor 108 is smoothed by a low-pass filter 109 having a high frequency cutoff of about 4 kHz. The smooth audio output of low-pass filter 109 is amplified by audio amplifier 110, which drives the output speaker 66 on control panel 53 of FIG. 2.

To assist the student in developing the proper rhythm for chest compressions, a cadence beat is provided by a 1.5 Hz cadence signal. A cadence switch 67 on the control panel 53 connects this signal to audio amplifier 110 for audio output by speaker 66.

An external oscillator 112 is provided to generate a reference clock for the relatively low frequency signals. The output frequency of this oscillator is divided by frequency divider circuit 113. That circuit 113 has outputs for the various reference input signals OSC1 (indicator lamp flashing), OSC2 (carotid pulse), OSC3 (shallow breathing), as well as the 1.5 Hz cadence beat, and a 125 Hz timer clock signal that is inputted to microcomputer 80a at a TIMER terminal.

The normally closed switches S12, S3, S6, S9 shown in FIG. 4 are located on the manikin's chest to detect of the student's hand position during chest compression exercises. As will be discussed below in more detail in connection with FIGS. 8A-8F, a misplaced hand will open one or more of these switches. Each of the switches has one side connected to ground and the other side connected to a corresponding LED 70, 71, 72, 73 on the control panel 53 of FIG. 2. Each of the LED's is connected to the supply voltage +V via a respective load limiting resistor 86a. As visual feedback to the student, when a switch S12, S3, S6, S9 is closed, its corresponding LED 70, 71, 72, 73 will be ON, and when the switch is open, the corresponding LED will be OFF.

The non-grounded side of each of the switches S12, S3, S6, S9 has a respective output line 70a, 71a, 72a, 73a connected to a position switch coder 86 and through a respective load resistor 86b to the supply voltage. When a switch S12, S3, S6, S9 is closed, the voltage on the corresponding output line 70a, 71a, 72a, 73a will be a logical 0 (ground), and when the switch is open the output line voltage will be a logical 1 (high). Position switch coder 86 encodes the state of each of the switches and inputs the coded information to microcomputer 80a via port P9.

The manikin is fitted with position sensors for measuring the student's efforts to compress the manikin's chest and to ventilate the manikin's artificial lungs. In FIG. 4 a chest compression sensor 116 is shown as a potentiometer whose main resistive element is connected between ground and supply voltage +V, and whose output slider is mechanically linked to move as the chest is compressed. The output slider voltage is inputted to an A/D (analog to digital) converter 117 when a suitable READ pulse is received on READ/WRITE line 121. The digitized output of A/D converter 117 is inputted to port P1 of microcomputer 80a via a multiplexing I/0 port 120.

Similarly, a ventilation sensor 118 is shown as a potentiometer whose main resistive element is connected between ground and supply voltage +V, and whose output slider is mechanically linked to move as air is blown into the manikin's artificial lungs via a mouth opening of the manikin.

The output slider voltage is inputted to a corresponding A/D converter 119 when a suitable READ pulse is received on READ/WRITE line 122. The digitized output of A/D converter 119 is inputted to multiplexing I/0 port 120. By sending suitable control signals to the multiplexing I/0 port via port P1, microcomputer 80a can read in either the digitized signal from the chest compression sensor 116 or the digitized signal from the ventilation sensor 118.

The slider outputs of the chest compression sensor and ventilation sensor are also outputted as analog signals to output jacks 123 and 124 respectively, which can be used to attach a strip chart recorder or other device for recording or monitoring the student's efforts.

During ventilation and chest compression training routines the LED array 68 on the control panel 53 of FIG. 2 provides visual feedback to the student of the magnitude of his or her efforts. This LED array consists of three yellow lamps Y1, Y2, Y3 for the lowest readings (student's efforts too weak or shallow to be effective), four green lamps G1, G2, G3, G4 for the medium readings (student's efforts acceptable), and three red lamps R1, R2, R3 for the high readings (student's efforts too strong, i.e. dangerous to victim). The smallest effort above a threshold causes the lowest lamp Y1 to light, and successively larger signals light additional lamps in the order Y2, Y3, G1, G2, G3, G4, R1, R2, R3 until all the lamps are lit. LED array 68 can be driven by a commercially available display decoder driver circuit used in a bar mode that increases the number of LED'S lit in proportion to the magnitude of the signal input received by it. For example, National Semiconductor's LED dot/bar generator chip LM3914 can be used for this circuit.

Because the student will not be attempting to compress the manikin's chest and ventilate the manikin's lungs simultaneously, the outputs of the chest compression and ventilation sensors may be visually displayed with a single LED array 68.

The chest compression sensor 116 and the ventilation sensor 118 are each adjusted to give a zero output in the "inactive or default position" corresponding to no activity by the student. The analog signals from chest compression sensor 116 and ventilation sensor 118 are added together by an adder circuit 126. The output (sum) signal of adder 126 is proportional to the magnitude of the active sensor, there being substantially no output contribution from the inactive sensor. The output of adder 126 is inputted to the display decoder driver 125 to drive the common LED array 68.

A rescuer giving cardiopulmonary resuscitation must regularly check for and be alert to whether the victim exhibits a carotid pulse or shallow breathing. The control panel 53 provides a selection button to practice sensing the carotid pulse in the manikin's neck. But an important element of realism is added by enabling the instructor to surreptitiously switch the carotid pulse and shallow breathing transducers on and off by remote control without warning. Additional control inputs 131 (to activate the carotid pulse transducer 91) and 134 (to activate the shallow breathing transducer 94) are provided on selection switch coder 84 for this purpose. Selection switch coder 84 treats control inputs 131 and 134 as if they were additional selector switch inputs for sending a coded interrupt to microcomputer 80a to enable the carotid pulse and shallow breathing transducers. If input 131 or 134 is a logical 1 (voltage high), the corresponding transducer is enabled by microcomputer 80a via the corresponding port P2 or P3. If input 131 or 134 is a logical 0 (voltage low), the corresponding transducer is not enabled.

The remote control can be by means of a two-channel wireless transmitter 128 that can signal to a matching receiver 129 the logical state desired for two receiver outputs, SB (shallow breathing) and CP (carotid pulse). Device controllers in the form of matching sets of transmitter and receiver circuits that work with infrared or ultrasonic emitters and detectors are commercially available for this purpose.

For example, Motorola Semiconductor Products of Schaumburg, Ill. makes a transmitter (MC14457) and receiver (MC14458) pair of CMOS chips designed for either infrared or ultrasonic ON/OFF remote control of up to 16 channels. If infrared signals are used, the transmitter circuit 128 receives the instructor's selection of the carotid pulse or shallow breathing transducers by means of corresponding selection buttons CP1 and SB1. Transmitter circuit 128 then encodes these choices and transmits them by modulating an output LED that emits an infrared beam. The matching receiver is provided with a receiving photodiode detector sensitive to infrared, whose detected signal is demodulated to determine the desired state of corresponding outputs CP and SB. Similarly, if ultrasonic signals are used, transmitter circuit 128 modulates an ultrasonic output transducer and matching receiver circuit 129 demodulates the output signal of an ultrasonic microphone detector.

The remote control can also be by means of control wires 132 and 135 to remote locations where the instructor can actuate corresponding pushbuttons CP2 and SB2 to send logical 1 signals for the carotid pulse or shallow breathing routines respectively.

In FIG. 4 both wireless and direct wire remote control are provided for. The two inputs of an OR gate 130 respectively receive the output CP of receiver 129 and the signal on wire 132 from pushbutton CP2. The output of OR gate 130 is inputted as a carotid pulse transducer control signal to input 131 of selection switch coder 84. Thus, if wireless output CP or signal wire 132 is a logical 1, OR gate 130 will output a logical 1 to input 131 to signal microcomputer 80a to activate the carotid pulse transducer 91.

Similarly, the inputs of an OR gate 133 receive the outputs SB of receiver 129 and the signal on wire 135 from pushbutton SB2. If wireless output SB or signal wire 135 is a logical 1, OR gate 133 will output a logical 1 to input 134 to signal microcomputer 80a to activate the shallow breathing transducer 94.

5. SHALLOW BREATHING SIMULATOR

Figure 5:
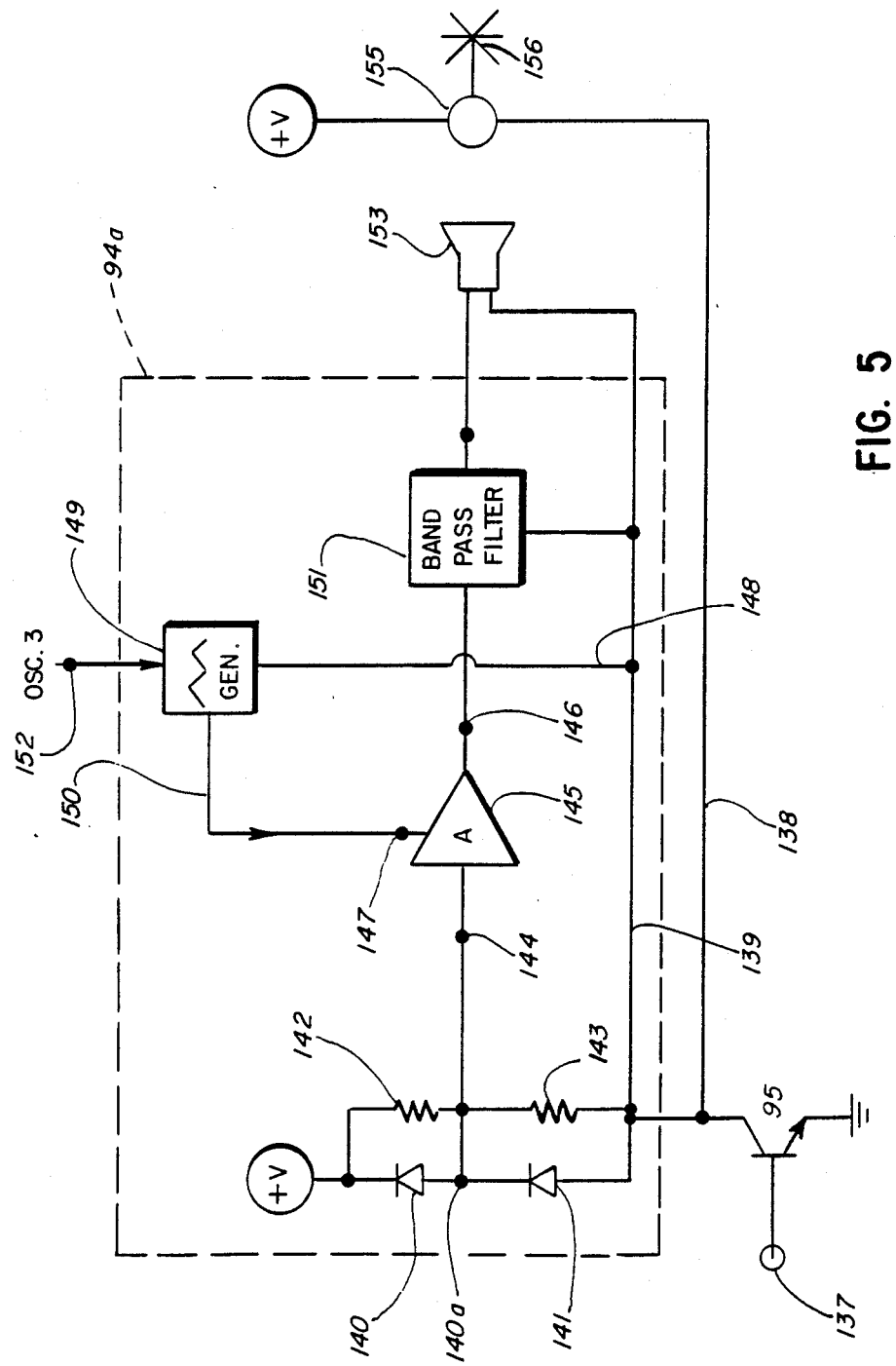
FIG. 5 is a simplified schematic of a shallow breathing simulator for use in the system of FIG. 1.

FIG. 5 shows a detailed example of the shallow breathing transducer 94 and transistor driver 95 of FIG. 4. Transistor driver 95 is a switching transistor having its emitter connected to ground receives at its base input 137 an enabling high signal (logical 1) from port P3 of the microcomputer whenever the operating program determines that the shallow breathing simulation is needed or has been requested (e.g., by instructor intervention). This switches transistor 95 ON, so that a circuit line 139 of a transducer driving circuit 94a is essentially at ground, enabling the driving circuit. Driving circuit 94a is adapted to simulate a "breathing" waveform to drive a miniature output speaker 153 located in the manikin's throat area.

Driving circuit 94a produces an amplitude-modulated random or white noise signal having an amplitude envelope that is a periodic triangular shaped wave with a period of about four seconds (one shallow breath every four seconds). To generate random noise, two reverse-biased diodes 140 and 141 are connected in series between the main voltage +V and grounded line 139 to create random "shot noise" at their connection point 140a. This random noise is input at 144 to an operational transconductance amplifier 145, such as LM 13600 made by National Semiconductor, which provides for a voltage controlled gain input 147. The output of the amplifier at 146 is passed through a bandpass filter 151, such as National Semiconductor's MF5CN100 filter, having a bandpass of about 1 to 5 kHz, and then drives miniature speaker 153.

The gain of amplifier 145 is modulated at gain input 147 by a voltage output at 150 from a triangular waveform generator 149 having a period of 4 seconds. In the functional block diagram of FIG. 4, frequency divider 113 provides a suitable 0.25 Hz low-frequency clock signal OSC3 which can be inputted to triangular waveform generator 149 at 152 to regulate its 4-second triangular periodic waveform.

Each new four-second period of shallow breathing simulation begins with the gain of amplifier 145 set to zero, after which the gain is increased steadily to raise the volume of the white noise. The volume peaks after two seconds, and then the gain of amplifier 145 is steadily reduced to zero in the remaining two seconds of the period, causing the white noise sound to fade away. Thus, the volume of the white noise passed to speaker 153 via bandpass filter 151 rises and falls during the four second period of the triangular waveform, simulating the sound of breathing.

If desired, the movement of air from the mouth and nose during breathing can be simulated by providing a small fan 156 powered by a miniature DC fan motor 155 in the manikin's airway passage area. One terminal of DC motor 155 is attached to the main supply voltage +V and the other terminal is attached to a line 138 wired to the collector of switching transistor 95. Whenever transistor 95 is turned ON by the input at base 137, line 138 is essentially grounded, turning on motor 155 to drive fan 156.

6. CAROTID PULSE SIMULATOR

A person performing cardiopulmonary resuscitation must initially determine if the victim's heart has stopped (cardiac arrest), and during the procedure to restore circulation by chest compressions must periodically check for a return of the heart function. This is done by checking the victim's pulse, preferably the carotid pulse in one of the arteries found on either side of the neck. This is done by placing the tips of the index and middle fingers at the correct pulse location at the side of the victim's neck.

Figure 6A:
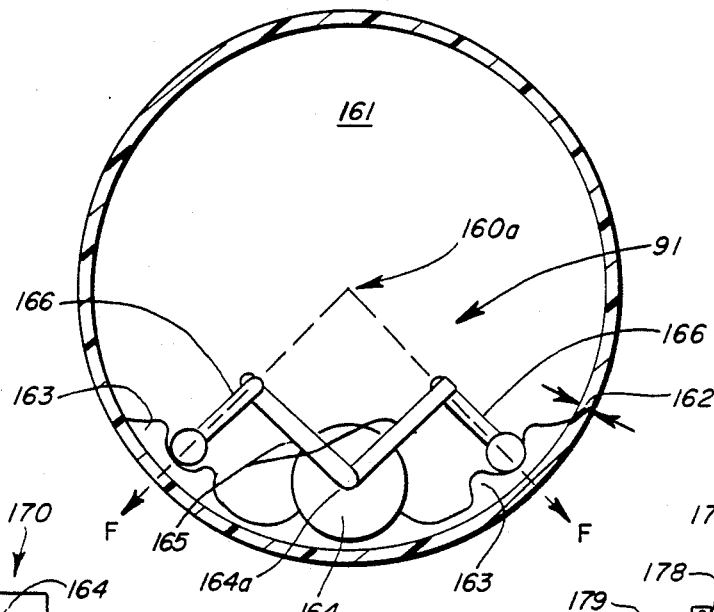
FIG. 6A is a cross-section of a first embodiment of a carotid pulse simulator installed in the neck of the manikin of FIG. 1.

FIG. 6A shows a first embodiment of a carotid pulse simulator 91 that can be suitably located in the hollow area 161 of the manikin's neck 160. The neck is a tubular structure enclosed by a cylindrical wall 162 of plastic "skin". A layer of resilient material 163, such as foam rubber, is attached, by adhesive or the like, to the inside face of neck wall 162. A small DC motor 164 is then axially mounted to the front of neck wall 162 with its drive shaft 164a parallel to the axis 160a of the manikin's neck. The resilient material 163 is used to provide a cushion between motor 164 and neck wall 162. For example, the motor can be attached to the resilient material by a suitable adhesive.

A pair of linkages 165 are symmetrically mounted at approximately a right angle to each other on the motor shaft 164a, and are driven by it. Mounted to each linkage at approximately a right angle is an outwardly directed radial beater arm 166 that rests against the resilient material. Each time DC motor 164 is driven in a clockwise direction, the beater arm 166 on the right impinges on resilient material 163 lining the manikin's neck wall 162. This delivers an impulse of force F to the neck wall in the "carotid" region that can be felt by the student's fingers as a simulated beat of a carotid pulse on that side of the neck. Similarly, when motor 164 is driven counterclockwise, beater arm 166 on the left impinges on material 163, delivering an impulse F to simulate one beat of a carotid pulse on the left side. The resilient material 163 is stretched during the impulse. When the impulse ends, the resilient material's restoring force returns the beater arm to its initial position.

Figure 6B:
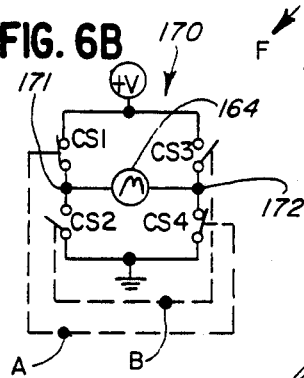
FIG. 6B shows a circuit for providing a bipolar driving voltage waveform for activating the motor of the carotid pulse simulator of FIG. 6A.

FIG. 6B shows a bridge circuit 170 which provides a bipolar driving voltage waveform for activating the motor of the carotid pulse simulator of FIG. 6A. On one side of the bridge circuit, electronically controlled normally open, single-pole, double-throw switches CS1 and CS2, which preferably are switching transistors, are connected in series between the main voltage +V and ground. Similar electronically controlled switches CS3 and CS4 are connected in series between the main voltage +V and ground on the other side of the bridge circuit. The DC motor 164 for simulating the carotid pulse is wired between a first terminal 171 joining switches CS1 and CS2 and a second terminal 172 joining CS3 and CS4.

To turn DC motor 164 in the clockwise direction, only switches CS1 and CS4 are closed by a drive voltage on terminals A just long enough to activate the motor to simulate a carotid pulse on one side of the neck. Then drive voltage A terminates, so that switches CS1 and CS4 are allowed to open, and only switches CS2 and CS3 are closed by a drive voltage on terminals B just long enough make the motor turn counterclockwise to simulate a carotid pulse on the other side. In the functional block diagram of FIG. 4, frequency divider 113 provides a suitable low frequency bipolar clock signal OSC2 of about 0.65–0.85 Hz which can be used as a clock for controlling the switch pairs CS1 and CS4 on the one side, and CS3 and CS4 on the other.

Figure 6D:
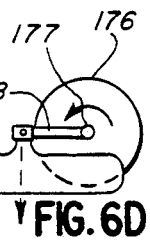
FIG. 6D is a side elevational view of the carotid pulse simulator of FIG. 6C.
Figure 6C:
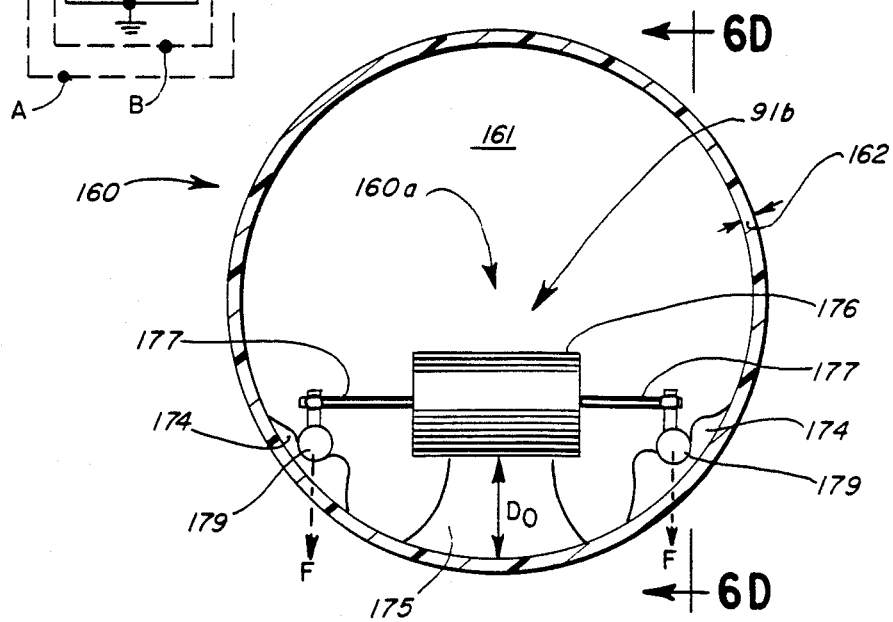
FIG. 6C is a cross-section of a second embodiment of a carotid pulse simulator for use in the manikin of FIG. 1.

FIGS. 6C and 6D show a second embodiment of a carotid pulse simulator 91b that can be transversely mounted in the manikin's neck 160 and driven by voltage pulses of a single polarity. As in the first embodiment of FIG. 6A, the neck wall 162 is lined with a resilient material 174, but only in the regions where the pulses are to be simulated. A motor 176 is transversely affixed at an offset $D_O$ to the neck wall 162 by a base support 175, which may also be of resilient material. Motor 176 is traversed by a rotatable shaft 177 that supports a perpendicular leg 178 at each end. The other end of each leg 178 is joined to an elongated beater foot 179 whose long axis is substantially parallel to the axis 160a of the manikin's neck. Each foot 179 nestles in the resilient material 174.

As can be seen in FIG. 6D, when the motor is pulsed in a single direction (counterclockwise, as indicated by the circular arrow C) each beater foot 179 delivers an impulse of force F to its adjacent area of the neck wall 160. Therefore, with this embodiment a bipolar driving voltage waveform is unnecessary, and the bridge circuit 170 of FIG. 6B need not be used. Instead, the transducer driver 92 shown in FIG. 4 can be a relatively simple switching transistor turned ON and OFF by the output of AND gate 93 to drive motor 176 whenever a beat of the carotid pulse is called for. The other input of AND gate 93 is the 0.65–0.85 Hz clock signal OSC2 from frequency divider 113 to provide the beat of the pulse. The resilient material 174 restores the beater feet 179 to their initial positions during the interval between pulses.

7. VENTILATION SENSOR

Figure 7A:
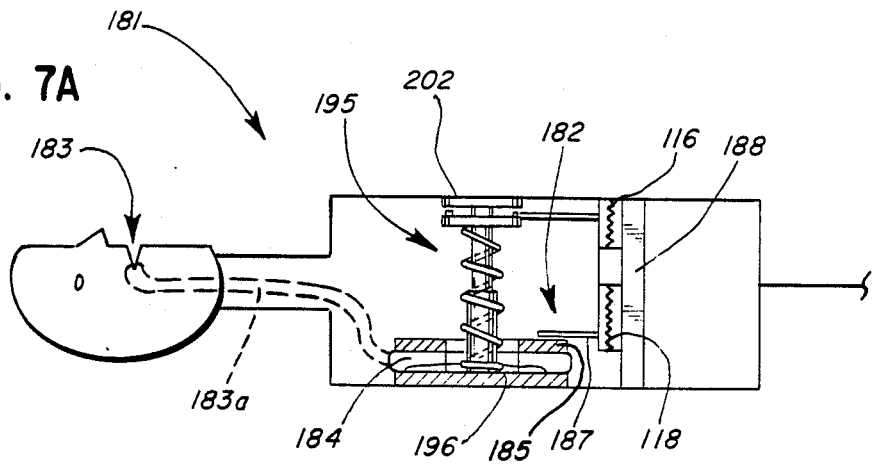
FIG. 7A is a simplified cross-section of a manikin fitted with a ventilation sensor and a combined hand position and chest compression sensor, seen at a time when there is little air in the ventilation sensor.

FIG. 7A shows a simplified cross-section of a manikin 181 fitted with a ventilation sensor 182 and a combined hand position and chest compression sensor 195, seen at a time when the manikin's artificial lungs are deflated. Ventilation sensor 182 has an opening at the manikin's mouth 183 into which the student can blow to inflate the manikin's artificial lungs. The air blown in at the mouth 183 is conveyed by an airway tube 183a, which may be made of plastic, to an inner-tube shaped resilient sac or artificial lung 184 which inflates (compare FIG. 7A with FIG. 7B) as air is forced into it via tube 183a. Artificial lung 184 can be made of rubber or flexible plastic and is toroidally shaped to provide a central passageway 184a for components of chest compression sensor 195 which will be described in more detail below.

Artificial lung 184 is sandwiched between a base plate 196 and a flat lung plate 185 which is attached to the top of plastic lung 184. Plates 196 and 185 are made of plastic or other suitable rigid material. Lung plate 185 also has a central opening 186 to provide for passage of components of the chest compression sensor. As air blown into the manikin's mouth 183 causes lung 184 to inflate, it pushes up against lung, plate 185.

Figure 7B:
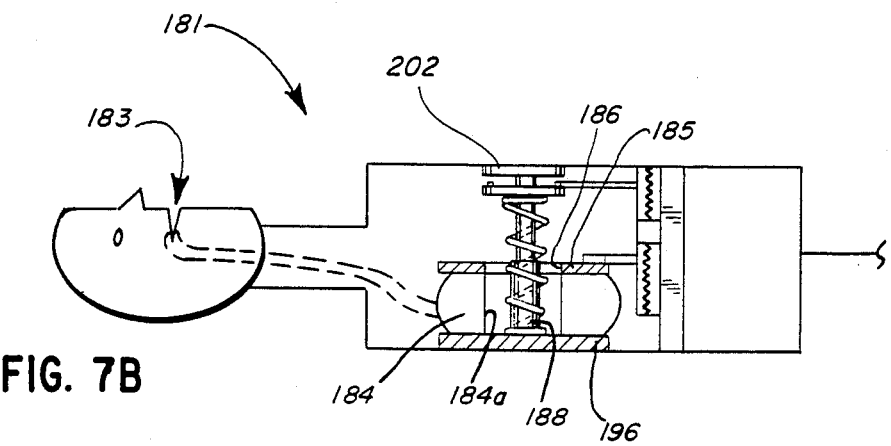
FIG. 7B is a simplified cross-section of the manikin of FIG. 7A seen at a time when air has been blown into the ventilation sensor.
Figure 7C:
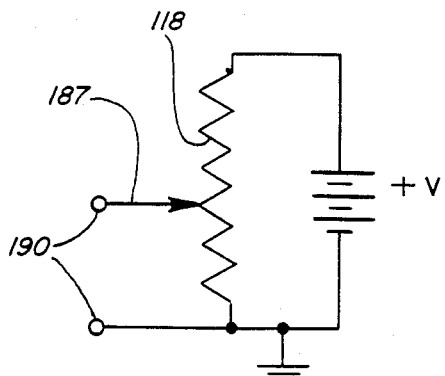
FIG. 7C is a circuit diagram of an analog detection circuit used with the ventilation sensor or chest compression depth sensor shown in FIGS. 7A and 7B.

Adjacent the lung 184 is a vertical support 188 on which is mounted a potentiometer 118 for measuring the excursion of lung plate 185 to determine how much air has been blown into lung 184. Slide potentiometer 118 has a wiper arm 187 mechanically fixed to lung plate 185 to move with the plate. FIG. 7C shows a circuit diagram of an analog detection circuit used with the ventilation sensor of FIGS. 7A and 7B. Potentiometer 118 is connected between the main voltage +V and ground, and its wiper arm 187 provides an output voltage at 190 proportional to the relative position of wiper arm 187 in its stroke along the resistor of the potentiometer. Thus, inflation of the manikin's lungs causes a change in position of lung plate 185 that is reflected in the output of potentiometer 118, providing a means by which the amount of air in artificial lung 184 can be determined.

The purpose of potentiometer 118 is to sense the position of lungplate 185. With suitable adjustments some other type of position sensor, such as a Hall effect sensor, can be substituted for potentiometer 118. Such a substitution can also be made for potentiometer 116 which is used to sense position in chest compression sensor 195, as discussed below.

8. HAND POSITION AND CHEST COMPRESSION SENSOR

Figure 8A:
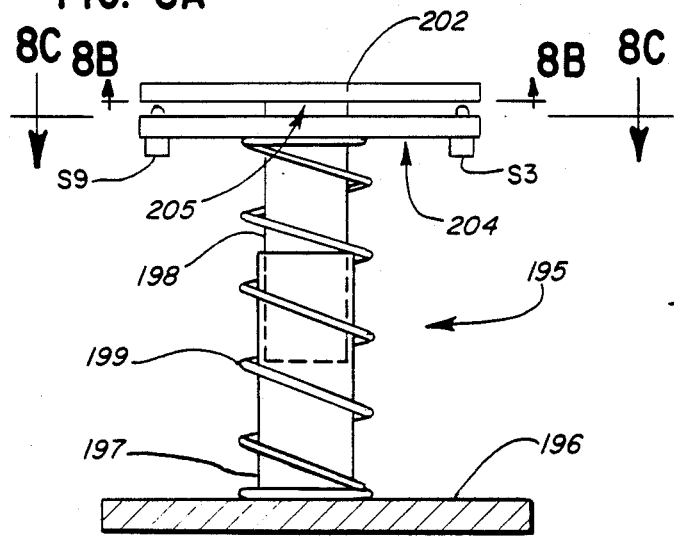
FIG. 8A is a simplified cross-section of a combined hand position and chest compression sensor for use with the manikin of FIGS. 7A and 7B.

In performing cardiopulmonary resuscitation, if a carotid pulse check indicates that the victim's heart has stopped, circulation is restored by external cardiac compression, i.e. rhythmically pressing on the victim's chest. FIGS. 7A, 7B and 8A show a simplified view of a combined hand position and chest compression sensor 195 for installation in the chest area of the manikin. Sensor 195 has a base plate 196 that supports a lower guide tube 197 into which is slidably telescoped an upper guide tube 198 carrying a circular switchplate 204 at its upper end. A coil compression spring 199 is fitted around upper and lower guide tubes 197, 198, the spring's expansion being constrained by the inner opposing faces of base plate 196 and switchplate 204. Resting on a raised circular protrusion 205 in the center of the upper face of switchplate 204 is a circular handplate 202 which may be attached to the inside surface of the plastic skin of the manikin's chest (see FIG. 7A). Handplate 202 and switchplate 204 are each formed of a suitable rigid material, such as plastic or metal, about 4 inches in diameter and a quarter of an inch thick, and are concentrically aligned with guide tubes 197, 198. Circular protrusion 205 is about one inch in diameter and protrudes about one eighth of an inch above the upper face of switchplate 204.

When there is no external downward force on handplate 202, spring 199 pushes switchplate 204 (and its handplate 202) upward until it rests against a stop (not shown). Pushing down on handplate 202 forces upper guide tube 198 into lower guide tube 197 while compressing spring 199 between plates 196 and 204. This simulates the resilient resistance the student would feel when pressing on a real victim's chest. By measuring the excursion of switchplate 204 from its rest position, the amount of compression applied to manikin's chest by the student at any time may be determined. For this measurement a potentiometer 116 is mounted in the manikin on a vertical support 188 and a wiper arm of potentiometer 116 is mechanically fixed to switchplate 204 (see FIGS. 7A and 8D) to move with the switchplate.

Figure 8E:
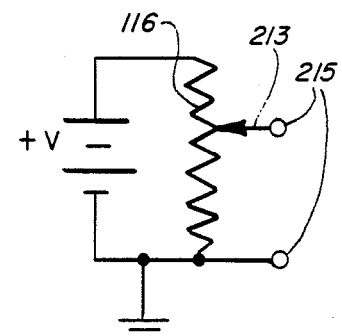
FIG. 8E is a circuit diagram of an analog detection circuit used with the detecting potentiometer of FIG. 8D.
Figure 8B:
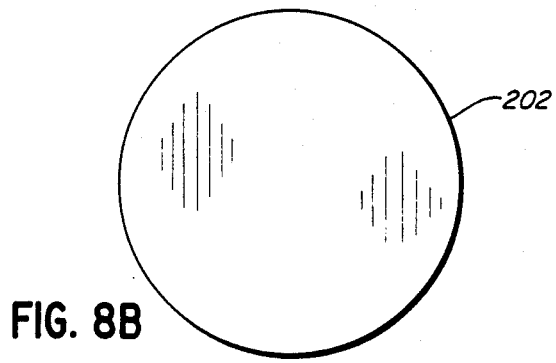
FIG. 8B is a plan view of the lower face of a handplate of the combined sensor along the line C—C of FIG. 8A.

FIG. 8E shows a circuit diagram of an analog detection circuit used with the compression sensor of FIGS. 8A-8D. Potentiometer 116 is connected between the main voltage +V and ground, and its wiper arm 213 provides an output voltage at 215 proportional to the relative position of wiper arm 213 in its stroke along the resistor of the potentiometer. Thus, pressing down on the manikin's chest pushes down handplate 202, causing a change in position of switchplate 204. The current position of switchplate 185 is reflected in the output of potentiometer 116, providing a means by which the amount of compression of the manikin's chest can be determined.

As the position of the student's hand on the manikin's chest is critical, handplate 202 and switchplate 204 cooperate to detect any error in hand position. The circular raised portion 205 on the upper face of switchplate 204 supports handplate 202 at distance d when handplate 202 is parallel to switchplate 204. The circular raised area 205 acts as a pivot about which handplate 202 can tilt if the student's hand is pressing off center, but only if it is sufficiently far off center to be outside the periphery of the upper surface of the raised portion 205.

Figure 8F:
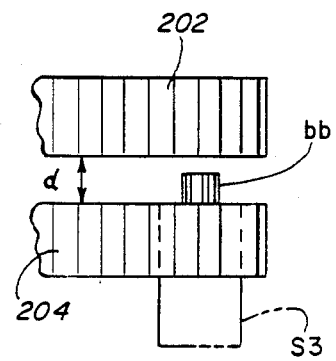
FIG. 8F is an enlarged cross-section of a top portion of the combined sensor of FIG. 8A near the edge.

Switchplate 204 carries a number of normally closed microswitches S3, S6, S9, S12 respectively mounted at the 3, 6, 9, and 12 o'clock positions near the plate's edge with their activating buttons bb protruding beyond the upper face of switchplate 204 as shown in FIG. 8F. The interplate distance d (when handplate 202 is parallel to switchplate 204) is chosen to provide enough clearance between the lower face of handplate 202 and the activating buttons of microswitches S3, S6, S9, S12 so that the microswitches remain open. However, if the student's hand position is not correct, handplate 202 will rock about the pivot protrusion 205, pushing down the activating buttons of one or more of the microswitches.

Figure 8C:
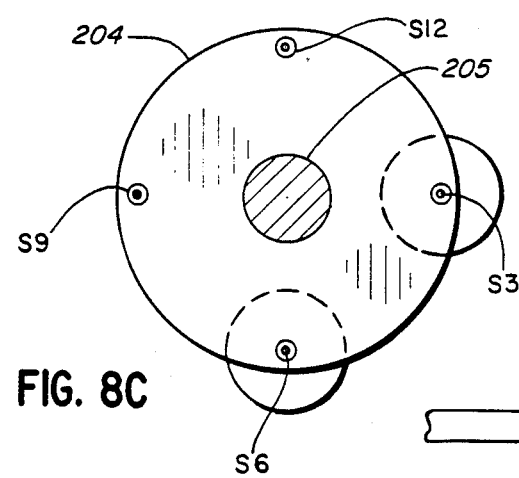
FIG. 8C is a plan view of the upper face of a switchplate of the combined sensor along the line C—C of FIG. 8A.
Figure 8D:
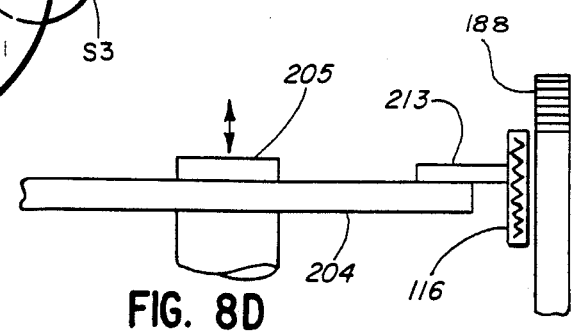
FIG. 8D is an enlarged view of the switchplate of FIG. 8A, showing its cooperation with a potentiometer for detecting its position.

For example, if the student presses the handplate 202 at the relative position indicated by an a circle on switchplate 204 in FIG. 8C, handplate 202 will push down the activating buttons of switches S3 and S6. This causes normally closed switches S3 and S6 to open. The area of that upper surface of boss 205, however, defines a circle of hand position tolerance, within which the student's hand can be a little bit off center but not far enough to tilt the plate 202, and therefore will not actuate any of the microswitches S3, S6, S9, S12.

As can be seen in the control unit block diagram of FIG. 4, the opening of switches S3 and S6 will break the circuits providing current to LED's 71 and 72, turning off those LED's, which are physically located on control panel 53 of FIG. 2. Normally all four LED's surrounding the stylized heart symbol on control panel 53 of FIG. 2 are lit, but LED's 71 and 72 will now be off, indicating to the student the general direction (between 3 and 6 o'clock) of his hand placement error.

The opening of switches S3 and S6 will also change the corresponding voltage on inputs 71a and 72a to Position Switch Coder 86 from low (ground) to high, enabling coder 86 to report the presence of a hand position error to microcomputer 80a via port P9. This makes it possible to incorporate feedback coaching messages about the hand position in the teaching routines.

9. A/D CONVERTERS

Figure 9A:
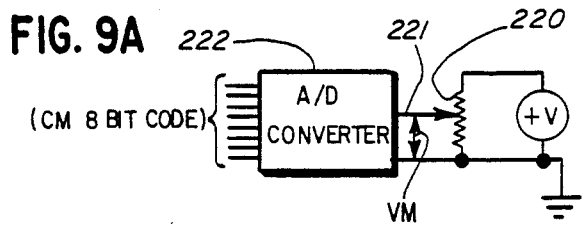
FIG. 9A is a simplified schematic of a conversion circuit which converts measurements of the student's efforts to an eight bit digital code.

To enable microcomputer 80a to digitally process the analog voltage signals from the ventilation sensor 182 and chest compression sensor 195, the voltage outputs from the corresponding measurement potentiometers 118 and 116 must be converted from analog voltage signals to an eight-bit digital code by respective A/D converters 119 and 117. FIG. 9A shows a typical conversion circuit in which measuring potentiometer 116 or 118 is connected between the main voltage +V and ground. The potentiometer's wiper arm 221 delivers an output voltage VM that represents the measured value of the ventilation or chest compression.

The output voltage VM is inputted to a suitable A/D converter integrated circuit 222. For example, National Semiconductor Corporation of Santa Clara makes a 5-volt input, 8-bit digital code A/D integrated circuit chip ADC 0803 that can be used for converter circuit 222. Each time A/D converter 222 converts the input VM to digital, the output is an eight-bit digital number whose value can range from decimal 0 ((hex, i.e. hexadecimal, 0) to decimal 255 (hex FF) and is proportional to voltage VM.

Figure 9B:
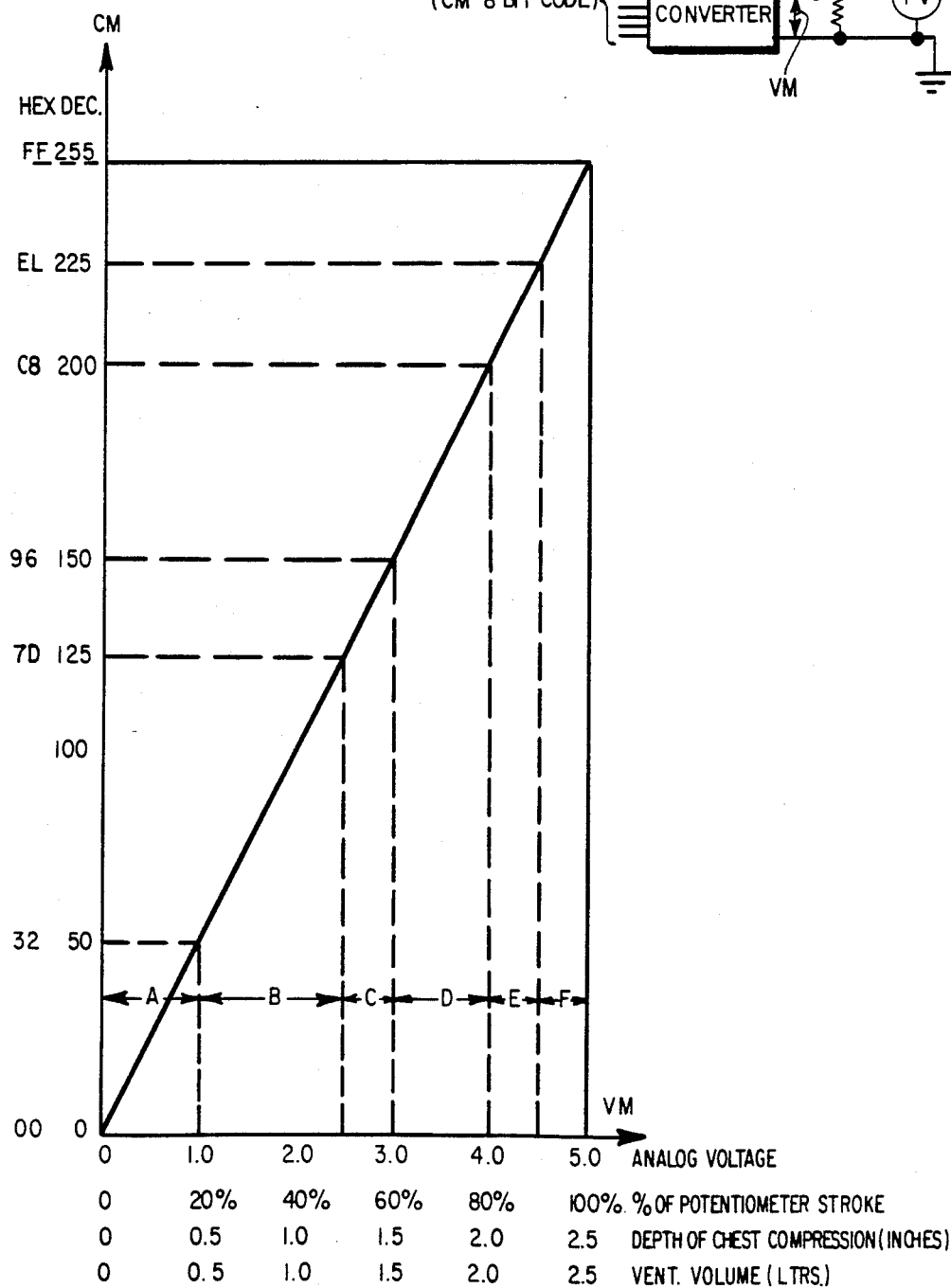
FIG. 9B is a curve showing the relationship between an input analog voltage measurement and an output digital code of the measurement.

The curve of FIG. 9B shows the relationship between the input analog voltage measurement VM and the output digital code measurement CM. Although the 255 levels of an eight-bit code enable the input signal VM to be quantized in steps finer than 1%, in judging the student's performance it is generally sufficient if the quantized signal is categorized into one of the six ranges A-F shown in FIG. 9B. For convenience in working with the microcomputer, integer values of the digital code CM are chosen for the boundaries between ranges rather than integral percentages. Thus, for example, range A, which represents the lowest values, is about the lowest 20% of the total range. However, for convenience this range A ends when the code measurement CM reaches the decimal value 50 (out of a maximum value of 255). Consequently, in terms of percent, range A covers from 0 to 19.2% of the maximum (0 to 0.96 volts) Table 1, which is more accurate than FIG. 9B, gives a detailed listing of the conversion values and the ranges A-F.

TABLE 1

A/D CONVERSION & RANGES

| RANGE | INPUT VOLTS VM | INPUT PERCENT | HEX OUTPUT CM | (DECIMAL VALUE) |
|---|---|---|---|---|
| A | 0.00–0.96 | 0.0–19.2 | 0–31 | 0–49 |
| B | 0.98–2.43 | 19.6–48.6 | 32–7C | 50–124 |
| C | 2.45–2.90 | 49.0–58.4 | 7D–95 | 125–149 |
| D | 2.94–3.92 | 58.8–78.4 | 96–C8 | 150–200 |
| E | 3.94–4.41 | 78.8–88.2 | C9–E1 | 201–225 |
| F | 4.43–5.00 | 88.6–100.0 | E2–FF | 226–255 |

Ventilation sensor 182 is calibrated to measure the volume of air in liters blown by the student into the manikin's artificial lung 184; a 100% reading (5 volts) is 2.5 liters. Chest compression sensor 195 is calibrated to measure the depth of the student's compression of the manikin's chest (at handplate 202in inches; a 100% reading (5 volts) is a 2.5 inch pression. Table 2 shows how the ranges A-F are defined in terms of the measured quantities.

TABLE 2

| | CALIBRATION OF RANGES | | | |
|---|---|---|---|---|
| RANGE | INPUT AIR VOLUME (LITERS) | INPUT CHEST COMPRESSION (INCHES) | PERCENT | HEX OUTPUT CM |
| A | 0.00–0.48 | 0.00–0.48 | 0.0–19.2 | 0–31 |
| B | 0.49–1.22 | 0.49–1.22 | 19.6–48.6 | 32–7C |
| C | 1.23–1.46 | 1.23–1.46 | 49.0–58.4 | 7D–95 |
| D | 1.47–1.96 | 1.47–1.96 | 58.8–78.4 | 96–C8 |
| E | 1.97–2.21 | 1.97–2.21 | 78.8–88.2 | C9–E1 |
| F | 2.22–2.50 | 2.22–2.50 | 88.6–100.0 | E2–FF |

The ranges defined by FIG. 9B and Tables 1 and 2 are generally interpreted as follows in measuring the student's performance. Values in range A are below a minimum set to avoid erroneous readings. Values in range B are much too weak or shallow (too little air, too little chest compression); consequently the student is typically given the verbal feedback "MORE!" (where the exclamation mark indicates special emphasis in the tone of voice in which the message is delivered). Values in range C are close but still too weak or shallow; the verbal feedback is typically "MORE". Range D is the ideal range, so the verbal feedback is typically "GREAT". Values in range E are close but a bit too much; the verbal feedback is typically "LESS". Values in range F are much too strong, endangering the victim; therefore the verbal feedback is typically "LESS!".

10. INSTRUCTOR INTERVENTION SYSTEM

Figure 10:
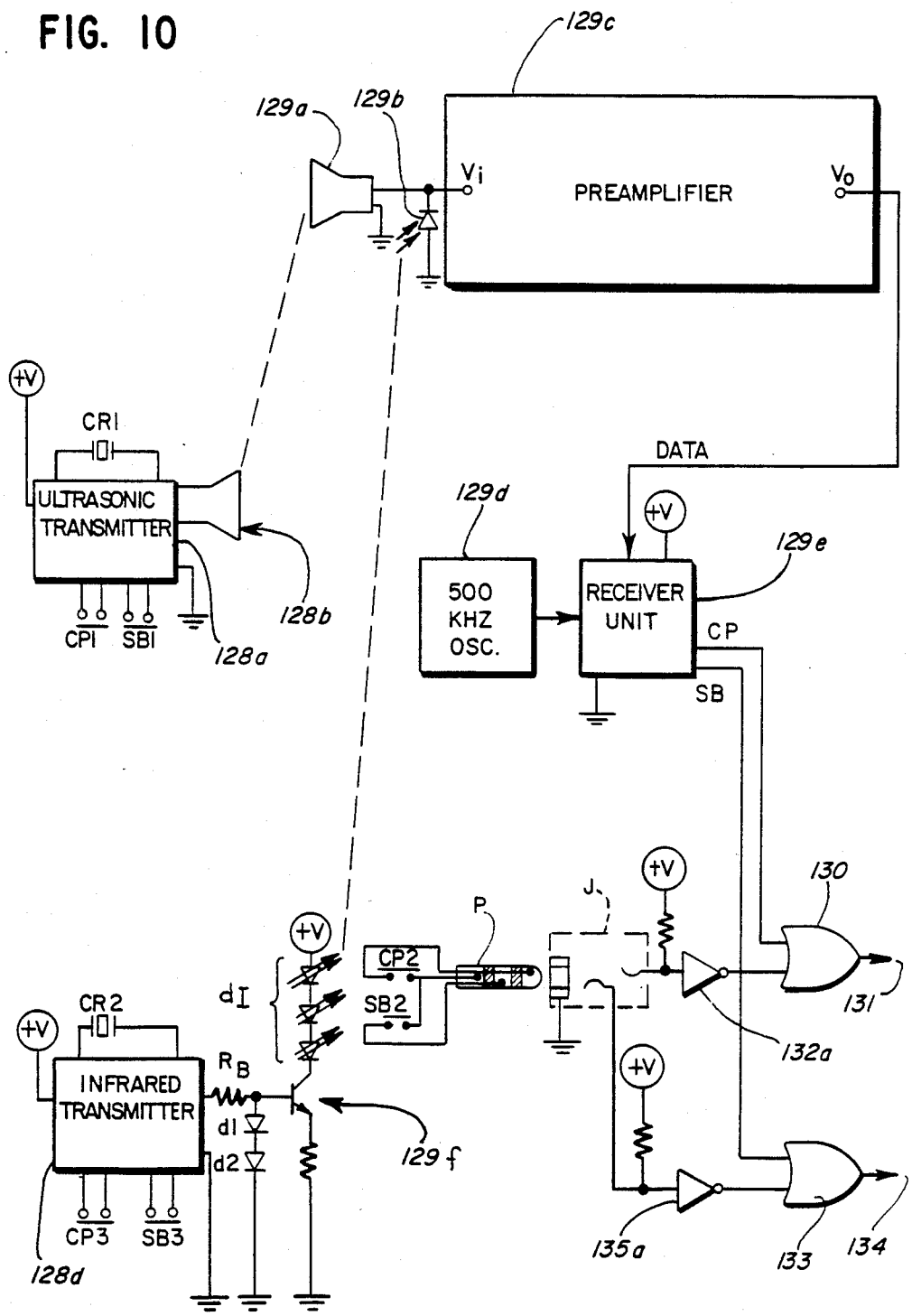
FIG. 10 is a detailed schematic of a remote-controlled instructor intervention system used with the control unit of FIG. 4.

FIG. 10 shows a more detailed schematic of the remote controlled instructor intervention system used with the control unit of FIG. 4. For wireless control, a two-channel ultrasonic transmitter 128a having control pushbuttons SB1 (shallow breathing) and CP1 (carotid pulse) is provided for the instructor. The transmitter sends an ultrasonic signal to a matching receiver 129e to indicate the logical state desired for two corresponding receiver outputs, SB and CP. It can be built from an integrated circuit chip of the type commercially available for ultrasonic control of TV receivers, games, etc, such as Motorola's CMOS monolithic transmitter chip MC14457.

The Motorola chip has an amplifier for driving a miniature ultrasonic ceramic microphone with a frequency-modulated biphase signal. A ceramic resonator CR1 is attached to provide a 500 kHz clock signal that is divided down to yield a high-frequency output of 41.67 kHz and a low-frequency output of 38.46 kHz. To transmit a logical 0, the microphone is driven for 256 periods of the low frequency, followed by 256 periods of the high frequency. For a logical 1, the order of the two frequencies is reversed. Circuitry in the transmitter chip incorporates these frequency-coded signals into a 7-bit data word format having a fixed two-bit start pattern and five data bits, not all of which are used by this invention.

At the receiver end, a ceramic mike 129a is provided to detect the modulated ultrasonic signals and convert them to an electrical signal that is inputted to a preamplifier 129c. The preamplifier receives the detected signal at an input $V_i$ and amplifies and limits it in a conventional manner to shape it into a digital square wave DATA signal, which is then outputted at a terminal $V_o$.

The DATA signal from preamplifier 129c is inputted to a suitable receiver chip 129e matched to decode the modulated signals from the transmitter. For example, Motorola Semiconductor Products sells a matched receiver MC14458 chip for decoding signals modulated by its MC14457 transmitter chip. To match the clock in the transmitter, a 500 kHz oscillator 129d is provided to input a basic clock pulse to the receiver chip. The receiver chip 129e then decodes the DATA signal to detect which of the selection buttons, CP1 or SB1, was pushed at the transmitter. A corresponding output CP or SB of receiver 129e is then set to 1.

The remote control signal sent by the instructor can also be conveyed by means of control wires. FIG. 10 shows selection buttons CP2 and SB2 for the instructor that are carried by a suitable 3-wire cord to a three-wire plug P. A matching three-wire jack J on the control unit 52 receives the plug P. By means of the wire, plug and jack, pressing selection button CP2 results in the grounding of the input to an inverter 132a, causing the inverter to output a logical 1 whenever the instructor pushes button CP2. Similarly, pressing button SB2 grounds the input of an inverter 135a, which then outputs a logical 1.

The two inputs of OR gate 130 respectively receive the output CP of receiver 129e and the signal from inverter 132a. The output of OR gate 130 is inputted as a carotid pulse transducer control signal to input 131 of selection switch coder 84. Thus, if wireless output CP or the output of inverter 132a is a logical 1, OR gate 130 will output a logical 1 to input 131 to signal microcomputer 80a to activate the carotid pulse transducer 91.

Similarly, the inputs of OR gate 133 receive the output SB of receiver 129e and the signal from inverter 135a. If wireless output SB or the output of inverter 135a is a logical 1, OR gate 133 will output a logical 1 to input 134 to signal microcomputer 80a to activate the shallow breathing transducer 94.

Alternatively, the instructor can be provided with a wireless transmitter 128d that sends infrared signals to indicate which of two buttons, CP3 (carotid pulse) or SB3 (shallow breathing) has been pressed. The modulation scheme can be similar to that used for the ultrasonic signals.

The previously mentioned Motorola MC14457 transmitter chip can alternatively be wired to modulate the output of LED diodes $d_I$ that emit an infrared beam. As before, a ceramic resonator CR2 is attached to form a 500 kHz clock signal used to provide the high- and low-frequency modulation signals. The frequency-modulated biphase signal formed by the transmitter chip is inputted through a base resistor $R_B$ and clipping diodes $d_1$ and $d_2$ to the base of a driving transistor 129f. Transistor 129e modulates the infrared beam by switching on and off the current through the LED diodes $d_I$, which are wired in series between the collector of transistor 129e and the main voltage $+V$.

At the receiver end, a suitable infrared photodiode 129b is provided at input $V_i$ of preamplifier 129c for detection of the modulated infrared beam. Otherwise, the receiver circuitry and signal processing remains unchanged from that used for the ultrasonc signals.

SYSTEM OPERATION

1. START UP

Until a selection button is pressed, the system remains in a low-power standby mode in which the main voltage $+V$ is off and microcomputer 80a is not operating. Only a standby voltage $V_a$ powers those few circuits which must always be able to respond to the pressing of a selection button, such as selection switch coder 84. However, as explained above in connection with the control unit 52 of FIG. 4, pressing any program switch 56–63 causes the standby circuits to turn on the main voltage $+V$ and also causes selection switch coder 84 to send a hardware interrupt signal on line 85 to microcomputer 80a.

Figure 11:
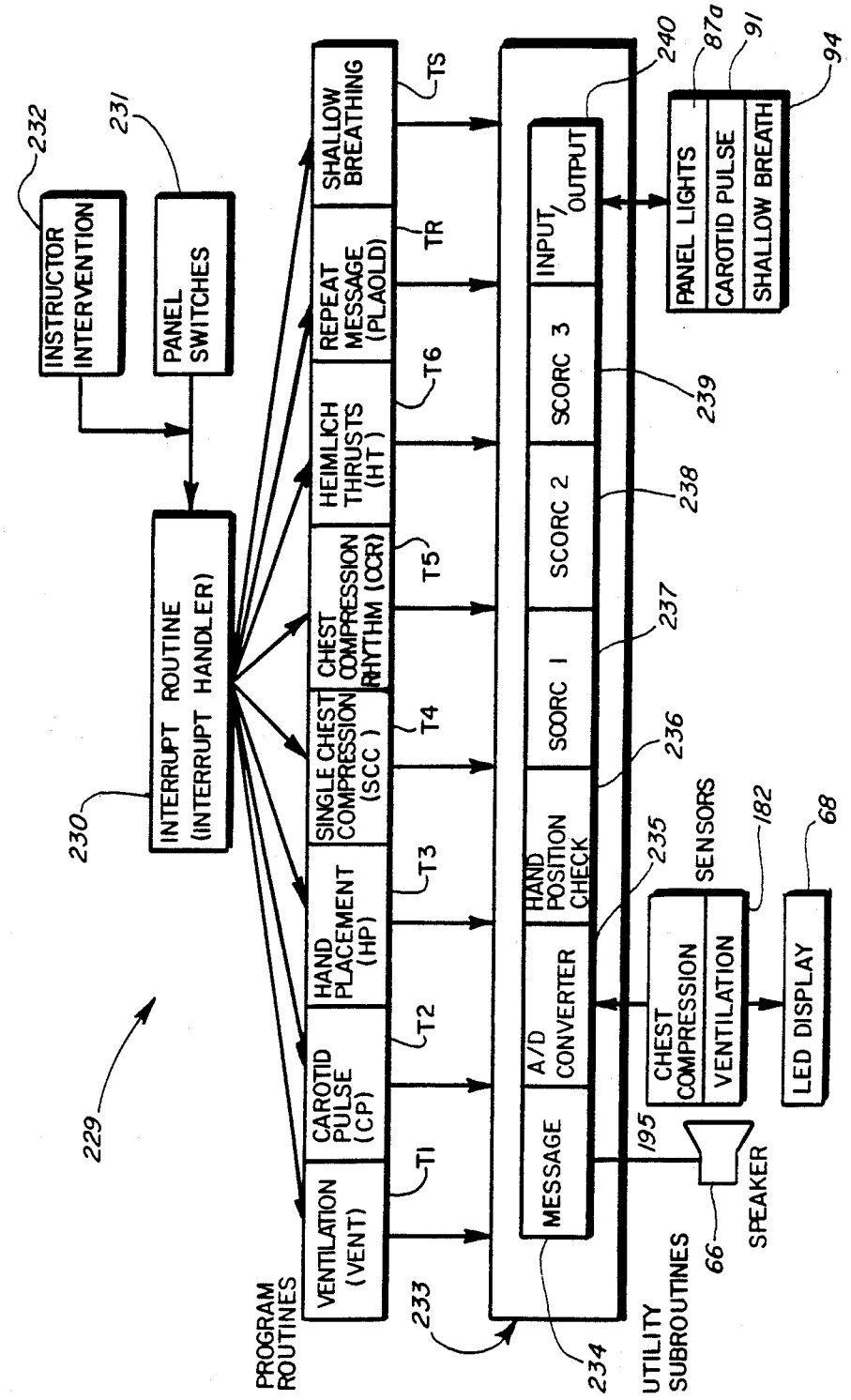
FIG. 11 is a block diagram of an embodiment of a Control Program for use with the control unit of FIG. 4.

Once provided with main voltage $+V$, microcomputer 80a automatically initializes itself and then transfers control to an Control Program 229 represented in FIG. 11. All of the instructions enabling the microcomputer 80a to implement the Control Program are prestored in the four-kilobyte ROM 81 on board the microcomputer chip 80a, with the exception of speech sounds prestored in the speech memory chips 104.

The complete Control Program is listed in assembly language in Appendix II filed with this patent application.

2. INTERRUPT ROUTINE

Control Program 229 begins with an Interrupt Routine 230 to service the interrupt signal from selection switch coder 84 to provide a particular program routine corresponding to whichever one of the panel switches 231 has been pressed. If the instructor makes a remote-controlled request for a carotid pulse or shallow breathing, this instructor intervention 232 also sends a hardware interrupt to microcomputer 80a which is immediately serviced by Interrupt Routine 230.

Interrupt Routine 230 gets its name from the fact that an interrupt signal on the microcomputer's line 85 causes microcomputer 80a to stop whatever routine it is currently processing and jump to the instructions of the Interrupt Routine 230 in order to respond to the interrupt signal. To permit a subsequent return to the routine that was interrupted, if desired, the contents of the working registers and the address of the next instruction for the interrupted routine are pushed onto the microcomputer's stack, a last-in-first-out (LIFO) storage area of RAM 82. After the interrupt is processed, the information on the stack can be retrieved to resume processing of the interrupted routine.

The interrupt signals sent to microcomputer 80a on line 85 by selection switch coder 84 are coded to indicate the particular program routine selected. As can be seen in FIG. 11, the program routines available are Ventilation T1, Carotid Pulse T2, Hand Placement T3, Single Chest Compression T4, Chest Compression Rhythm T5, Heimlich Thrusts T6, Repeat Message TR, and Shallow Breathing TS. Also available, but not shown in FIG. 11, is a Pause Routine incorporated into Interrupt Routine 230.

To carry out their functions, the program routines can invoke Utility Subroutines 233. These utility routines are Message 234, A/D Conversion 235, Hand Position Check 236, scoring routines SCORC1 237, SCORC2 238 and SCORC3 239, and Input/Output 240. Message subroutine 234 outputs a message of a designated number via speaker 66 for voice feedback. A/D Conversion subroutine 235 takes readings from ventilation sensor 182 and compression sensor 195 and converts them to an eight-bit digital code (FIGS. 9A and 9B). Hand Position Check routine 236 gives corrective comments on the student's hand position for chest compressions.

The utility routines include three scoring subroutines: SCORC1 subroutine 237 scores and tallies the amount of each ventilation of the manikin's artificial lung or the depth of each chest compression, interjecting an immediate single brief (about ½ second) word of praise or criticism to the student via message subroutine 234. The SCORC2 subroutine 238 vocalizes the tally of the student's efforts for 15 successive chest compressions. The SCORC3 subroutine 239 voices a criticism of the rhythm of the student's 15 chest compressions.

The Input/Output subroutine 240 enables control of the panel lights 87a, carotid pulse transducer 91, and shallow breathing transducer 94.

Figures 12, 12A:
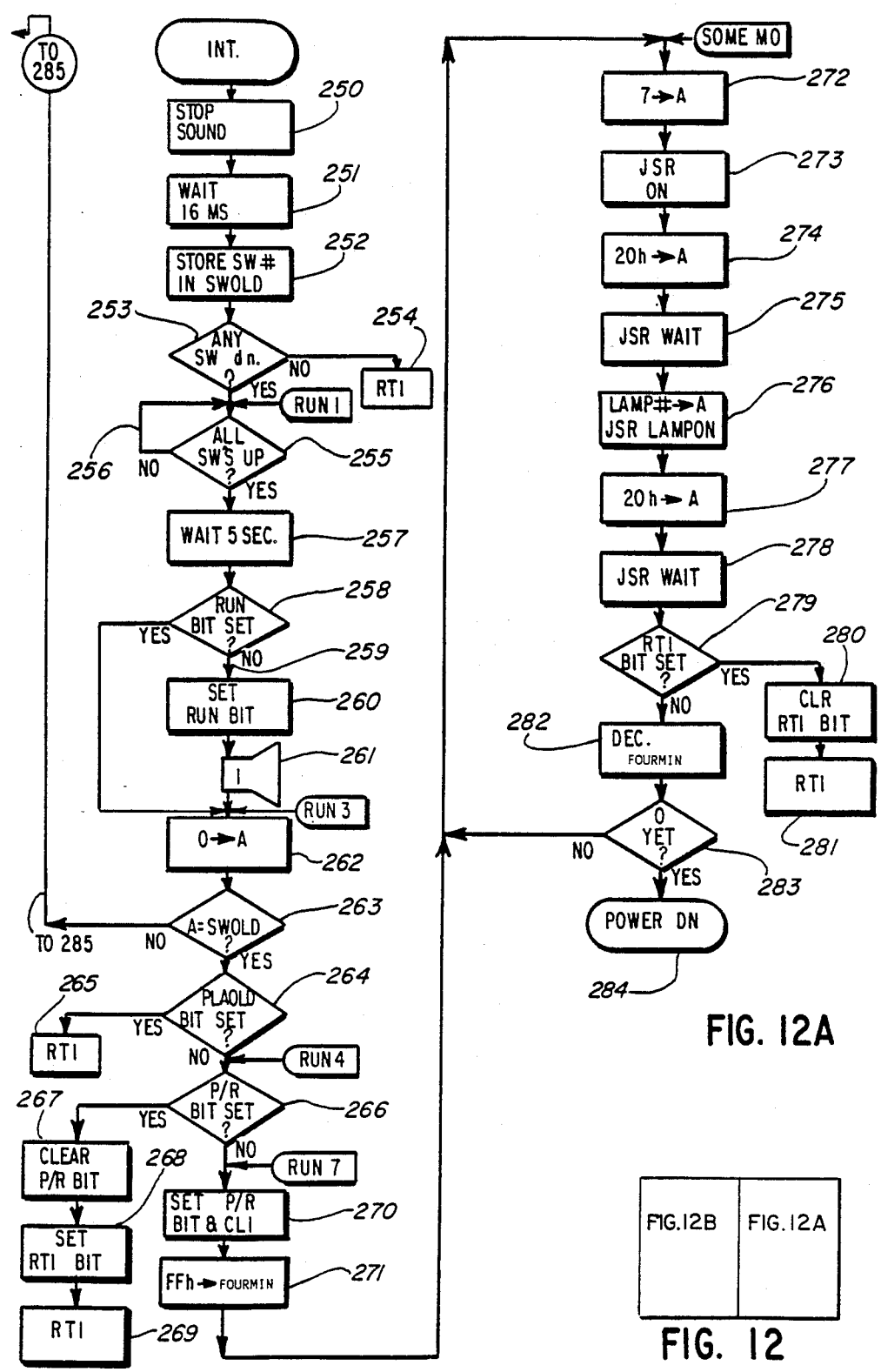
FIGS. 12, 12A and 12B are flow chart for an embodiment of the Interrupt Routine incorporated in the Control Program of FIG. 11 and includes the Repeat, Message Subroutine of FIG. 11.
Figure 12B:
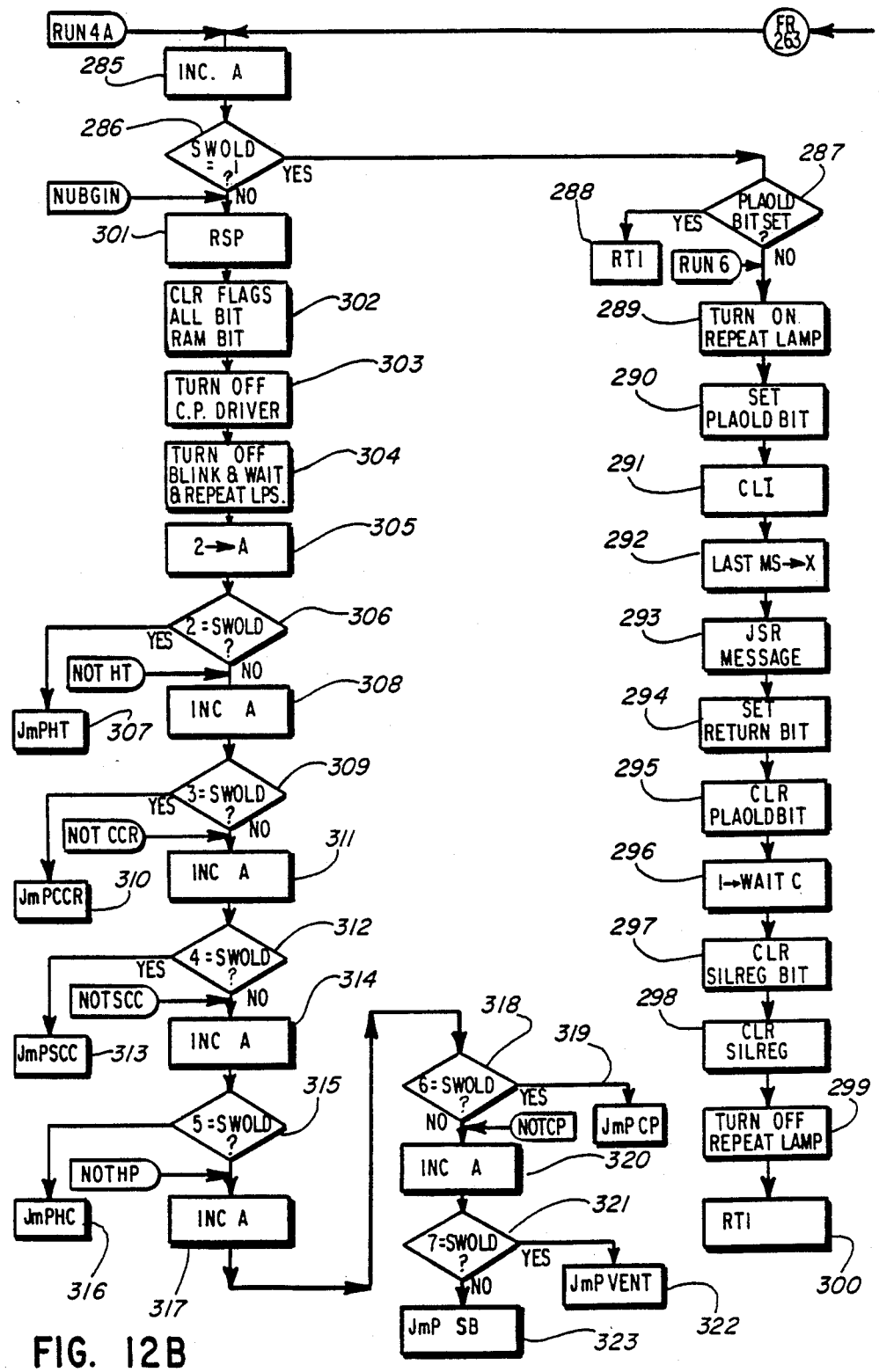

A flow chart for an embodiment of the interrupt routine is shown in FIG. 12. For convenience in programming the routine in assembly language, mnemonic labels have been added at certain key steps (e.g. see the label RUN1 at STEP 255). However, the description of this and other routines that follows ignores these occasional mnemonic labels and instead uses appended reference numbers.

Microcomputer 80a interrupts whatever program code it is processing and jumps to this routine whenever selection switch coder 84 sends a coded interrupt. As microcomputer 80a might have been in the middle of playing a message, a control signal is sent to stop the sound to speaker 66 (STEP 250). A short 16 ms wait is introduced (STEP 251) to block out any effects of bouncing of the switch contacts of selection switches 56-63. Switch coder 84 sends a coded interrupt giving the number of the selection switch that was pressed; this number is stored as SWOLD (switch old) (STEP 252). To rule out the possibility of a brief noise transient causing the interrupt signal, a check is made to see if some selection switch is still down, that is, is the interrupt signal still present on line 85 (STEP 253). If no switch is down, a false interrupt by a noise transient is assumed, and a return from interrupt (RT1) is made to resume the interrupted routine (254).

If a switch is down at STEP 253, a further check of the interrupt line is made at STEP 256 to see if all switches are now up (interrupt no longer present). If some switch remains down, the program loops back (STEP 256) until all switches are up. Before proceeding, a half-second delay is introduced to avoid the problems of too quick a response (STEP 257).

If the interrupt routine is running for the first time since the main voltage +V was turned on, the memory will be clear and a bit called RUN BIT will not be 1 (it will be 0). A check of RUN BIT is made (STEP 258). If RUN BIT is not 1, it is set to 1, and a welcoming Message 1 (see Appendix I) is voiced via the Message subroutine (STEP 261).

Now the interpretation of switch number SWOLD begins. The selection switches use the following code:

| SWOLD | SWITCH NAME | PART NUMBER |
|---|---|---|
| 0 | PAUSE/RESUME | 63 |
| 1 | REPEAT MESSAGE | 62 |
| 2 | HEIMLICH THRUSTS | 61 |

-continued

| SWOLD | SWITCH NAME | PART NUMBER |
|---|---|---|
| 3 | CHEST COMPRESSION RHYTHM | 60 |
| 4 | SINGLE CHEST COMPRESSION | 59 |
| 5 | HAND POSITION | 56 |
| 6 | CAROTID PULSE | 57 or 131 |
| 7 | VENTILATION | 58 |
| 8 | SHALLOW BREATHING | 134 |

A zero is loaded in the accumulator A (STEP 262) so SWOLD can be compared with 0 (STEP 263). If the P/R bit is not set to 1 (is 0), a PAUSE is desired, and the P/R bit is now set (STEP 270). An operation called CLI, Clear Interrupt Mask bit, is performed so that the PAUSE itself can be interrupted by the later pressing of a selection key, either the PAUSE/RESUME key or another selection key.

The PAUSE routine is designed to wait as long as 4 minutes for the PAUSE/RESUME button to be pressed again for RESUME. As a counter, the variable FOURMIN is set to hex FF (decimal 255).

While in the pause mode, the PAUSE/RESUME lamp 63a on control panel 53 (FIG. 2) and the lamp of the routine that was in progress before the PAUSE are alternately flashed. The accumulator A is set the code number (7) of the PAUSE/RESUME lamp 63a, and a service routine ON is called to turn on the lamp whose code is in accumulator A. A half second delay (512 ms) is introduced by setting A to hex 20 (decimal 32) in STEP 274 and calling a service subroutine WAIT (STEP 275) that introduces a delay of 16 ms times the number in Accumulator A.

The lamp number of the interrupted routine, found as the current value of a variable LAMP, is then loaded in the accumulator A and service routine ON called to light the indicated lamp (STEP 276) for a half second (STEPS 277 & 278).

If at STEP 279 a bit called RTI is found to have been set to 1 (by a method to be explained shortly), the PAUSE is ended by clearing the RTI bit to 0 and executing a RETURN FROM INTERRUPT (RTI) to resume the routine interrupted by the PAUSE. On the other hand, if the RTI bit is not yet set, the variable FOURMIN is decremented by 1 (STEP 282) and if it is not yet 0 (STEP 283) the program loops back to STEP 272 to blink the lamps again. If FOURMIN does get decremented to zero, four minutes have elapsed since the PAUSE button was pressed and the system enters the lower power standby mode by turning off the main voltage +V.

If at STEP 266 the bit called P/R is found to be a 1, a PAUSE is already in progress and the current pressing of PAUSE/RESUME indicates that a RESUME is desired. The P/R bit is cleared to 0, the bit called RTI is set to 1 to indicate that the PAUSE should be ended the next time STEP 279 is passed. Next a return from interrupt (RTI) is made (STEP 281) that transfers control back to the loop of steps between STEPS 272 and 283 used to implement the PAUSE. In other words, the way to end the PAUSE is to interrupt it for a brief interval by pressing the PAUSE/RESUME key again: this enables the RTI bit to be set to 1 at STEP 269, so that when the PAUSE is resumed it will terminate via STEPS 279, 280 and 281.

Returning to STEP 263, if SWOLD is not a 0, Accumulator A is incremented from 0 to 1 (STEP 285) and a check is made to see if SWOLD is a 1 (STEP 286), which would indicate that the REPEAT (last) MESSAGE button 62 was pressed. If it was, a check is made to see if a bit called PLAOLD is set (STEP 287). If it is not, a repeat of the last message played can be executed. The REPEAT MESSAGE lamp 62 on panel 53 is turned on (STEP 289), and to indicate to later interrupts that a REPEAT MESSAGE is in progress, the PLAOLD bit is set to 1 (STEP 290). The operation called CLI, Clear Interrupt Mask bit, is performed (STEP 291) so that the REPEAT MESSAGE itself can be interrupted by the later pressing of a selection key.

The message number of the last message is found from the current value of the variable LASTMS (last message), which is loaded in register X (STEP 292) and the subroutine Message is called to play the message whose number is in register X.

A bit called the RETURN bit is set (STEP 294) so that should the interrupt end with control resuming in the playing of message, that message will be aborted (having already been replayed by the REPEAT MESSAGE button). Since the message desired has been fully repeated, the PLAOLD bit is now cleared (STEP 295).

If the REPEAT MESSAGE button was pressed while a WAIT subroutine was being executed, the WAIT should be preferably aborted when control is passed back to it, so the student can act on the repeated message. Such an abort or quick return is enabled by setting a variable WAITC to 1 (STEP 296). Similarly, a bit called SILREG (silence register) bit and a variable called SILREG (silence register) are zeroed (STEPS 297 & 298) to remove any now unnecessary voicing pauses when control is resumed by the interrupted routine. The REPEAT MESSAGE lamp is turned off (299) and a Return From Interrupt (RTI) is executed (300).

Returning to STEP 287, if the PLAOLD bit is set, a REPEAT MESSAGE must already be in progress (see STEP 290). The REPEAT MESSAGE button must have been pushed and should be ignored, which is done by terminating the interrupt by a Return From Interrupt (RTI).

Returning to STEP 286, if SWOLD is not a 1, one of the other selection buttons must have been pressed for a switch to a fresh teaching routine; there will be no Return From Interrupt (RTI) to the interrupted routine. Since there will be no return from the interrupt, a Reset Stack Pointer (RSP) instruction is executed (STEP 301). As housekeeping measures before executing the new routine, the microcomputer's flags are cleared (STEP 302), and the byte ALLBIT and a byte called RAMBIT are cleared (STEP 302), the carotid pulse driver 92 is turned off (should it be on), and a service routine LAMPS is called to turn off the READY (also called "WAIT[ING]") or REPEAT MESSAGE lamps.

STEPS 305, 306 load a 2 into Accumulator A and compare it with SWOLD. If SWOLD is 2, there is a jump to the Heimlich Thrusts teaching routine (STEP 307). Otherwise, STEPS 308, 309 increment Accumulator A from 2 to 3 and compare it with SWOLD. If SWOLD is 3, there is a jump to the Chest Compression Rhythm routine (STEP 310). Otherwise, STEPS 311, 312 increment Accumulator A from 3 to 4 and compare it with SWOLD. If SWOLD is 4, there is a jump to the Single Chest Compression teaching routine (STEP 313).

Similarly in STEPS 314, 315, if SWOLD is 5, there is a jump to the Hand Position teaching routine (STEP 316). In STEPS 317, 318, if SWOLD is 6, the jump is to the Carotid Pulse teaching routine (STEP 319). In STEPS 320, 321 if SWOLD is 6, there is a jump to the Ventilation teaching routine (STEP 322). Otherwise, at STEP 323 a jump is made to the Shallow Breathing routine.

Thus the Interrupt Routine acts as the central routine by which the student, or the instructor by intervention, can select the next routine to be run, or interrupt a currently running routine for a quick repeat of the last message or a pause of up to four minutes.

3. VENTILATION TEACHING ROUTINE

Figure 13B:
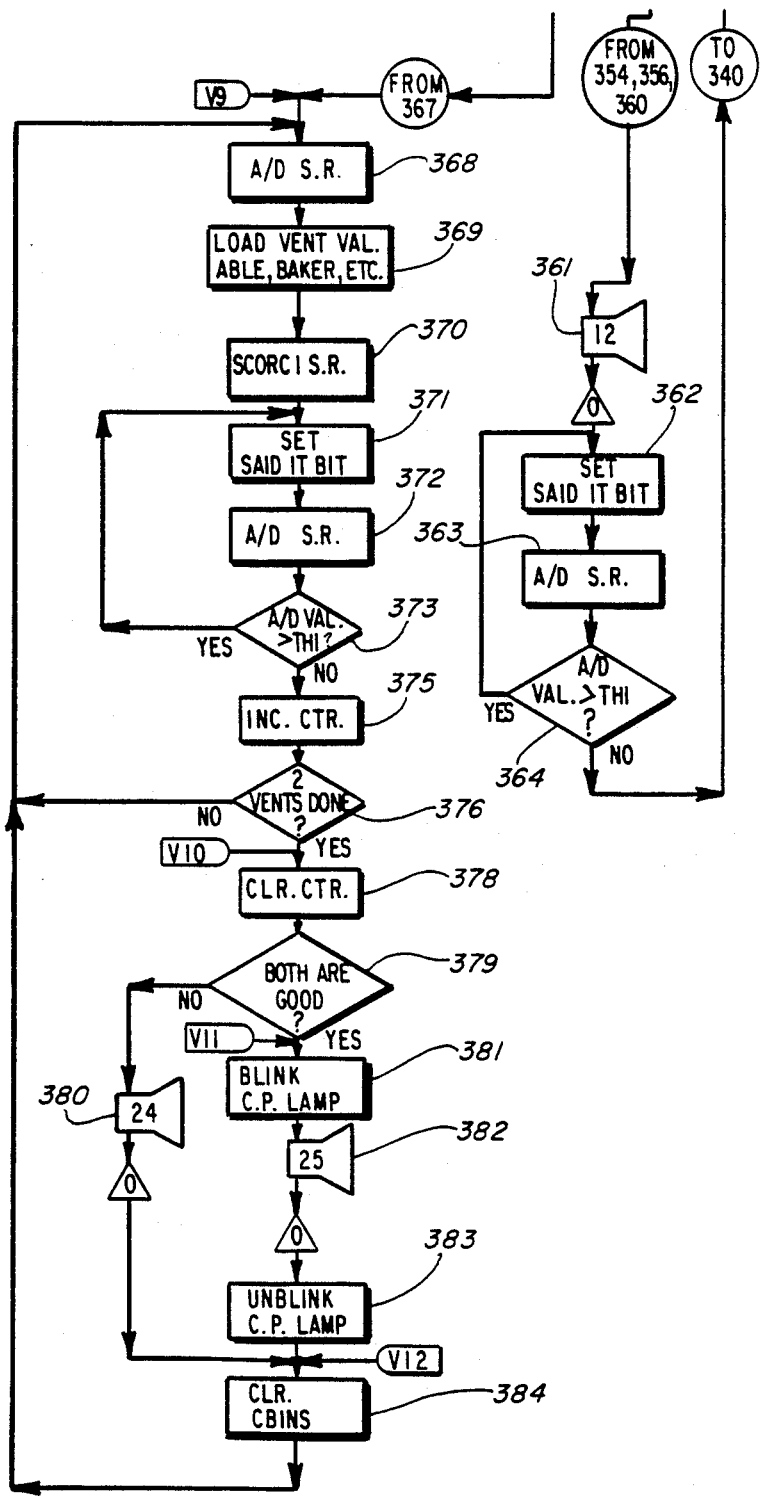

FIG. 13 shows a flow chart of an embodiment of the Ventilation Teaching Routine for practice of artificial respiration. The purpose of the routine is to have the student practice blowing air into the manikin's artificial lung until the student can do two successive correct single ventilations. Then the student practices multiple ventilations, two at a time.

The Ventilation routine begins by clearing the microcomputer's RAM 82 (STEP 330) and setting a noise reducing threshold value TH1 which a given ventilation sensor measurement must reach before being recognized as an effort by the student. The threshold TH1 is set to hex 32, which corresponds to threshold of 0.49 liters of air in the manikin's lung 184. Values in Range A of FIG. 9B and Table 2 are below the threshold. To show which routine is running, the AIRWAY VENTILATION lamp 58 is turned on (STEP 331).

To indicate various messages which are voiced by the Message routine, the flow chart of FIG. 13 includes a speaker symbol for each message, on which appears the number of the message. A complete listing of the messages by message number appears in Appendix I. Pauses introduced between the messages by the delay subroutine called WAIT are indicated by a triangle symbol, on which is written the number of seconds of delay. Since these pause symbols are self-explanatory, they will not be explicitly mentioned as numbered steps in the following description of the Ventilation and other routines.

STEPS 332–338 voice Messages 2–8 as instructions to the student for beginning artificial respiration. The result is as follows:

Ventilation. Open the airway by gently tilting the head way back. Press down on the manikin's forehead with the palm of one hand. With your other hand, lift either under the neck, near the base of the head, or with the fingertips, under the bony part of the jaw near the chin. Pinch off the manikin's nostrils. Open your mouth wide, take a deep breath, and make a tight seal with the manikin's mouth and blow. Try a single ventilation. I will tell you how you did.

A bit called the ADC bit is cleared to 0 (STEP 340) to indicate that the A/D Conversion utility subroutine should read in analog data from the ventilation sensor 118 rather than the chest compression sensor 116. Then the A/D subroutine is called (STEP 341). Whenever the A/D subroutine is called to take data, it begins by turning on READY lamp 65 on control panel 53 (FIG. 2), so the student will know the system is ready to monitor his efforts. When the student then tries blowing into the manikin's lung, the A/D subroutine quickly takes a series of sample readings of the ventilation sensor 118. When the student's effort has peaked, the A/D subroutine sets a variable called MAXVAL equal to the A/D converted peak or maximum value and returns control to the Ventilation routine.

If STEP 342 determines that MAXVAL is less than hex 7d (1.23 liters), the student's attempt lies in Range B and is too weak. If STEP 343 determines (from a counting variable called BADC1) that it is not yet the third time the student's attempt was in Range B, the counting variable BADC1 is incremented by 1 (STEP 344) and coaching Message 11 is voiced: Blow Harder. Then the routine proceeds to STEP 353.

On the other hand, if the student's attempts repeatedly fall in Range B, variable BADC1 will soon be incremented to a 2. In this case, after the third such weak attempt STEP 343 switches control to STEP 346. The variable BADC1 is cleared to zero and coaching messages 9 and 10 are voiced: "More air. Be sure that you're taking a deep breath and keeping a tight seal with the manikin's nostrils." Then the routine proceeds to STEP 353.

The coaching messages are voiced promptly after the student's attempt has peaked, with a natural timing, inflection, tone, and volume that simulates human coaching.

If STEP 342 finds that MAXVAL is equal to or greater than hex 7d, STEP 349 determines if MAXVAL is greater than hex 96. If it isn't, the student's effort lies in Range C (1.23–1.46 liters), still too little. Therefore, at STEP 350 Message 14 is voiced: "Close, but blow harder." Then the routine proceeds to STEP 353.

If STEP 349 determines that MAXVAL exceeds hex 96, STEP 351 determines if MAXVAL is greater than hex C8 (1.96 liters). If it is, the student's attempt lies in Range E or F and is too strong. Therefore, STEP 352 voices Mesaage 17: Good, but blow less forcefully. Then the routine proceeds to STEP 353.

The acceptable range for the student's efforts is 1.47–1.96 liters, Range D. Efforts in Range A will be below threshold. Efforts in Ranges B, C, E, and F all lead to STEP 353, which increments a counter variable BADC (bad count). Because the student has produced a bad ventilation, STEP 353 also penalizes him by setting to zero a counter variable GOODC (good count) used to count any acceptable ventilations in Range D.

STEP 354 checks variable BADC to see if 5 bad ventilations have accumulated. If BADC is currently less than 5, the routine jumps to STEP 361. But if 5 bad ventilations have accumulated, the student needs a fresh start with special instructor coaching. STEP 355 clears counter variables BADC1 and BADC and STEP 356 voices Message 13: "Please ask the instructor for help." Then the routine proceeds to STEP 361.

If STEP 351 determines that MAXVAL is not greater than C8, then the student's attempt lies in Range D and is acceptable. STEP 358 increments counter variable GOODC (good count). Because the student has now produced a good ventilation, STEP 358 also erases his past learning errors by setting to zero the "bad count" counter variable BADC. If STEP 359 determines that two good ventilations have not yet been produced, the student is praised at STEP 360, "Excellent", but the routine proceeds for more practice to STEP 361.

STEP 361 uses Message 12 to direct the student to "Try it again." STEP 362 sets a bit called SAIDIT to 1 to indicate that a maximum of the student's effort has already been determined and a critique voiced.

The microcomputer's response may be so prompt that the student is still in the process of blowing into the manikin, though the peak of his effort has passed. Therefore, STEP 363 calls the A/D subroutine to read and convert the current instantaneous value of the ventilation sensor, and set the variable ADVAL equal to it. Because the SAIDIT bit is set, the A/D subroutine will just give the instantaneous reading ADVAL and not try to determine a maximum from a series of readings as before. The A/D subroutine also clears the SAIDIT bit to 0.

STEP 364 determines if ADVAL exceeds the threshold TH1. If it does, the student is not through blowing and the routine loops to STEP 362 to again set the SAIDIT bit and take another instantaneous reading.

When ADVAL falls below the threshold TH1, the student is finished and ready to make a fresh effort. The routine loops back to STEP 340 to find the maximum of the student's fresh effort via the A/D subroutine.

Eventually the student will achieve two good ventilations in a row. The counter variable GOODC will become 2 and at STEP 359 the routine will go to STEPS 366 and 367, which respectively voice Messages 16 and 18: Perfect, now try giving two slow breaths. Blow into the manikin's mouth with complete refilling of your lungs after each breath.

STEP 368 calls the A/D subroutine to get the peak or maximum value of the first of the student's two efforts and store it as the variable MAXVAL. The ranges above threshold, B, C, D, E, and F, have the respective maximum hex values 7C, 95, C8, and E1. These are respectively stored under the variable names ABLE, BAKER, CHUCK, and DOG (STEP 369), and then the scoring subroutine SCORC1 is run. Depending on the value of MAXVAL, SCORC1 will voice one of the following brief words of criticism or praise, and increment one of the following counter variables:

TABLE 3

| MAXVAL (HEX) | OUTPUT OF SCORC1 | | | |
|---|---|---|---|---|
| | RANGE | BRIEF CRIT. | MESS. # | INCREMENT COUNTER |
| 32–7C | B | MORE! | 19 | CBIN1 |
| 7D–95 | C | MORE | 20 | CBIN1 |
| 96–C8 | D | GREAT | 21 | CBIN2 |
| C9–E1 | E | LESS | 22 | CBIN3 |
| E2–FF | F | LESS! | 23 | CBIN3 |

The single short word of praise or criticism MORE!, MORE, GREAT, LESS, OR LESS!, is an important feature of the invention since it can be voiced in the brief time between the student's efforts, yet gives immediate aural feedback, including inflection, tone, volume, and urgency. This feedback technique is also used in the chest compression rhythm sequence, where typically there is only about 0.6 seconds between chest compressions. Because such short words can be voiced in about 0.3 seconds, they are effective in giving immediate feedback and advice after each compression.

Then STEPS 371 AND 372 wait for the student to finish the current attempt in same manner as STEPS 362 and 363 described above. A counter CTR is incremented (STEP 375) to keep track of the number of attempts by the student. If the count in counter CTR is not equal to or greater than two, the routine loops back to STEP 368 for the second of the student's two efforts.

When counter CTR shows that two efforts have been processed in this manner, the counter CTR is cleared (STEP 378). The number of good ventilations will be in CBIN2. If this number is not two, STEP 380 voices Message 24: Try giving two breaths again. Then STEP 384 clears the counter variables CBIN1, CBIN2, and CBIN3 and the routine loops back to STEP 368 for the student to try again.

If at STEP 379 the number in CBIN2 was two (both ventilations good), the student is ready to try the next teaching routine. The lamp 57a for the Carotid Pulse routine is blinked (STEP 381), and STEP 382 voices Message 25: "Excellent ventilation. If you feel confident, practice checking the carotid pulse. If you don't, try giving two breaths again."

STEP 383 stops the blinking of the Carotid Pulse lamp, and STEP 384 clears the counter variables CBIN1, CBIN2, and CBIN3. Although the routine loops back to STEP 368 for the student to try again, he can break out of the ventilation routine by pressing the selection button for another routine, such as the following.

CAROTID PULSE TEACHING ROUTINE

Figure 14:
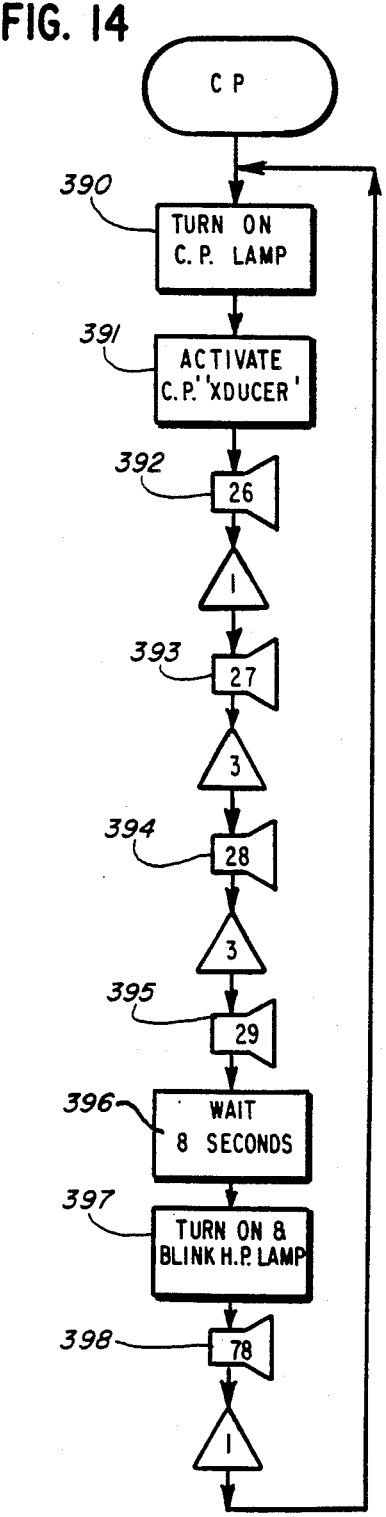
FIG. 14 is a flow chart for an embodiment of the Carotid Pulse Teaching Routine incorporated in the Control Program of FIG. 11.

FIG. 14 shows a flow chart of an embodiment of the Carotid Pulse Teaching Routine for practice in locating and feeling the carotid pulse simulated in the manikin's neck by the carotid pulse transducer 91. STEPS 390 and 391 turn on the Carotid Pulse lamp 57a and activate the carotid pulse transducer 91. STEPS 392-395 respectively voice Messages 26-29, with the following result:

Carotid pulse. The carotid pulse is located on either side of the Adam's Apple. Gently, try to sense it with the index and middle fingers of one hand. Maintain the head tilt with the palm of your other hand. If you have difficulty checking it, please ask the instructor for help.

STEP 396 provides about an eight-second pause for the student to carry out the procedure. The Hand Position lamp 56a is blinked (STEP 397) and Message 78 is voiced (STEP 398): Now practice the correct hand position. Although the routine loops back to STEP 390 for the student to try again, he can break out of the carotid pulse routine by pressing the selection button for another routine, such as the Hand Position routine.

HAND PLACEMENT TEACHING ROUTINE

Figure 15:
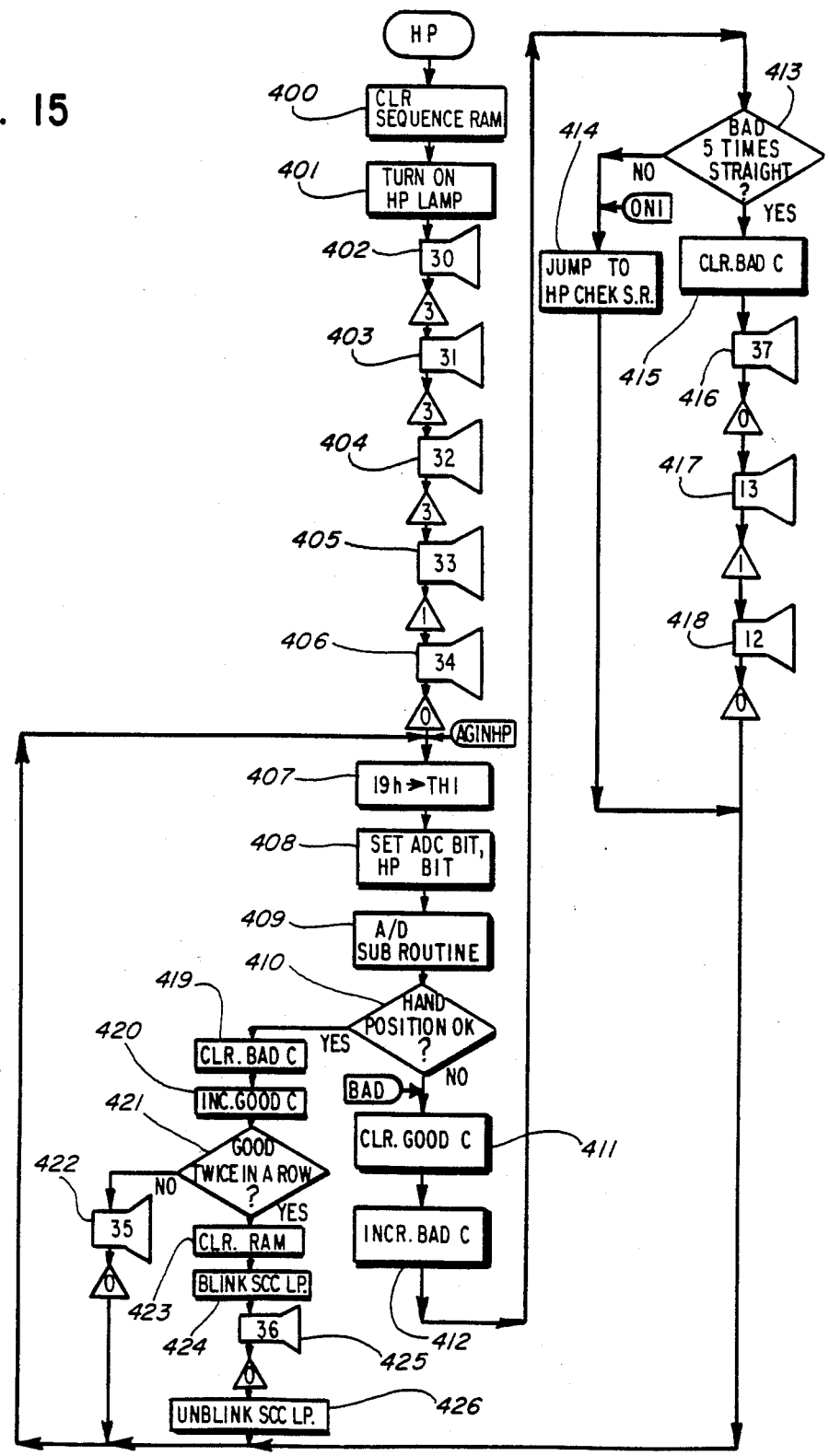
FIG. 15 is a flow chart for an embodiment of the Hand Placement Teaching Routine incorporated in the Control Program of FIG. 11.

FIG. 15 shows a flow chart of an embodiment of the Hand Placement Teaching Routine for practicing the correct position for the hand in chest compressions to restore circulation. The routine has the student reposition his hand and press down as many times as are needed to learn the correct location, giving feedback and advice each time. When the student can push down on the chest in the correct position twice in succession, he is encouraged to proceed to the Single Chest Compression routine.

The Hand Placement routine begins by clearing the microcomputer's RAM 82 (STEP 400) and turning on the Hand Placement lamp 56a. Then STEPS 402-406 voice Messages 30-34 which instruct the student how to position his hand on the manikin's chest as follows:

Hand position. Feel for the border of the manikin's ribs with the index and middle fingers of the hand closest to the manikin's waist. Move them upward along the rib cage until you reach the ribcage notch. Place the heel of your other hand just above the two fingers. Then place the first hand on top of it. Keep your fingers off the manikin's ribs. Push down, I will check your hand position.

STEP 407 sets a threshold value TH1 which a given chest compression sensor measurement must reach in order to exceed a background noise level before being recognized as an effort by the student. This threshold TH1 for practicing hand placement is set to hex 19 (decimal 25), corresponding to about 0.25 inches, which is about half the threshold used in practicing chest compressions, hex 32, corresponding to about 0.49 inches.

A bit called the ADC bit is set to 1 (STEP 408) to indicate that the A/D Conversion utility subroutine should read in analog data from the chest compression sensor 116 rather than the ventilation sensor 118. STEP 408 also sets a bit called the HP bit to 1 to indicate to the upcoming A/D utility subroutine that only hand position data (HPSTORE) is needed, not a maximum of chest compression (MAXVAL).

Then the A/D subroutine is called (STEP 409). When the A/D subroutine lights READY lamp 65, the student places his hand on the manikin's chest and tries pushing down. The A/D subroutine quickly takes a series of sample readings until the threshold TH1 has been exceeded. When the threshold has been passed, the A/D subroutine reads the positions of normally closed hand position switches S3, S6. S9, S12 of FIGS. 4 and 8C. Then it adjusts the four least significant bits HS0, HS1, HS2 and HS3 of a byte in memory called HPSTORE in accordance with the switch positions:

| |
|---|
| If S3 is CLOSED, HS0 = 1; otherwise HS0 = 0 |
| If S6 is CLOSED, HS1 = 1; otherwise HS1 = 0 |
| If S12 is CLOSED, HS2 = 1; otherwise HS2 = 0 |
| If S9 is CLOSED, HS3 = 1; otherwise HS3 = 0 |

If STEP 410 determines that any of bits HS0, HS1, HS2, HS3 is a 0, the student's hand position is not acceptable. The routine goes to STEP 411 where the counter variable GOODC is cleared to zero and the counter variable BADC is incremented by 1 (STEP 412). If STEP 413 determines that there have not yet been five successive bad attempts at hand position (BADC is less than five), STEP 414 calls the utility subroutine Hand Position Check. The Hand Position Check subroutine immediately voices one or more corrective messages about the student's hand position:

| HPSTORE BIT | (CAUSED BY) | MESS # | MESSAGE |
|---|---|---|---|
| HS0 = 0 | (S3 OPEN) | 40 | Off Center |
| HS1 = 0 | (S6 OPEN) | 39 | Too Low! |
| HS2 = 0 | (S12 OPEN) | 38 | Too High |
| HS3 = 0 | (S9 OPEN) | 40 | Off Center |

Then STEP 414 voices Message 41: "Release compression! Try it again!" The routine then loops back to STEP 407 so the student can try positioning his hand again.

If at STEP 413 it is found that five bad attempts have accumulated in BADC, the student needs a fresh start with special instructor coaching. Counter variable BADC1 is cleared and Messages 37, 13, and 12 are voiced as follows:

Your hand position is not quite right.
Please ask the instructor for help. Try it again.

Then the routine loops back to STEP 407 so the student can try positioning his hand again.

When STEP 410 determines that the student's hand position is acceptable, the routine goes to STEP 419 where the student's past mistakes are erased by clearing the counter variable BADC to zero. Then the counter variable GOODC is incremented by 1 (STEP 420). If STEP 421 determines that there have not yet been two successive acceptable attempts at hand position (GOODC is less than two), STEP 422 voices Message 35: "Fine. Remove and reset your hands. Try it again." Then the routine loops back to STEP 407 for a new try.

When STEP 421 determines that the student has achieved two successive acceptable hand position efforts (GOODC=2), STEP 423 clears the RAM. The Single Chest Compression lamp 59a is blinked (STEP 424) and Message 36 is voiced as follows (STEP 425):

Good, if you feel confident, you should now practice a single chest compression. If you don't, try it again.

STEP 426 then turns off the blinking Single Chest Compression lamp. Although the routine next loops back to STEP 407 for the student to try again, he can break out of the hand placement routine by pressing the selection button for another routine, such as the Single Chest Compression routine.

6. SINGLE CHEST COMPRESSION ROUTINE

Figure 16:
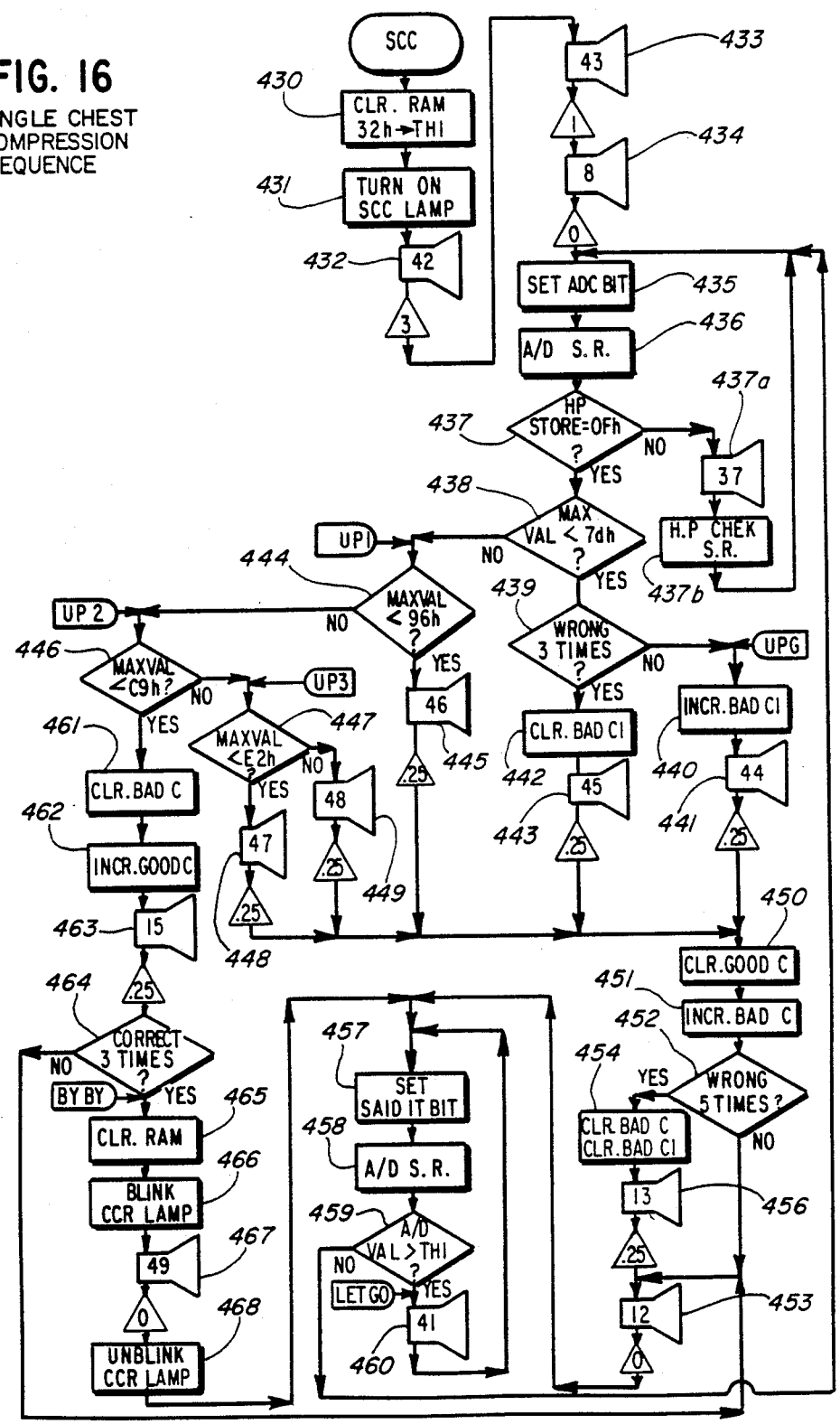
FIG. 16 is a flow chart for an embodiment of the Single Chest Compression Teaching Routine incorporated in the Control Program of FIG. 11.

FIG. 16 shows a flow chart of an embodiment of the Single Chest Compression (SCC) Teaching Routine for practice of chest compressions to restore circulation during cardiac arrest. The routine has the student practice doing single chest compressions of the correct depth, giving feedback and advice each time until the student can do three successive correct single compressions.

The SCC routine begins (STEP 430) by clearing the microcomputer's RAM 82 and setting a noise reducing threshold value TH1 which a given chest compression sensor measurement must reach before being recognized as an effort by the student. The threshold TH1 is set to hex 32, which corresponds to threshold of 0.49 inches. Values in Range A of FIG. 9B and Table 2 are below the threshold. To show which routine is running, the CHEST COMPRESSION DEPTH lamp 59a of FIG. 2 is turned on (STEP 431).

STEPS 432-434 voice Messages 42, 43, and 8 as follows, as instructions to the student for beginning chest compressions:

Single chest compression. Take the correct hand position, your elbows locked and your shoulders directly over the sternum. The chest should be compressed smoothly one and one half to two inches. Try a single chest compression. I will tell you how you did.

The ADC bit is set to 1 (STEP 435) to indicate that the A/D Conversion utility subroutine should read in analog data from the chest compression sensor 116 rather than the ventilation sensor 118. Then the A/D subroutine is called (STEP 436). The A/D subroutine turns on READY lamp 65 on control panel 53 (FIG. 2) so the student will know the system is ready to monitor his efforts.

When the student places his hands on the manikin's chest and tries a chest compression, the A/D subroutine quickly takes a series of sample readings of the chest compression sensor 116. When the student's chest compression has reached its maximum, the A/D subroutine sets a variable called MAXVAL equal to the A/D converted maximum value.

As described in connection with the Hand Placement Routine, the A/D subroutine also reads hand position switches S3, S6, S9, S12 and stores a hand position report in the four least significant bits of the byte in memory called HPSTORE. The A/D subroutine then returns control to the SCC routine.

If the student's hand position is correct, the four least significant bits of HPSTORE will all be 1's. Because the (unused) four most significant bits of HPSTORE are kept 0, HPSTORE will be hex 0F (binary 00001111) when the hand position is correct. If STEP 437 determines that HPSTORE is not hex 0F, STEP 437a voices Message 37: "Your hand position is not quite right." Then STEP 437b calls the Hand Position Check subroutine. As described in connection with the Hand Placement Routine, the Hand Position Check (HPCHEK) subroutine verbally reports what is wrong with the student's hand position (Too High, Too Low!, or Off Center). After the HPCHEK routine winds up with Message 41 ("Release compression! Try it again!"), the SCC routine loops back to STEP 435 for the student to try again until he gets the correct hand position.

When STEP 437 finds that HPSTORE is hex 0F, the hand position is correct and STEP 438 determines if MAXVAL is less than hex 7d (1.23 inches). If it is, the student's compression lies in Range B and is too shallow. If STEP 439 determines (from checking counting variable BADC1) that it is not yet the third time the student's attempt was in Range B, the counting variable BADC1 is incremented by 1 (STEP 440) and coaching Message 44 is voiced: "Too shallow." Then the routine proceeds to STEP 450.

On the other hand, if the student's attempts repeatedly fall in Range B, BADC1 will soon be incremented to a 2. In this case, after the third such shallow attempt STEP 439 switches control to STEP 442. Because of the successive errors, the student needs a fresh start and some advice. The variable BADC1 is cleared to zero and STEP 443 voices Message 45:

Too shallow! Be sure that you're pressing straight down, your elbows locked and your shoulders directly over the sternum.

Then the routine proceeds to STEP 450.

Should STEP 438 find that MAXVAL is equal to or greater than hex 7D, STEP 444 then determines if MAXVAL is less than hex 96. If it is, the student's effort lies in Range C (1.23-1.46 inches), still too little. Therefore, at STEP 445 Message 46 is voiced: "Close, but too shallow." Then the routine proceeds to STEP 450.

If instead STEP 444 determines that MAXVAL is equal to or greater than hex 96, STEP 446 determines if MAXVAL is less than hex C9 (1.96 liters). If it isn't, STEP 447 determines if MAXVAL is less than hex E2. If it is, the student's compression lies in Range E and is too deep. Therefore, STEP 448 voices Message 47: "Close but too deep." Then the routine proceeds to STEP 450.

But if STEP 447 determines that MAXVAL is greater than or equal to hex E2, the student's compression lies in Range F and is much too deep. Therefore, STEP 449 voices Message 48: "Too deep." Then the routine proceeds to STEP 450.

The acceptable range for chest compressions is 1.47-1.96 inches, Range D. Efforts in Range A will be below threshold. Efforts in Ranges B, C, E, and F all lead to STEPS 450 and 451, which clear counter variable GOODC (good count) and increment counter variable BADC (bad count).

STEP 452 checks variable BADC to see if 5 bad compressions have accumulated. If BADC is currently less than 5, the routine jumps to STEP 453. But if 5 bad ventilations have accumulated, the student needs a fresh start with special instructor coaching. STEP 454 clears counter variables BADC1 and BADC and STEP 456 voices Message 13: "Please ask the instructor for help." Then the routine proceeds to STEP 453.

If STEP 446 determines that MAXVAL is less than hex C9, then the student's attempt lies in Range D and is acceptable. Because the student has now produced a good compression, STEP 461 also erases his past learning errors by setting to zero the "bad count" counter variable BADC. STEP 462 increments counter variable GOODC (good count), and the student is praised at STEP 463: Excellent.

If STEP 464 determines from counter variable GOODC that three good ventilations have not yet been produced, the routine proceeds to STEP 453 for more practice.

STEP 453 uses Message 12 to direct the student to "Try it again." Then STEP 457 sets a bit called SAIDIT to 1 to indicate that a maximum of the student's effort has already been determined add a critique voiced.

The microcomputer's response may be so prompt that the student is still in the process of pressing on the manikin's chest, though the maximum of the compression has already occurred. Therefore, STEP 458 calls the A/D subroutine to read and convert the current instantaneous value of the compression sensor, and set the variable ADVAL equal to it. Because the SAIDIT bit is set, the A/D subroutine will just give the instantaneous reading ADVAL and not try to determine a maximum from a series of readings as before. The A/D subroutine also clears the SAIDIT bit to 0.

STEP 459 determines if ADVAL exceeds the threshold TH1. If it does, the student is not through compressing the manikin's chest. STEP 460 voices Message 41, "Release compression! Try it again!". Then the routine loops to STEP 457 to again set the SAIDIT bit and take another instantaneous reading.

When ADVAL falls below the threshold TH1 at STEP 459, the student is finished and ready to make a fresh effort. The routine loops back to STEP 435 to have the student do another compression.

Eventually the student will achieve three good compressions in a row. The counter variable GOODC will become 3 and at STEP 464 the routine will go to STEPS 465 and 466, which respectively clear the microcomputer's RAM 82 and blink the CHEST COMPRESSION RHYTHM lamp 60a. STEP 467 voices message 49: "Great, now practice chest compression rhythm or try it again." STEP 468 stops the blinking of lamp 60a.

The routine then proceeds to STEP 457 in case the student is still pressing on the manikin's chest. After clearing STEP 459, the routine loops back to STEP 435 for the student to try again. But the student can break out of the SCC routine by pressing the selection button for another routine, such as the Chest Compression Rhythm routine.

7. CHEST COMPRESSION RHYTHM ROUTINE

Figure 17B:
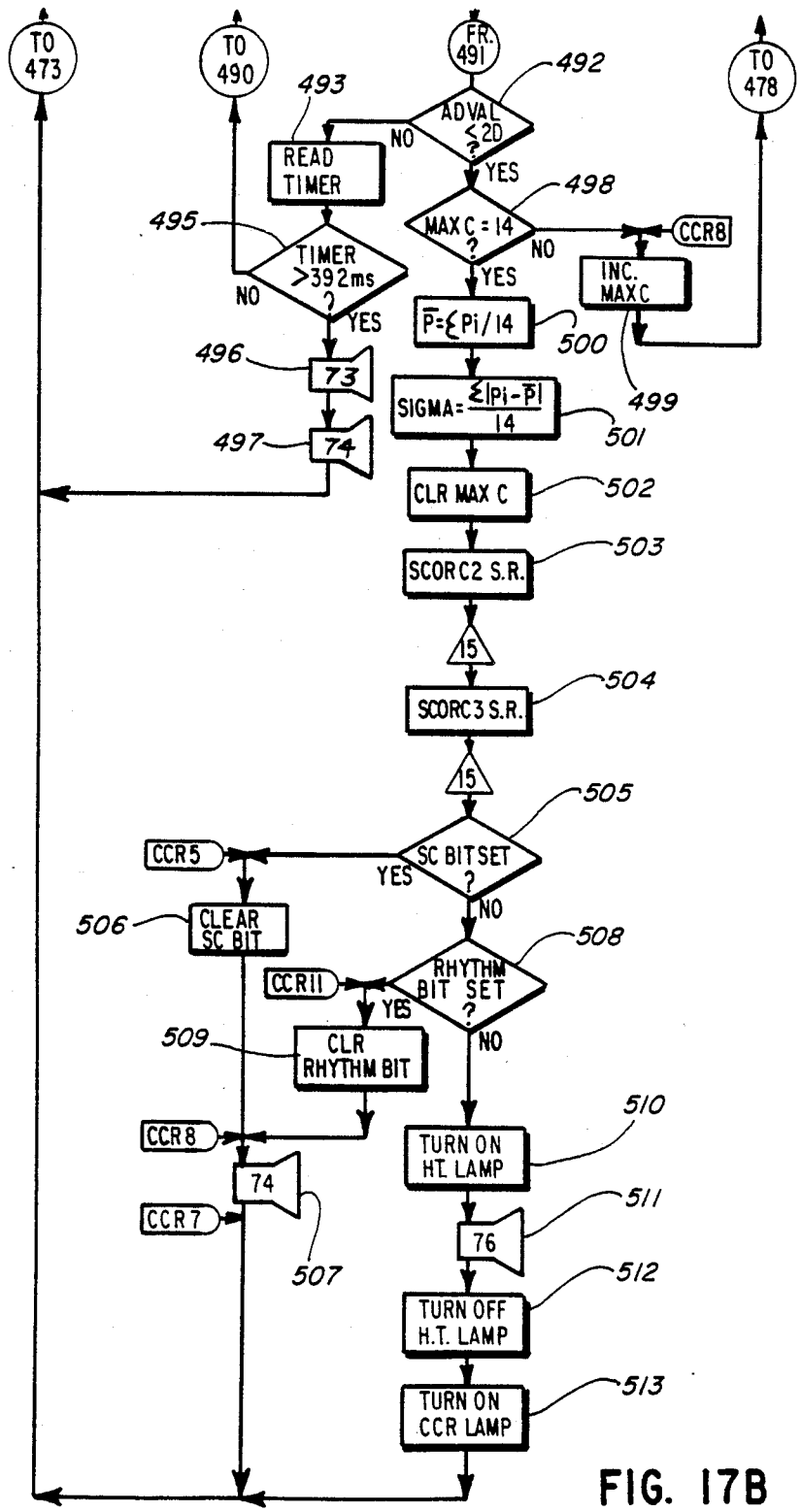

FIG. 17 shows a flow chart of an embodiment of the Chest Compression Rhythm (CCR) teaching routine for practicing fifteen successive chest compressions at about 80–100 compressions per minute. The student is forced to restart if during any compression he uses an incorrect hand position or fails to come all the way up from the compression. As each chest compression passes its maximum, the student gets a word of praise or criticism. As soon as the fifteen compressions are completed the student receives a voice summary of how many compressions were excellent, too shallow, or too deep. The student is also told if the rhythm of his fifteen chest compressions was excellent, too fast or slow, or irregular.

The CCR routine begins (STEP 470) by turning on the CHEST COMPRESSION RHYTHM lamp 60a. STEPS 471, 472 voice Messages 50 and 8 as follows, as instructions to the student for beginning this routine:

Chest compression rhythm. Give fifteen chest compressions smoothly, no bouncing, using a one and two and three and four . . . . to fifteen cadence. Come all the way up between compressions. I will tell you how you did.

The microcomputer's RAM 82 is cleared (STEP 473) and the threshold value for the chest compressions TH1 is set to hex 32, corresponding to 0.49 inches (STEP 474). Values in Range A of FIG. 9B will below the threshold.

The ranges above threshold, B, C, D, E, and F, have the respective maximum hex values 7C, 95, C8, and E1. These are respectively stored under the variable names ABLE, BAKER, CHUCK, and DOG (STEP 475), and then the ADC bit is set to 1 (STEP 476) to indicate that the A/D Conversion utility subroutine should read in data from the chest compression sensor 116. Then to tag the first chest compression, a bit 1STCC is set to 1 (STEP 477), and STEP 478 calls the A/D subroutine to get data on the student's hand position in HPSTORE and the maximum of the converted compression in MAXVAL.

As in the Single Chest Compression (SCC) routine (see STEP 437), the correct hand position is confirmed if HPSTORE is hex 0F (STEP 479). If it is not, a counter variable MAXC used to count which compression is currently being processed is cleared to 0 (STEP 480), and STEP 481 voices Message 37: "Your hand position is not quite right." STEP 482 calls the Hand Position Check (HPCHEK) utility subroutine 400, which verbally reports what is wrong with the student's hand position. After the HPCHEK routine winds up with Message 41 ("Release compression! Try it again!"), the CCR routine loops back to STEP 473 for the student to begin again with the correct hand position.

If the hand position is correct at STEP 479, an eight-bit timer mechanism on board microcomputer 80a is configured or initialized (STEP 483) so when started it will use the 125 Hz timer clock input at the microcomputer's TIMER input from frequency divider 113 of FIG. 4. In FIG. 4 the timer mechanism in microcomputer 80a is represented by its eight bit timer data register TDR, which can be read for the current value of the on board timer.

If the 1STCC bit is set (STEP 484), the current compression is the first of the 15 and STEPS 486 and 487 can be omitted. The 1STCC bit is cleared, and the routine proceeds to STEP 488, where the microcomputer's timer is started. Just a few steps earlier, the A/D subroutine called by STEP 478 will have returned immediately after finding a maximum in the depth of the student's compression. Microcomputer 80a is running at 8.0 MHz. Therefore, to a good approximation in determining the period of the compression, STEP 488 starts the microcomputer's timer immediately after a compression has reached its maximum depth.

In a manner similar to that used in the Ventilation routine (see STEP 370), STEP 489 now calls scoring subroutine SCORC1 to immediately comment on the value of MAXVAL (compression maximum) obtained by the A/D subroutine at STEP 478:

TABLE 4

| | | OUTPUT OF SCORC1 | | | |
|---|---|---|---|---|---|
| MAXVAL (HEX) | RANGE | CHEST COMPRESSION (INCHES) | BRIEF CRIT. | MESS. # | COUNTER INCREMENTED |
| 32–7C | B | 0.49–1.22 | MORE! | 19 | CBIN1 |
| 7D–95 | C | 1.23–1.46 | MORE | 20 | CBIN1 |
| 96–C8 | D | 1.47–1.96 | GREAT | 21 | CBIN2 |
| C9–E1 | E | 1.97–2.21 | LESS | 22 | CBIN3 |
| E2–FF | F | 2.22–2.50 | LESS! | 23 | CBIN3 |

As can be seen in Table 4, the SCORC1 subroutine also accumulates the number of compressions that are too shallow, acceptable, and too deep by incrementing corresponding counter variables CBIN1, CBIN2, and CBIN3.

The student will now be occupied in trying to maintain a steady rhythm for 15 successive chest compressions at a rate that may leave as little as 0.6 second for each compression. It is an important feature of the invention that the one word brief criticisms of Table 4 can be voiced in about 0.3 second, enabling feedback by a prestored natural human voice having inflection, tone, volume and urgency.

As in the Single Chest Compression routine (see STEPS 457–460), the student must come up all the way from each compression. STEPS 490–493, 495–497 verify this using the A/D subroutine. The SAIDIT bit is set to 1 (STEP 490), enabling the A/D subroutine to determine ADVAL, the current instantaneous value of the compression sensor (STEP 491). The A/D subroutine also clears the SAIDIT bit to 0. STEP 492 determines if ADVAL is less than a Release Level of hex 2D (decimal 45), slightly less compression than the Threshold TH1. If ADVAL is not less than the Release Level, the timer data register TDR is read (STEP 493) to determine the interval since the last maximum of compression.

Table 5 is a Timer Conversion Table for the timer data register TDR. The microcomputer's timer receives a 125 kHz timer clock signal (clock pulse every 8 ms). This decrements the timer data register TDR every 8 ms from an initial value of hex 00 (interpreted as decimal 256). For example, it takes 49 clocks to decrement register TDR from hex 00 to hex CF, measuring an interval of 392 ms (49×8 ms).

TABLE 5

| | TIMER CONVERSION TABLE | | | |
|---|---|---|---|---|
| TIMER DATA REGISTER (HEX) | TIMER READING (DEC) | ELAPSED 8 MS CLOCKS | ELAPSED TIME MS | COMPRESSION FREQUENCY PER/MIN |
| 00 | 256 | 0 | 0 | — |
| FF | 255 | 1 | 8 | — |
| CF | 207 | 49 | 392 | 153 |
| B5 | 181 | 75 | 600 | 100 |
| A2 | 162 | 94 | 752 | 79.8 |
| 83 | 131 | 125 | 1000 | 60 |
| 40 | 64 | 192 | 1536 | 39 |
| 00 | 0 | 256 | 2048 | 29 |

At the lowest acceptable rate, 80 compressions/minute, the peak-to-peak period for one compression will be 750 ms, and the time from a maximum to a minimum will be a half period of 375 ms. STEP 495 uses a reading of timer data register TDR (STEP 493) to determine if the interval since the last maximum of compression is greater than a Cutoff of 392 ms (a Cutoff interval slightly more than the 375 ms half period associated with 80 compressions per minute.) This is equivalent to asking, "Is register TDR less than hex CF?"

If more than 392 ms have not elapsed since the last compression maximum, the routine loops back to STEP 490 for a new reading of ADVAL. If STEP 495 determines that more than 392 ms have elapsed, the student is not coming up all the way in releasing the compression. STEPS 496, 497 then voice Messages 73 and 74:

Come all the way up between compressions.
Give fifteen chest compressions again.

Then the CCR routine loops back to STEP 473 for the student to restart the series of fifteen compressions.

If the student is coming up all the way between chest compressions, at STEP 492 ADVAL will become less than hex 2D before 392 ms have elapsed. The routine will proceed to STEP 498, which determines, from the value of a counter variable MAXC, if there have been 14 previous compressions. If there haven't, the counter variable MAXC is incremented at STEP 499, and the routine loops back to STEP 478 so the student's next compression can be processed.

After the first compression, bit 1STCC will not be set to 1 when STEP 484 is reached. Therefore, STEP 486 will read register TDR to determine a compression period in accordance with Table 5. For example, at STEP 486 the TDR register might be found to have been decremented to hex B5. In such case, 600 ms would have elapsed between the previous maximum (when the timer was started) and the current maximum. In a series of fifteen compressions, the peak-to-peak period can be measured fourteen times in this way. Each measured compression period is stored in memory in one of 14 bytes called PERIOD(MAXC), where MAXC is an index integer incremented from 1 to 14 as the routine repeatedly passes through STEP 499 for successive compressions.

As each successive measured period is determined at STEP 486, a running total is calculated at STEP 487 in the form:

Let TOTAL=TOTAL+PERIOD (MAXC)

where the expression on the right is evaluated first and then replaces TOTAL, and MAXC is the previously mentioned integer index variable indicating the most recently measured period.

Eventually, index variable MAXC will be incremented to 14. Then the next (15th) time a compression maximum is measured and the routine executes STEP 498, the CCR routine will proceed to step 500. Beginning at this step some elementary statistics are calculated for the 14 measured compression periods, here denoted as $P_i$. A simple mean of P is computed (STEP 500) as follows:

$$\overline{P} = \frac{\sum_{i=1}^{14} P_i}{14} \quad \text{(Eq. 1)}$$

In fact, $\overline{P}$ can be calculated by dividing the variable TOTAL, which already equals the sum of the fourteen measured periods, by fourteen.

Then STEP 501 makes a computation, somewhat like that used for calculating the standard deviation, to determine SIGMA, an estimate of how much the 14 individual measured periods differ from the average:

$$SIGMA = \frac{\sum_{i=1}^{14} |P_i - \overline{P}|}{14} \quad \text{(Eq. 2)}$$

Equation 2 is introduced for computational simplicity, since only an estimate of the standard deviation is needed. However, if desired, microcomputer 80a can be suitably instructed to calculate the precise mathematical standard deviation, since it has sufficient computational power. As a housekeeping measure, the index variable MAXC is set to zero (STEP 502).

As mentioned in connection with STEP 489, during the fifteen compressions the SCORC1 subroutine accumulates the number of compressions that are too shallow, acceptable, and too deep by incrementing corresponding counter variables CBIN1, CBIN2, and CBIN3 (Table 4). Now STEP 503 calls the SCORC2 utility subroutine to select from among Messages 51-66 to report the results as follows:

(CBIN1) were too shallow.
(CBIN2) were great.
(CBIN3) were too deep.

where the appropriate number stored in the counter variable is voiced. Of course, if the number for any category is zero, there is no message about it.

Similarly, at STEP 504 the SCORC3 subroutine is called to report on the speed and evenness of the student's compression rhythm, based on the computations of STEPS 500 and 501. In fact, since the readings of the timer data register TDR at STEP 486 have a linear relationship to the compression period, the computations of Equations 1 and 2 (which are also linear) can be done on the TDR readings themselves. These can then be interpreted by Table 6:

TABLE 6

| INTERPRETATION OF AVERAGE TDR READING | | |
|---|---|---|
| AVERAGE PERIOD (MS) | AVERAGE TDR READING | WORDS USED IN MESSAGE |
| <600 | >B5 | Rhythm is too fast. |
| 600-752 | B5-A2 | Excellent rhythm. |
| >752 | <A2 | Rhythm is too slow. |

When Equation 2 is applied to the TDR readings themselves, if the resulting SIGMA is equal to or greater than hex 5 the compression rhythm is voiced as "Irregular". Since the timer clock pulses are spaced 8 ms apart, this corresponds to a SIGMA equal to or greater than 40 ms.

As can be seen from Messages 67-72, SCORC3 reports about the rhythm speed and regularity together in a single appropriately selected combined message. A typical message used by SCORC3 that combines the speed and rhythm comments is Message 67:

Rhythm is too fast and irregular.

SCORC2 sets a bit called SCBIT to 1 if CBIN2<10, i.e., less than 10 of the 15 compressions have the proper depth. If STEP 505 finds this bit is 1, the bit is cleared to 0 (STEP 506) and STEP 507 voices Message 74: "Give fifteen chest compressions again." Then the routine loops back to STEP 473 for the student to redo the fifteen compressions. Similarly, SCORC3 sets a bit called RHYTHM BIT to 1 if the rhythm is slow, fast, or irregular. If STEP 508 finds this bit is 1, the bit is cleared to 0 (STEP 509) and the routine proceeds to STEP 507.

If neither the SCBIT nor the RHYTHM BIT is set, the student's performance is satisfactory. The routine proceeds from STEP 508 to turn on the HEIMLICH THRUST lamp 61a (STEP 510), and STEP 511 voices Message 76:

If you feel confident, practice clearing the airway. If you don't, give fifteen chest compressions again.

Then the HEIMLICH THRUST lamp is turned off (STEP 512), and the CHEST COMPRESSION RHYTHM lamp is turned back on (STEP 513). Although the routine loops back to STEP 473 for the student to try again, he can break out of the CCR routine by pressing the selection button for another routine, such as the Heimlich Thrust routine.

8. HEIMLICH THRUST TEACHING ROUTINE

Figure 18:
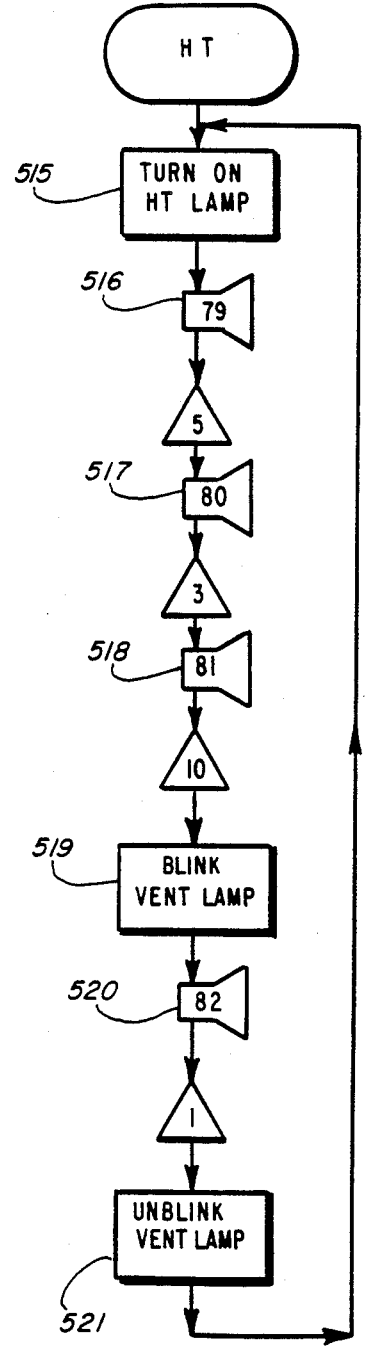
FIG. 18 is flow chart for an embodiment of the Heimlich Thrust Teaching Routine incorporated in the Control Program of FIG. 11.

FIG. 18 shows a flow chart of an embodiment of the Heimlich Thrust Teaching Routine for practice in clearing the manikin's airway of an obstruction, such as a piece of food. No measurements are made in this routine, but the student practices abdominal (Heimlich) thrusts on the manikin. However, if desired, the manikin can be fitted with suitable sensors for this routine, such as strain gages just above the navel. If such sensors are installed, the teaching routine can be elaborated to use and report the sensor data in a manner similar to the other teaching routines.

STEPS 515-518 respectively turn on the Heimlich Thrust lamp 61a and voice Messages 79-81:

Clearing the airway. Kneel astride the manikin's thighs. Place the heel of one hand slightly above the navel. Place the other hand on top of it. Press into the abdomen with quick upward thrusts. Each thrust should be distinct and delivered with the intent of clearing the airway. Do it ten times.

Then the AIRWAY VENTILATION lamp 58a is blinked (STEP 519) and STEP 520 voices Message 82: "When you feel confident, practice ventilating the manikin." Then the blinking of the AIRWAY VENTILATION lamp is halted. Although the routine loops back to STEP 515 for the student to try abdominal thrusts again, he can break out of the Heimlich Thrust routine by pressing the selection button for another routine, such as the Airway Ventilation routine.

9. STORAGE OF MESSAGES AND PHRASES a. Message Coding and Storage

Figure 19:
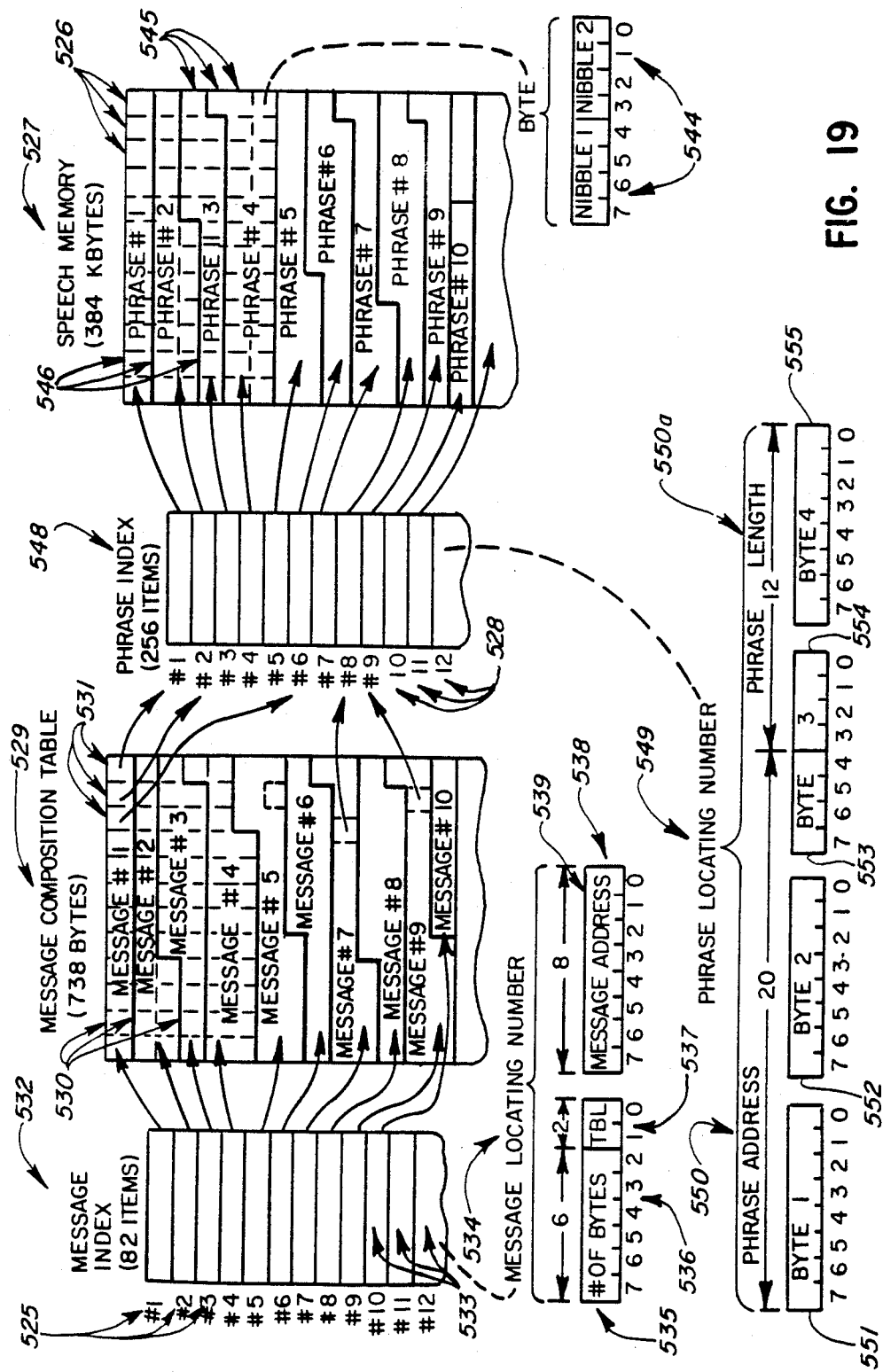
FIG. 19 is map showing how voice messages and phrases are stored in memory.
Figure 20:
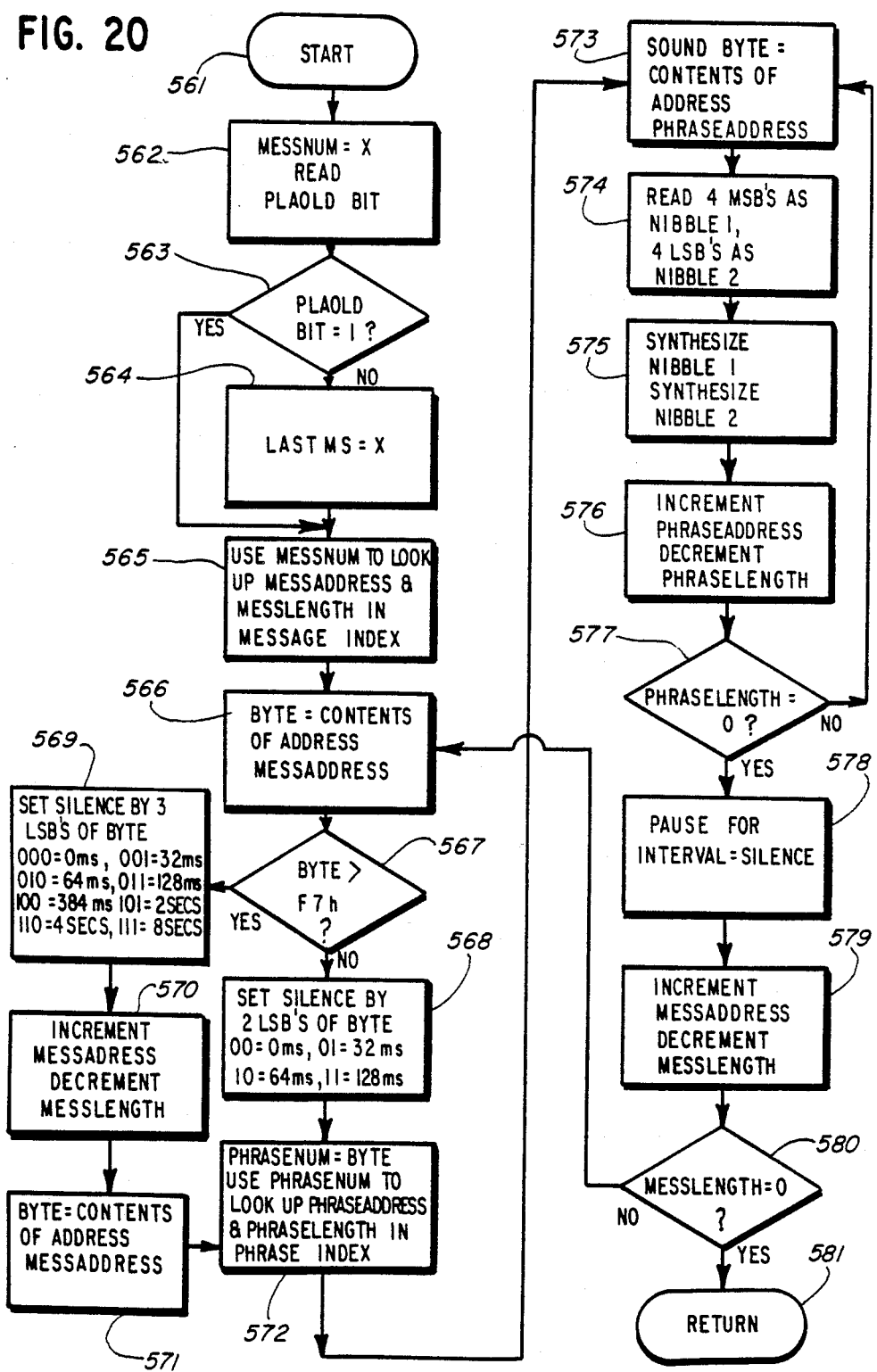
FIG. 20 is a flow chart for an embodiment of the Message Subroutine incorporated in the Control Program of FIG. 11.

FIG. 19 shows how voice messages and phrases are stored in memory. Each voice message is identified by a sequential message identification number 525 (Message Nos. 1, 2, 3, ...). A message 530 is composed of a series of short (less than 1 second) preselected phrases 546. The preselected phrases 546 are stored in a speech memory 527, external to the microcomputer unit. The speech memory can be implemented by a read only memory (ROM), such as a ROM semiconductor memory. In practice, a programmable read only memory (PROM) that can be programmed once, or an erasable programmable read only memory (EPROM) can be used for the speech memory.

By "phrase" is meant not the conventional linguistic unit, but any short sequence of sound which is, from an engineering point of view, convenient for encoding and storage. Thus, as used here a "phrase" may be a part of a word, a whole word, a linguistic phrase, or any portion of a linguistic phrase. Examples of such phrases are "PINCH OFF", "THE MANIKIN'S", "NOSTRIL", and "S".

For message coding purposes, each phrase is uniquely identified by an 8-bit (1 byte) phrase identification number 528. An eight-bit identification number provides for up to 256 different preselected phrases.

A message is specified by the particular series of 1-byte phrase identification numbers designating the phrases making up the message. For example, the message "PRESS DOWN" is composed of the phrases "PRESS" and "DOWN". If the phrase identification number for "PRESS" is 01110101 and the phrase identification number for "DOWN" is 11111001, the message "PRESS DOWN" is specified by the two bytes 01110101, 11111001.

A Message Composition Table 529, in which the messages 530 are sequentially stored, is provided in memory to hold the make-up of each message in terms of a series of 1-byte entries 531, each a phrase identification number, designating the phrases in the appropriate sequence to compose the message. The present embodiment provides for about 82 different messages, though this number can be increased if desired. Although the messages are of various different lengths, the capacity of the Message Composition Table 529 is sufficient to allow for an overall average length of up to 9 phrases per message. Since it takes 1 byte (8 bits) to identify each phrase in a message, the entire Message Composition Table can be only 738 (82×9) bytes long, enabling the Table to be stored in the onboard EPROM memory of the microcomputer unit.

A Message Index 532 is provided in memory to help locate the bytes composing a particular message stored in the Message Composition Table. The Message Index has 82 entries, corresponding to the 82 possible message identification numbers. The index entry 533 corresponding to a particular message number is a 16-bit (2 byte) message locating number 534. Thus, the entire Message Index is only 164 (82×2) bytes long, enabling it also to be stored in the onboard EPROM memory of the microcomputer unit.

In the first byte 535 of the message locating number, the six most significant bits (MSB's) 536 are read as a binary number indicating how many 1-byte phrase identification numbers compose the message. The six bits provide for messages composed of as many as $2^6=64$ preselected phrases.

To facilitate addressing with an 8-bit address bus, the 768 bytes of the Message Composition Table are subdivided into three smaller 256 byte Tables L, M, and N. The two least significant bits (LSB's) 537 of the first byte are read as a code indicating which of the Tables L, M, or N holds the message in question. The two-bit code is 00=L Table, 01=M Table, 10=N Table.

The second byte 538 of the message locating number is read as an 8-bit number 539 indicating the address location, in the appropriate table L, M, or N, where the first phrase identification number (a 1 byte number) of the message is stored. The remaining phrase identification numbers of the message follow in sequence.

In sum, given a message number, the Message Index gives the location and length of that message as encoded in the Message Composition Table. At the specified location in the Message Composition Table is a series of phrase identification numbers, each entry one byte long, which compose the message.

b. Phrase Coding and Storage

As each phrase is identified by a 1-byte phrase identification number, this provides for up to 256 preselected phrases. Each phrase is composed of a series of audio nibbles 544 stored in the speech memory. A nibble is a binary number of four bits, i.e. one-half byte long. It is convenient to use a speech memory that stores a byte (an 8-bit number) at each address. Therefore, the audio nibbles are grouped in pairs so that they can be stored and retrieved in bytes 545.

These audio nibbles are obtained by sampling an actual voice input signal for the phrase concerned and converting the sampled values to digital nibbles for later reproduction by a suitable speech synthesizer. Special equipment (not shown) for coding speech as binary numbers is commercially available, such as the SAS-1 Real-Voice Memory Processor sold by OKI Semiconductor of Santa Clara, Calif. In effect, such a speech encoder makes it possible to digitally prerecord sounds as nibbles, storing them in the speech memory for later reproduction.

The speech encoder of the OKI Processor (not shown) uses adaptive differential pulse-code modulation (ADPCM), a very efficient method of analog-to-digital conversion of a sampled analog signal. The OKI processor can be configured to take 8,000 samples per second of an input real voice audio signal. This permits the frequency of the sampled and stored voice audio to be as high as 4,000 Hz, i.e. half the sampling frequency, which is adequate to provide very natural-sounding voice reproduction.

In response to each sample, the speech encoder of the OKI Processor outputs a 4-bit (1 nibble) binary number. Since a nibble is one half byte, the sampling produces 4,000 bytes each second for storage in the speech memory 527. In other words, it takes 4,000 bytes stored in the speech memory to digitally store a phrase 1 second long.

In dealing with computer memories, it is common to work with a unit of measure equal to 1024 bytes, called a "kilobyte" or "KB" of memory. Therefore, a one-second phrase, when sampled, takes up about 4 KB (4 kilobytes) in the speech memory.

There are about 256 phrases 546 of different lengths stored in the speech memory 527. Although any one phrase can be as long as 4 KB (1 second), overall average duration is no more than 1.5 KB (0.375 seconds) per phrase. Therefore, the speech memory need have a capacity of only 384 KB (256×1.5K) to hold all the sampled phrases, which is a total of about 96 seconds of voice sounds.

Such a speech memory can be conveniently and inexpensively implemented from EPROM chips that have a 16-bit address input and that store 64KB each. Such EPROM chips are commercially available from Fujitsu (its memory chip 27C512) and others. The 16-bit address line provides for $2^{16}$ (64×1024) different address locations, each of which can store 1 byte of information. Six of these commercially available 64 KB EPROM chips will provide the 384KB speech memory capacity needed to store all the sampled phrases.

To play back the recording of a particular phrase, the audio nibbles making up the phrase are read from the speech memory and inputted one at a time to a digital-to-analog (D/A) speech synthesizer matched to reproduce the phrase as an audio signal. For this purpose, a matching ADPCM speech synthesizer integrated circuit chip is available from Oki Semiconductor: speech synthesizer chip MSM 5218.

The output of the speech synthesizer chip is passed through a low-pass filter having a high-frequency cutoff of about 4 kHz, amplified, and passed to an output speaker. For example, the low-pass filter can be conveniently implemented from a digital low-pass filter integrated circuit chip, such as National Semiconductor's MF6CN100, and the audio amplifier can also be any suitable amplifier circuit, such as National Semiconductor's LM388N2 integrated circuit amplifier chip.

A Phrase Index 548 is provided in memory to help locate the nibbles composing a particular phrase stored in the speech memory. The Phrase Index has 256 entries, corresponding to the 256 possible phrase identification numbers. The index entry corresponding to a particular phrase number is a 32-bit phrase locating number 549 occupying four successive bytes. Thus, the entire Phrase Index is only 1024 (256×4) bytes long, enabling it to be stored in the onboard EPROM memory of the microcomputer unit.

The 32-bit (4 bytes long) phrase-locating number 549 has two parts, a 20-bit phrase address 550 and a 12-bit phrase-length indicator 550a. In other words, given an 8-bit phrase identification number, of value 0–255, the Phrase Index gives the location and length of that phrase as stored in the speech memory. At the specified location in the speech memory is a series of bytes that contain the nibbles which store the phrase.

The 20-bit phrase address enables 550 up to $2^{20}$ addresses, a million memory addresses, to be individually specified. This is more than adequate to address any of the 384 kilobytes of speech memory. To facilitate addressing memory chips having a 16-bit address bus, the first 16 bits of the phrase address are interpreted as a 16-bit address in one of the six 64-KB speech memory chips. These 16 bits of the phrase address are found in the first two bytes 551, 552 of the phrase-locating number.

The remaining 4 bits of the phrase address are interpreted as a binary number, starting with zero, indicating the particular chip (0, 1, 2, 3, 4, 5) in which the phrase is stored. In the embodiment described, these 4 bits are the four least significant bits 553 of the third byte of the phrase-locating number.

Even though the phrases are stored as audio nibbles, the 12-bit phrase-length indicator 550a specifies the phrase length in bytes. That is, the phrase length is specified to the nearest byte. A 12-bit phrase-length indicator number enables a phrase as long as 4KB ($2^{12}$ bytes) to be specified. In the embodiment described, the four most significant of these 12 bits are the four most significant bits 554 of the third byte of the phrase locating number. The eight least significant of these 12 bits are the fourth byte 555 of the phrase-locating number.

In sum, given an 8-bit phrase-identification number, of decimal value 0–255, the Phrase Index gives the location and length of that phrase as stored in the speech memory. At the specified location in the speech memory is a series of bytes that contain the nibbles from which the phrase can be reproduced by the speech synthesizer chip.

c. Pause Coding

In natural speech, there are pauses (silence periods) between adjacent syllables or words that must be accounted for in coding the messages and the phrases used to form the messages. For example, the word "WELCOME" may be pronounced with a short pause, on the order of 60 milliseconds, between the syllables "WEL" and "COME". IF such a 60-millisecond pause is inputted to a speech encoder outputting 4 kilobytes of speech code per second, the 0.060 second pause would cause the output of 240 bytes of "pause" (no sound) nibbles for storage in the speech memory. This would be a very inefficient way to encode a "no sound" interval or pause. Therefore, three more efficient ways are used to encode pauses in the stored messages and phrases.

First, the 8-bit phrase-identification numbers are assigned to phrases in a way that indicates if there is normally a pause after the phrase. The two least significant bits (LSB's) of the 8-bit phrase-identification number are used as a code to assign the phrase to one of four subdivisions of the Phrase Index, called the S, T, U and V Tables. This 2-bit code is as follows:

| 2 LSB's | Table | Pause |
| --- | --- | --- |
| 00 | S | none |
| 01 | T | 32 ms |
| 10 | U | 64 ms |
| 11 | V | 128 ms |

First, when processing a phrase for reproduction, the two least significant bits of the phrase-identification number can be used as a control code to turn off the speech synthesizer for a suitable number of milliseconds after the phrase is synthesized, creating the desired pause.

The remaining six bits (six most significant bits) of the phrase-identification number enable up to 64 different phrases to be specified in each table.

Second, eight of the 8-bit phrase identification numbers are not used to identify phrases, and instead these eight numbers are reserved as pause-control codes. When a pause-control code is inserted in the message composition table before a phrase-identification number, the control code modifies the pause interval following the phrase represented by the phrase-identification number. For example, if a phrase-identification number belongs to Table S above, normally there is no pause after the phrase it identifies. But if a control code (e.g., 11111001) is inserted before the phrase-identification number, a 32-ms pause specified by the control code follows the phrase.

The pause control codes are inserted as needed before phrases when messages are encoded in the Message Composition Table. As the phrase-identification numbers composing a message are read out of the Message Composition Table, each control code is detected by the message processor, which then effectuates the necessary pause after the phrase which follows the control code.

The following phrase-identification numbers are reserved as pause control codes:

| Binary Number | Hex Value | Decimal Value | Pause Length |
|---|---|---|---|
| 11111000 | F8 | 248 | none |
| 11111001 | F9 | 249 | 32 ms |
| 11111010 | FA | 250 | 64 ms |
| 11111011 | FB | 251 | 128 ms |
| 11111100 | FC | 252 | 384 ms |
| 11111101 | FD | 253 | 2 sec |
| 11111110 | FE | 254 | 4 sec |
| 11111111 | FF | 255 | 8 sec |

The third method of adding or increasing pauses is to insert wait instructions in the control programs for the microcomputer unit before or after instructions calling for message reproduction. For example, a program instruction might call for Message #5, "PINCH OFF THE MANIKIN'S NOSTRILS," to be voiced by the speech synthesizer. Suppose a pause is needed after this message to allow the student time to respond before voicing the next coaching message. The pause can be introduced by following the instruction to voice Message #5 with an instruction to wait a predetermined number of milliseconds or seconds.

The wait instruction can be a suitable WAIT subroutine called whenever a pause is needed, provided that for the subroutine's reference a number indicating the desired length of the pause is first inserted in a suitably accessible register or memory location before calling the WAIT subroutine.

In sum, the identification number of a phrase indicates if the speech synthesizer should normally add a preselected pause after reproducing the phrase. In addition, some of the bytes composing a message in the Message Composition Table may be pause control codes for modifying the normal pause of the phrase that follows them. Pauses may also be introduced between messages by inserting a WAIT instruction in the microcomputer unit's control program.

10. MESSAGE SUBROUTINE a. General Flow

This subroutine plays a message whose message number is held in the X register when the subroutine is called. If the PLAOLD bit has been set, the message is a repeat of the previously played message.

To play a message, first, the preselected phrases which compose the message are determined. Then for each phrase, the encoded audio nibbles of the phrase prestored in the speech memory must be read out as input to the speech synthesizer chip. The synthesizer chip uses this input to reproduce each phrase as an audio output signal for the amplifier and speaker.

To determine which phrases compose the message, the message number in the X register is used to compute an input address in the Message Index. The entry at that address gives the starting location and length of the message as encoded in the Message Composition Table. At the specified location in the Message Composition Table is a series of phrase identification numbers and pause control codes, each one byte long, which are read out of memory to indicate which phrases compose the message.

As each byte of a message is read out of the Message Composition Table, it is examined to determine whether it is a pause-control code or a phrase-identification number. If it is a pause-control code, the normal pause of the phrase that follows, represented by its phrase identification number, will be accordingly altered.

If the byte read out of the Message Composition Table is a phrase-identification number, it is used to determine where the audio nibbles of that phrase are located in the speech memory. It is also used to determine if after reproducing the phrase the speech synthesizer should normally be turned off for a specified interval to add a preselected pause.

An input address to the Phrase Index is computed from the phrase-identification number. The entry at that input address gives the starting address and number of bytes in the speech memory of the series of bytes which store the phrase. Each byte in the speech memory holds an adjacent two of the audio nibbles which compose the phrase. After each byte of the phrase is read out from the speech memory, the two nibbles it contains are inputted in message order, one at a time, to the speech synthesizer.

b. Detailed Operation

The subroutine is entered (STEP 561) with the number of the message to be played held in the X register. This number is read and stored as MESSNUM (STEP 562). Next a bit called PLAOLD BIT (play old message) is read (STEP 562) and checked (STEP 563). If the PLAOLD BIT is 0, the message is a new message. To enable the message to be repeated at a subsequent time (by pressing the REPEAT MESSAGE button on the control panel of FIG. 2), the variable LASTMS (last message) is set equal to the message number in the X register (STEP 564), and the routine proceeds to STEP 565.

If at STEP 563 the PLAOLD BIT is found to be 1, the message is a repeat of the last message, and there is no need to update the variable LASTMS, so there is a jump to STEP 565.

In either case, based on the message number MESSNUM a table look-up is performed using the Message Index to obtain the starting message address MESSADDRESS and the number of bytes (or message length MESSLENGTH) of the message as stored in the Message Composition Table (STEP 565).

The first byte of the message is then read from the Message Composition Table at the address MESSADDRESS and the variable BYTE is set to that value (STEP 566). As stored in the Message Composition Table, each byte of a message is either a phrase identification number or a pause control code.

If at STEP 567 the number BYTE is determined to not be greater than the hex number F7 (decimal 247), it is interpreted as a phrase-identification number. The two least significant bits of BYTE are then read (STEP 568) as a binary code indicating the pause length SILENCE that should follow the phrase in question when reproduced by the speech synthesizer:

| CODE | SILENCE |
|------|---------|
| 00   | 0 ms    |
| 01   | 32 ms   |
| 10   | 64 ms   |
| 11   | 128 ms  |

The routine then proceeds to STEP 572.

On the other hand, if at STEP 567 the number BYTE is determined to be greater than hex F7, it is interpreted as a pause-control code. The three least significant bits of BYTE are then read (STEP 569) as a binary code indicating the pause length SILENCE that should follow the phrase whose identification number comes next after the pause-control code:

| CODE | SILENCE | CODE | SILENCE |
|------|---------|------|---------|
| 000  | 0 ms    | 100  | 384 ms  |
| 001  | 32 ms   | 101  | 2 secs  |
| 010  | 64 ms   | 110  | 4 secs  |

If the number BYTE is a control code, then in order to indicate the address of the phrase identification number which follows it, the variable MESSADDRESS is incremented (STEP 570). At the same time, the variable MESSLENGTH, which keeps track of the number of bytes remaining in the coded message, is decremented.

The next byte of the message is then read from the Message Composition Table using the current value of MESSADDRESS as the address. The variable BYTE is set to that value (STEP 571), and the routine proceeds to STEP 572.

At STEP 572 the current value of BYTE is interpreted as a phrase identification number, and the variable PHRASENUM (phrase identification number) is set equal to it. Based on the phrase identification number PHRASENUM a table look-up is performed using the Phrase Index to obtain the starting phrase address PHRASEADDRESS and the number of bytes (or phrase length PHRASELENGTH) of the message as stored in the Speech Memory.

The first byte of the phrase is then read from the Speech Memory at the address PHRASEADDRESS and the variable SOUNDBYTE is set to that value (STEP 573). As the sounds of a phrase are coded in nibbles, the 4 most significant bits of SOUNDBYTE are read as NIBBLE1 and the 4 least significant bits as NIBBLE2 (STEP 574). Each of these nibbles is fed in turn to the sound synthesizer and the sampled sound corresponding to each nibble synthesized as the manikin's voice output for the speaker 66 (STEP 575).

The variable PHRASEADDRESS is incremented (STEP 576). At the same time, the variable PHRASELENGTH, which keeps track of the number of bytes remaining in the coded phrase, is decremented. If the current value of PHRASELENGTH is not yet zero, the routine jumps back to STEP 573 to read and synthesize the next coded byte of the phrase (STEP 577).

If, on the other hand, PHRASELENGTH has been reduced to zero by STEP 577, all coded bytes of the phrase have been read and synthesized. The routine moves to STEP 578 and a sound pause or interval of silence is maintained for the interval specified by variable SILENCE.

To move on to the next byte of the message in the MESSAGE COMPOSITION TABLE, the variable MESSADDRESS is incremented (STEP 579). At the same time, the variable MESSLENGTH, which keeps track of the number of bytes remaining in the coded message, is decremented (STEP 580).

If the current value of MESSLENGTH is not yet zero, the routine jumps back to STEP 566 to read and synthesize the next coded byte of the message. On the other hand, if MESSLENGTH has been reduced to zero by STEP 580, the subroutine has completed playing the MESSAGE indicated in the X register, and a RETURN to the routine which called it is executed at STEP 581.

11. A/D CONVERSION SUBROUTINE

FIG. 21A shows a flow chart for an embodiment of the A/D Conversion Subroutine. This combined utility subroutine reads and converts to digital format the analog signals from the ventilation sensor 118 or chest compression sensor 116, as well as reading data from hand position switches S3, S6, S9, and S12. Before calling the subroutine, a variable TH1 is set to a noise threshold for the sensor signal.

The states of three reference bits, ADC, SAIDIT, and HPBIT at the time the subroutine is called determine which functions the A/D subroutine performs. The ADC bit determines whether chest compression sensor data (ADC=1) or ventilation sensor data (ADC=0) is read and converted. The SAIDIT bit determines whether the current instantaneous value (SAIDIT=1) or a local maximum (SAIDIT=0) of the sensor signal is to be provided. The instantaneous value is returned in a variable ADVAL (A/D value) and the local maximum is returned in a variable MAXVAL (maximum value). If HPBIT is 1, hand position switch data is to be returned, in a variable HPSTORE (hand position store).

The microcomputer's RAM 82 (STEP 585) is cleared, and READY lamp 65 on control panel 53 of FIG. 2 is turned on (STEP 586) to prompt the student to begin his efforts. The conversion is begun (STEP 587), and continued until data from both the ventilation sensor 118 and chest compression sensor 116 is separately converted by respective A/D converters 119 and 117 (STEP 588). If the ADC bit is a 1, the output of compression A/D converter 117 is read in to microcomputer 80a (STEPS 589, 590); otherwise, the output of ventilation A/D converter 119 is read in (STEP 591).

The sensor data which has been read in is latched (STEP 592), and then stored in two variables, SMPNEW (sample new) (STEP 593) and ADVAL (STEP 594). If the SAIDIT bit is not set, the threshold value TH1 is loaded in the accumulator (STEP 596) and compared with SMPNEW (STEP 597). If SMPNEW (the student's sampled effort) does not yet equal or exceed TH1, the subroutine loops back to STEP 587 to begin another conversion.

FIG. 21B shows a typical sensor signal as a function of time in the case where SMPNEW exceeds the threshold TH1. Although the microcomputer actually deals with a quantized digitally converted sensor signal, since the quantization is relatively fine (256 levels), this detail is not shown in FIG. 21B.

When SMPNEW is equal to or greater than TH1 at STEP 597, data from the hand position switches S3, S6, S9, S12 is read in (STEP 598), and stored (STEP 599) in the four least significant bits HS0, HS1, HS2, HS4 of an eight-bit variable HPSTORE as follows:

| | |
|---|---|
| If S3 is CLOSED, HS0 = 1; | otherwise HS0 = 0 |
| If S6 is CLOSED, HS1 = 1; | otherwise HS1 = 0 |
| If S12 is CLOSED, HS2 = 1; | otherwise HS2 = 0 |
| If S9 is CLOSED, HS3 = 1; | otherwise HS3 = 0 |

The four most significant bits of HPSTORE remain zero.

If HPBIT is 1 at STEP 600, the routine calling the A/D subroutine only needs the current value of HPSTORE. Therefore, READY lamp 65 is turned off (STEP 609), and a Return from Subroutine RTS is executed.

If neither the SAIDIT bit (STEP 595) nor HPBIT (STEP 600) is a 1, the routine calling the A/D subroutine wants it to monitor SMPNEW until the sensor signal reaches a maximum. As shown in FIG. 21B, to keep track of changes in SMPNEW on successive readings, the A/D subroutine uses two variables SMPOL1 (sample old 1) and SMPOL2 (sample old 2); initially these two variables are cleared to zero.

To avoid false detection of a maximum, a little hysteresis or delay is built into the test (STEP 602) for whether SMPNEW has begun to fall compared its value on prior readings (SMPOL1). Thus, at STEP 602 only if the quantity SMPNEW+5 is not equal to or greater than SMPOL1 will the subroutine jump to STEP 607, in effect ending the search for a maximum.

Before the sensor signal maximum is reached, at STEP 602 SMPNEW+5 will be equal to or greater than SMPOL1. Then at STEP 602, usually SMPOL1 will be equal to or greater than SMPOL2. If it is, the value of SMPOL1 is stored in SMPOL2 (STEP 604) and SMPOL1 itself updated to equal SMPNEW (STEP 605). The subroutine then loops back to STEP 587 to read the sensor for a fresh value of SMPNEW.

STEP 602 determines when the peak has been reached. Just past the peak of the sensor, SMPNEW+5 can be greater than SMPOL1 and at the same time SMPOL2 can be greater than SMPOL1. This will cause the flow to move from 602 to 603. In order to freeze SMPOL1 to the maximum value of the waveform, so that a maximum value is used for SMPOL1 the next time the comparison of STEP 602 is made, SMPOL1 is made equal to SMPOL2 at 606.

Eventually, at STEP 602 SMPNEW+5 will not exceed SMPOL1; i.e. SMPNEW will be at least 5 less than SMPOL1. This is taken as an indication that a maximum of the ventilation or compression has just been passed. The output variable MAXVAL is set equal to SMPOL1 (STEP 607). The READY lamp is turned off (STEP 609), and a Return from Subroutine RTS is executed (STEP 610).

If STEP 595 finds the SAIDIT bit set, the routine that called the A/D subroutine has already reported (said it) the maximum of a ventilation or compression to the student. The calling routine is only monitoring the sensor to determine when it falls back to the threshold value, indicating completion of the current ventilation or compression. Therefore, the calling routine only wants the instantaneous sensor value ADVAL of STEP 594. STEP 608 clears the SAIDIT bit to 0, and the subroutine jumps to ending STEPS 609, 610.

12. HAND POSITION CHECK SUBROUTINE

Figure 22A:
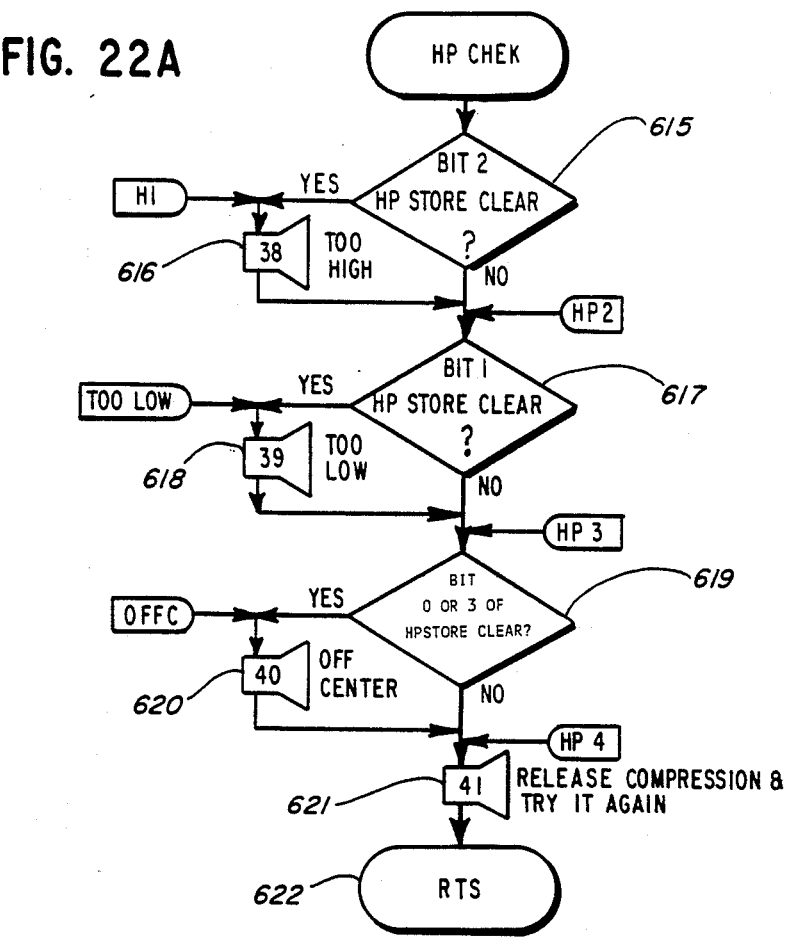
FIG. 22A is a flow chart for an embodiment of the Hand Position Check Subroutine incorporated in the Control Program of FIG. 11.
Figure 22B:
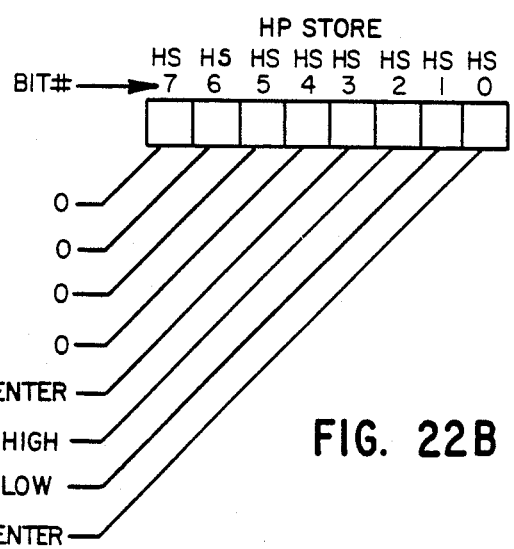
FIG. 22B is a map of the bits in a variable word HPSTORE used therein.

FIG. 22A shows a flowchart for an embodiment of the Hand Position Check Subroutine. This subroutine is called by the Hand Placement Routine, Single Chest Compression Routine, or the Chest Compression Rhythm Routine whenever they detect that the student's hand position is incorrect. FIG. 22B shows the bits of variable HPSTORE as set by the A/D Conversion subroutine from the hand position switches S3, S6, S9, S12. For a correct hand position HPSTORE is hex 0F. A "0" in any of the four least significant bits of HPSTORE indicates a corresponding open hand position switch because of incorrect hand position. If the calling routine determines that HPSTORE is not hex 0F, it promptly calls the Hand Position Check subroutine to voice a message telling the student what is wrong with his hand position.

If STEP 615 detects that bit 2 of HPSTORE is 0, STEP 616 voices Message 38: "Too high." Next, when STEP 617 detects that bit 1 of HPSTORE is 0, STEP 618 voices Message 39: "Too low." Finally, if STEP 619 detects that bit 0 or 3 of HPSTORE is 0, STEP 620 voices Message 40: "Off center." STEP 621 concludes the subroutine with Message 41: "Release compression! Try it again!" A Return from Subroutine is then executed at STEP 622.

13. SCORING SUBROUTINES a. SCORC1 Subroutine

Figure 23:
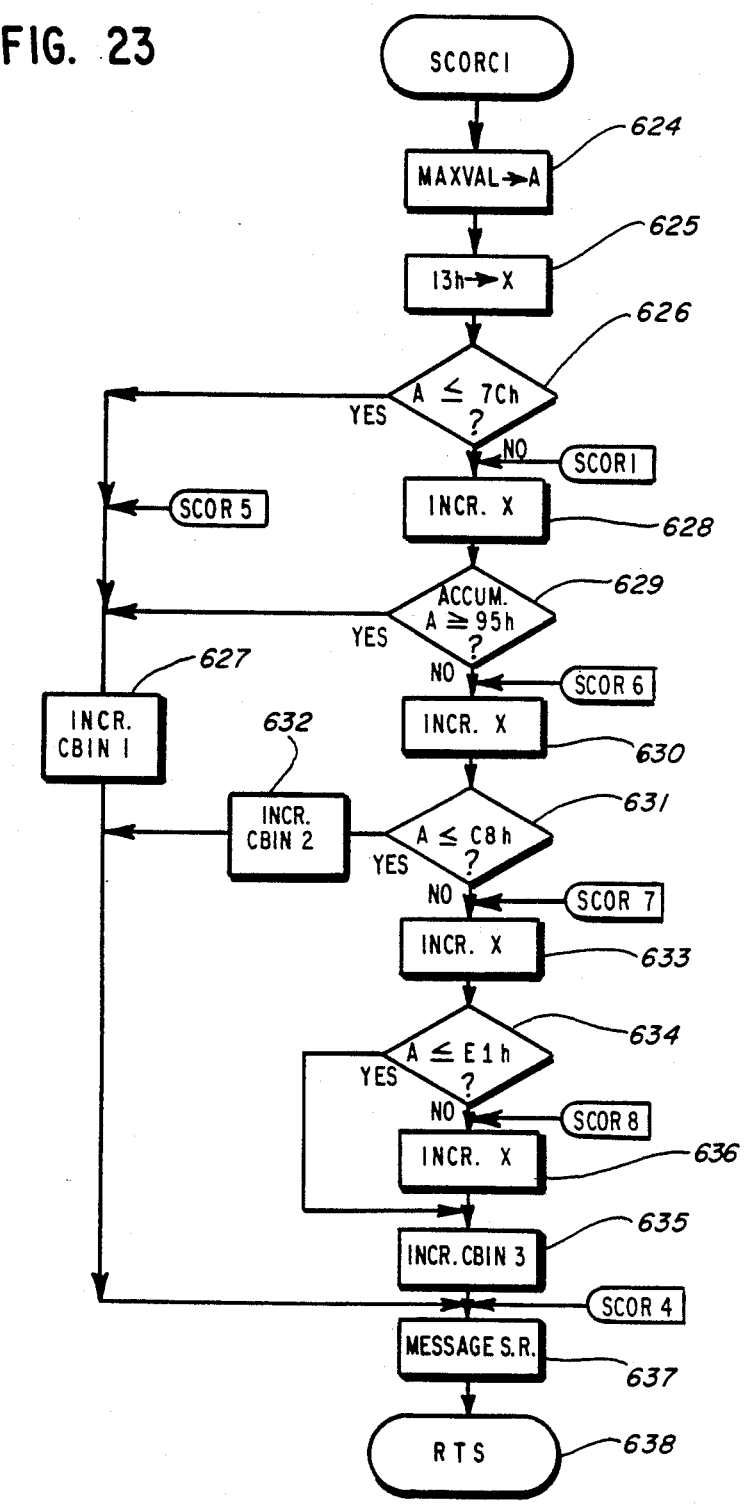
FIG. 23 is a flow chart for an embodiment of the scoring subroutine SCORC1 incorporated in the Control Program of FIG. 11.

FIG. 23 shows a flow chart of an embodiment of the SCORC1 subroutine. The Ventilation and Chest Compression Rhythm teaching routines call the SCORC1 subroutine to promptly voice a brief coaching comment on the maximum value of each ventilation or chest compression in a series as it occurs. This maximum is passed to the SCORC1 subroutine as the variable MAXVAL. To voice a coaching comment, the SCORC1 subroutine puts the appropriate Message number in register X of the microcomputer and calls the Message subroutine. SCORC1 also uses counter variables CBINI, CBIN2, and CBIN3 to keep a running tally of how many ventilations or compressions were too shallow, acceptable, or too great.

An appropriate coaching comment is made promptly after a maximum of the ventilation or compression has been determined and stored in a variable MAXVAL by the A/D Conversion subroutine. The comment must be brief because of the short time between the maximums of successive ventilations or compressions. For example, the acceptable chest compression rhythm may be as fast as 100 compressions per minute, which leaves only 600 ms between successive compression maximums. Therefore, the preselected coaching words, see Table 3 above, can each be voiced in about one third of a second (333 ms).

Table 3 above shows the relationship between the input MAXVAL and the messages voiced and counter variables incremented by the SCORC1 subroutine. The subroutine begins by loading the value of MAXVAL in the microcomputer's accumulator register A (STEP 624), and loading the number hex 13 (decimal 19) in another register, the X register (STEP 625).

If STEP 626 determines that the value (MAXVAL) in register A is less than or equal to hex 7C, the student's effort is a very shallow one in Range B and counter variable CBINI is incremented (STEP 627). A jump is made to STEP 637, which calls the Message Subroutine to voice the message whose number is in register X, in this case Message 19: "MORE!"

If STEP 626 determines that register A is not less than or equal to hex 7C, register X is incremented to decimal 20 (STEP 628). If STEP 629 next determines that register A is less than or equal to hex 95, the effort is a shallow one in Range C and counter variable CBIN1 is incremented at STEP 627. Then STEP 637 calls the Message Subroutine to voice the message whose number is in register X, Message 20: "MORE".

If STEP 629 determines that register A is not less than or equal to hex 95, register X is again incremented, to decimal 21 (STEP 630). If register A is less than or equal to hex C8 (STEP 631), the effort is an acceptable one in Range D and counter variable CBIN2 is incremented (STEP 632). Then STEP 637 calls the Message Subroutine to voice the message whose number is in register X, Message 21: "GREAT".

If A is not less than or equal to hex C8 at STEP 631, register X is again incremented, to decimal 22 (STEP 633). Then if register A is less than or equal to hex E1 (STEP 634), the effort is a too deep one belonging in Range E and counter variable CBIN3 is incremented (STEP 635). Then STEP 637 calls the Message Subroutine to voice the message whose number is in register X, Message 22: "LESS".

If STEP 634 determines that A is not less than or equal to hex E1, register X is again incremented, to decimal 23 (STEP 636). The effort is very much too deep and belongs in Range F. Counter variable CBIN3 is incremented (STEP 635). Then STEP 637 calls the Message Subroutine to voice the message whose number is in register X, Message 23: "LESS!".

After the appropriate message is voiced at STEP 637, a Return from Subroutine is executed at STEP 638.

b. SCORC2 Subroutine

Figure 24:
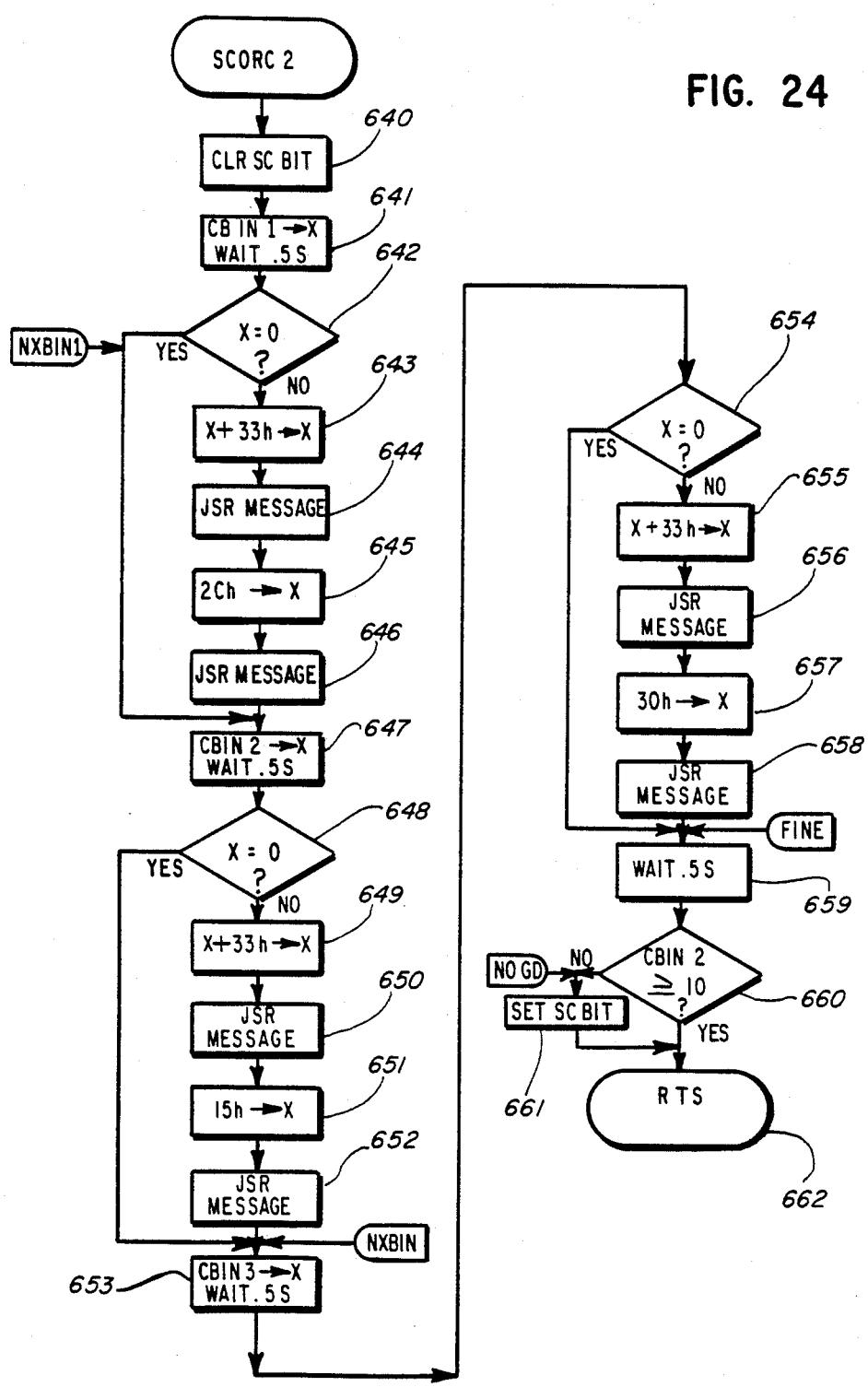
FIG. 24 is a flow chart for an embodiment of the scoring subroutine SCORC2 incorporated in the Control Program of FIG. 11.

FIG. 24 shows a flow chart of an embodiment of the scoring routine SCORC2 for use with the Chest Compression Rhythm (CCR) teaching routine of FIG. 17. After the CCR routine uses the SCORCI subroutine to brief coaching comment on each chest compression as it occurs, it uses the SCORC2 subroutine to voice a summary and judgment of the student's performance of the whole series of 15 chest compressions.

When the subroutine is called, the number of shallow, acceptable, and too deep compressions are respectively stored in counter variables CBIN1, CBIN2, and CBIN3. If there have not been at least 10 acceptable compressions in the series of fifteen, the subroutine sets a bit called SCBIT. When control returns from the SCORC2 subroutine to the CCR routine, if the SCBIT is set the student will be told "Give fifteen chest compressions again" (see FIG. 17, STEPS 505–507).

The SCORC2 subroutine begins by clearing SCBIT (STEP 640) and reading the value of CBIN1, the number of too-shallow compressions, into register X. After a brief half-second wait, if STEP 642 finds that register X is 0, the subroutine skips to STEP 647. But if register X is not 0, a message for the number of shallow compressions must be voiced by the Message subroutine.

As described above, the Message subroutine is a general utility that voices the prestored message whose number is stored in register X. For example,

| REG. X | MESSAGE | REG. X | MESSAGE |
|--------|---------|--------|---------|
| 21. | Great | 58. | Seven were ... |
| 44. | Too Shallow | 59. | Eight were ... |
| 48 | Too deep. | 60. | Nine were |
| ... | | 61. | Ten were ... |
| 52. | One was ... | 62. | Eleven were ... |
| 53. | Two were ... | 63. | Twelve were ... |
| 54. | Three were ... | 64. | Thirteen were ... |
| 55. | Four were ... | 65. | Fourteen were ... |
| 56. | Five were ... | 66. | Fifteen were ... |
| 57. | Six were ... | | |

Suppose register X Contains (from CBIN1) the number of too-shallow compressions (a number 1–15). By increasing register X by decimal 51 (hex 33), the Message routine can voice the corresponding message (messages 52–66). For example, suppose X equals 6, the number of shallow compressions. Increasing X by 51 makes register X=57. If the Message subroutine is called with register X=57, numerical Message 57 will be voiced: "Six were ..."

Therefore, at STEP 643 register X is increased by hex 33 (decimal 51), and then the Message subroutine is called to voice the message whose number is stored in register X. To complete the summary message, at STEP 645 register X is loaded with hex 2C (decimal 44), and the Message subroutine is called again to voice Message 44: "too shallow."

Next, STEP 647 reads the value of CBIN2, the number of acceptable compressions, into register X, and pauses for half a second. If STEP 648 finds that register X is 0, the subroutine skips to STEP 653. But if register X is not zero, STEP 649 prepares for voicing the appropriate message by increasing register X by hex 33 (decimal 51), and then the Message subroutine is called (STEP 650). The summary message is completed by loading a hex 15 (decimal 21) into X and again calling the Message subroutine to voice Message 21: "great".

Next, STEP 653 reads the value of CBIN3, the number of too-deep compressions, into register X and pauses for half a second. If STEP 654 finds that register X is 0, the subroutine skips to STEP 659. But if register X is not zero, STEP 655 prepares for voicing the appropriate message by increasing register X by hex 33 (decimal 51), and then the Message subroutine is called (STEP 656). The summary message is completed by loading a hex 30 (decimal 48) into X and again calling the Message subroutine to voice Message 48: "Too deep."

After another half-second pause (STEP 659), STEP 660 determines if CBIN2 indicates that there have been at least 10 acceptable compressions in the series of fifteen. If there have, a Return from Subroutine (RTS) is executed (STEP 662). If not, the SCBIT is set to 1 (STEP 661) before executing the RTS.

c. SCORC3 Subroutine

Figure 25:
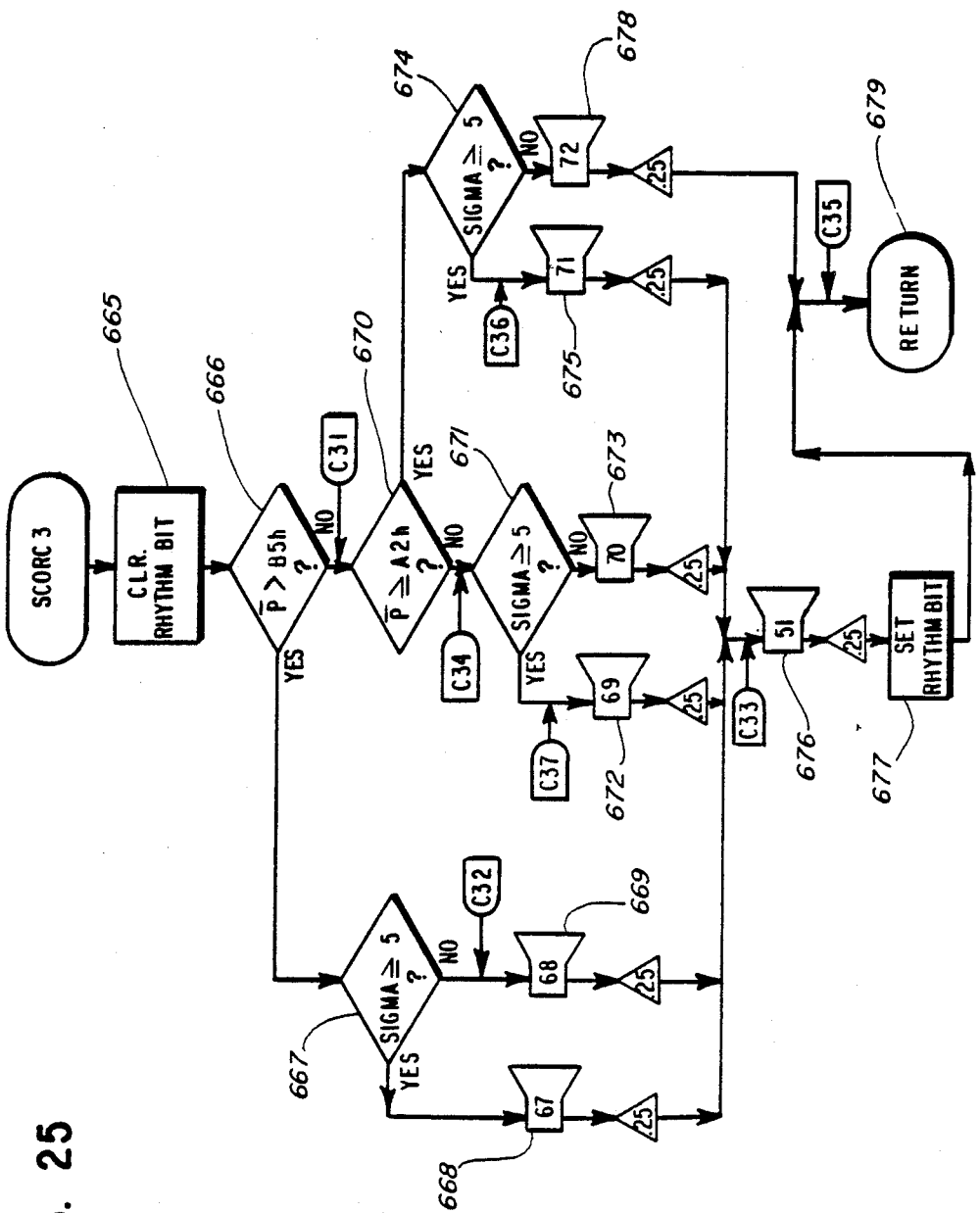
FIG. 25 is a flow chart for an embodiment of the scoring subroutine SCORC3 incorporated in the Control Program of FIG. 11.

FIG. 25 shows a flow chart of an embodiment of the scoring routine SCORC3 for use with the Chest Compression Rhythm (CCR) teaching routine of FIG. 17. When the series of fifteen chest compressions is completed, the CCR routine uses the SCORC3 subroutine to voice a judgment of the speed and regularity of the student's rhythm in performing the compressions.

When the subroutine is called, the average period $\overline{P}$ and the estimate SIGMA in terms of Timer Data Register TDR readings respectively determined at STEPS 500 and 501 of the CCR routine are available in RAM.

If the student's chest compression rhythm is the wrong speed or irregular, the subroutine sets a bit called RHYTHM. When control returns from the SCORC3 subroutine to the CCR routine, if the RHYTHM bit is set the student will be told "Give fifteen chest compressions again." (see FIG. 17, STEPS 508, 509, 507).

Table 6 above shows how the average period of the student's compressions can be interpreted from the average of the Timer Data Register TDR readings. After the RHYTHM bit is cleared (STEP 665), STEP 666 determines if $\overline{P}$ is greater than hex B5, which is equivalent to asking if the average compression period is less than 600 ms. If it is, the student's rhythm is too fast. STEP 667 then determines if SIGMA is equal to or greater than 5.

Since the TDR readings relate to timer clock pulses spaced 8 ms apart, this corresponds to an estimate of irregularity equal to or greater than 40 ms. If SIGMA is that large, STEP 668 voices Message 67, "Rhythm is too fast and irregular," and proceeds to STEP 676. If SIGMA is not equal to or greater than 5, STEP 669 just voices Message 68, "Rhythm is too fast," and proceeds to STEP 676.

If STEP 666 determines that $\overline{P}$ is not greater than hex B5, the rhythm is not too fast. STEP 670 then determines if $\overline{P}$ is greater than or equal to hex A2, which is equivalent to asking if the average compression period is less than or equal to 752 ms. If it isn't, the rhythm is too slow. STEP 671 then determines if SIGMA is equal to or greater than 5 (equivalent to 40). If SIGMA is that large, STEP 672 voices Message 69, "Rhythm is too slow and irregular," and proceeds to STEP 676. If SIGMA is not equal to or greater than 5, STEP 673 just voices Message 70, "Rhythm is too slow," and proceeds to STEP 676.

If STEP 670 determines that $\overline{P}$ is greater than or equal to hex A2, the compression period is in the acceptable range 600–752 ms. STEP 674 then determines if SIGMA is equal to or greater than 5 (equivalent to 40). If SIGMA is that large, STEP 675 voices Message 71: "Rhythm is irregular," and proceeds to STEP 676.

If at STEP 674 SIGMA is not equal to or greater than 5, both speed and regularity are acceptable. STEP 673 voices Message 72, "Excellent rhythm," and a Return from Subroutine is executed (STEP 679).

If the rhythm has the wrong speed or is irregular, the student needs help in establishing his beat. STEP 676 voices Message 51: "Set the cadence switch for a cadence." The RHYTHM bit is set to 1 (STEP 677) before executing the Return from Subroutine (STEP 679).

The many advantages of this inexpensive manikin system are now apparent. The components are easily made and assembled, and operate under flexible programmable control; the purchased electronic parts are readily available commercial components. The synthesized voice coaching makes excellent use of the sensor data to realistically simulate the timing, judgment, and encouraging advice of human coaching. It can be easily operated by the student with little or no preparation. Finally, there is no heavy, bulky, or complicated apparatus that must be transported, interconnected or managed by the user.

While the principles of the invention have been described above in connection with specific apparatus and applications, it is to be understood that this description is only an example and is not intended as a limitation on the scope of the invention.

APENDIX I

MESSAGES BY MESSAGE NUMBER

1. Welcome to Coach Andy ™.
2. Ventilation. Open the airway by gently tilting the head way back.
3. Press down on the manikin's forehead with the palm of one hand.
4. With your other hand, lift either under the neck, near the base of the head, or with the fingertips, under the bony part of the jaw near the chin.
5. (none)
6. Pinch off the manikin's nostrils.
7. Open your mouth wide, take a deep breath, and make a tight seal with the manikin's mouth and blow. Try a single ventilation.
8. I will tell you how you did.
9. More air.
10. Be sure that you're taking a deep breath and keeping a tight seal with the manikin's nostrils.
11. Blow harder.
12. Try it again.
13. Please ask the instructor for help.
14. Close, but blow harder.
15. Excellent.
16. Perfect. Now try giving two slow breaths.
17. Good, but blow less forcefully.
18. Blow into the manikin's mouth with complete refilling of your lungs after each breath.
19. More!
20. More.
21. Great.
22. Less.
23. Less!
24. Try giving two breaths again.
25. Excellent ventilation. If you feel confident, practice checking the carotid pulse. If you don't, try giving two breaths again.
26. Carotid pulse. The carotid pulse is located on either side of the Adam's Apple.
27. Gently, try to sense it with the index and middle fingers of one hand.
28. Maintain the head tilt with the palm of your other hand.
29. If you have difficulty checking it, please ask the instructor for help.
30. Hand position. Feel for the border of the manikin's ribs with the index and middle fingers of the hand closest to the manikin's waist.
31. Move them upward along the ribcage until you reach the ribcage notch.
32. Place the heel of your other hand just above the two fingers. Then place the first hand on top of it.
33. Keep your fingers off the manikin's ribs.
34. Push down. I will check your hand position.
35. Fine, remove and reset your hands. Try it again.
36. Good, if you feel confident, you should now practice a single chest compression. If you don't, try it again.
37. Your hand position is not quite right.
38. Too high.
39. Too low.
40. Off center.
41. Release compression! Try it again!
42. Single chest compression. Take the correct hand position, your elbows locked and your shoulders directly over the sternum.
43. The chest should be compressed smoothly one and one half to two inches. Try a single chest compression.
44. Too shallow.
45. Too shallow! Be sure that you're pressing straight down, your elbows locked and your shoulders directly over the sternum.
46. Close, but too shallow.
47. Close but too deep.
48. Too deep.
49. Great. Now practice chest compression rhythm or try it again.
50. Chest compression rhythm. Give fifteen chest compressions smoothly, no bouncing, using a one and two and three and four . . . to fifteen cadence. Come all the way up between compressions.

51. Set the cadence switch for a cadence.
52. One was ...
53. Two were ...
54. Three were ...
55. Four were ...
56. Five were ...
57. Six were ...
58. Seven were ...
59. Eight were ...
60. Nine were ...
61. Ten were ...
62. Eleven were ...
63. Twelve were ...
64. Thirteen were ...
65. Fourteen were ...
66. Fifteen were ...
67. Rhythm is too fast and irregular.
68. Rhythm is too fast
69. Rhythm is too slow and irregular.
70. Rhythm is too slow.
71. Rhythm is irregular.
72. Excellent rhythm.
73. Come all the way up between compressions.
74. Give fifteen chest compressions again.
75. Not quite right.
76. If you feel confident, practice clearing the airway. If you don't, give fifteen chest compressions again.
77. Replace battery.
78. Now practice the correct hand position.
79. Clearing the airway. Kneel astride the manikin's thighs.
80. Place the heel of one hand slightly above the navel. Place the other hand on top of it.
81. Press into the abdomen with quick upward thrusts. Each thrust should be distinct and delivered with the intent of clearing the airway. Do it ten times.
82. When you feel confident, practice ventilating the manikin.

APPENDIX II

AVOCET SYSTEMS 6805 CROSS-ASSEMBLER - VERSION 1.08M

SOURCE FILE NAME: ANDY.ASM   © 1987 MICHAEL INGENITO

```
00000                 NAME     ANDY
                 ;
                 ;
                 ;    THIS CODE IS WRITTEN FOR THE HD637B05V0P (HITACHI) CMOS
                 ;    MICROCOMPUTER
                 ;
                 ;    modified 9/8/86
                 ;
                 ;    COACH ANDY
0000       PORTA   EQU     $00
0001       PORTB   EQU     $01
0002       PORTC   EQU     $02
0003       PORTD   EQU     $03
0004       ADDR    EQU     $04
0005       BDDR    EQU     $05
0006       CDDR    EQU     $06
0007       DDDR    EQU     $07
0008       TDR     EQU     $08
0009       TCR     EQU     $09
000A       MR      EQU     $0A
0010       SCICR   EQU     $10
0011       SCISR   EQU     $11
0012       SCIDR   EQU     $12
                 ;
                 ;   RAM
                 ;
0040               ORG     $040
0040       RAMBIT  DS      1
0041       RUNBIT  DS      1
0042       ALLBIT  DS      1
0043       LASTMS  DS      1
0050               ORG     $050
0050       WDAR    DS      1
0051       SUH     DS      1
0052       SLH     DS      1
0053       BUH     DS      1
0054       BLH     DS      1
0055       SAM     DS      1
0056       NUMWRD  DS      1
0057       WRDOFF  DS      1
0058       SSAW    DS      1
```

```
0059            SILREG  DS      1
005A            FXWRD   DS      1
005B            EPRES   DS      1
005C            WRDTAB  DS      1
005D            WAITC   DS      1
005E            FOURC   DS      1
0060                    ORG     $60
0060            LAMP    DS      1
0061            FORMIN  DS      1
0062            SWOLD   DS      1
0063            HPSTOR  DS      1
0064            FIRST   DS      1
0065            TH1     DS      1
0066            MAXVAL  DS      1
0067            SMPNEW  DS      1
0068            BADC1   DS      1
0069            BADC    DS      1
006A            GOODC   DS      1
006B            ABLE    DS      1
006C            BAKER   DS      1
006D            CHUCK   DS      1
006E            DOG     DS      1
006F            MAXC    DS      1
0070            CBIN1   DS      1
0071            CBIN2   DS      1
0072            CBIN3   DS      1
0073            PERCTR  DS      1
0074            MINTOT  DS      1
0075            SMPOLD  DS      1
0076            SMPOL1  DS      1
0077            SMPOL2  DS      1
0078            XBAR    DS      1
0079            SIGMA   DS      1
007A            PERIOD  DS      $F
0089            CYCLE   DS      1
008A            SENSIT  DS      1
008B            ADVAL   DS      1
008C            MINCTR  DS      1
008D            SAMPLE  DS      1
008E            CANSTR  DS      1
008F            LICAND  DS      1
0090            PLIER   DS      1
0091            ANSMSB  DS      1
0092            ANSLSB  DS      1
0093            TEMP1   DS      1
0094            TOTLSB  DS      1
0095            TOTMSB  DS      1
0096            NEWNUM  DS      1
0097            SORMSB  DS      1
0098            SORLSB  DS      1
0099            DNDMSB  DS      1
009A            DNDLSB  DS      1
009B            TEMP2   DS      1
009C            QUOTNT  DS      1
                ;
                ;
                ;
                ;       INITIALIZATION
                ;
1000                    ORG     $1000   ;START OF ROM($1000 FOR 6305)XXXXXXXXXXXX
                XXXX
1000 A64F       INIT    LDA     #$4F    ;NO TIMING INT. DIV. BY 2-15
1002 B709               STA     TCR
1004 3F00               CLR     PORTA   ;NO FALSE PWR DN
1006 A660               LDA     #$60
1008 B70A               STA     MR      ;D6 AS PORT & LEVEL,EDGE TRIG.
100A A6FF               LDA     #$FF
100C B704               STA     ADDR    ;SET I/O
100E B706               STA     CDDR
1010 A6FE               LDA     #$FE
1012 B705               STA     BDDR
```

```
1014 3F07              CLR     DDDR
1016

;
                ;       CLEAR RAM
                ;
1016 3F40              CLR     RAMBIT
1018 3F41              CLR     RUNBIT
101A 3F42              CLR     ALLBIT
101C AD18              BSR     CLRAMO
101E 1800              BSET    4,PORTA
1020 1900              BCLR    4,PORTA       ;RESET SPCH. SYN.
                ;
                ;       CLEAR OUTPUTS
                ;
1022 A698              LDA     #$98
1024 B701              STA     PORTB         ;B SIDE OF MUX IS EN.
1026 A650              LDA     #$50
1028 B700              STA     PORTA         ;CLR LATCH
102A A601              LDA     #$1
102C CD110A            JSR     WAIT          ;WAIT 16 MS.
102F 2F01              BIH     ST
1031 8E                STOP
1032 A660      ST      LDA     #$60
1034 B700              STA     PORTA         ;POWER DOWN
                ;
                ;       CLEAR RAM S.R.
                ;
1036 AE60      CLRAMO  LDX     #$60

1038 7F        CLEAR   CLR     0,X
1039 5C                INCX
103A A3FA              CPX     #$FA
103C 26FA              BNE     CLEAR
103E 81                RTS
                ;
                ;       END OF CLEAR RAM S.R.
                ;
                ;
                ;       INTERRUPT SEQUENCE
                ;
103F 1800      INT     BSET    4,PORTA       ;RESET SPCH SYN.
1041 1900              BCLR    4,PORTA       ;STOP SOUND
1043 A601              LDA     #$1           ;WAIT 16MS FOR DBNCE
1045 CD110A            JSR     WAIT          ;OF SW. ON.
1048 1D01              BCLR    6,PORTB       ;ENABLE 'B' SIDE OF MUX
104A B603              LDA     PORTD
104C A40F              AND     #$F
104E B762              STA     SWOLD         ;ONLY NEED D3,D2,D1,D0
1050 2E01              BIL     RUN1
1052 80                RTI
1053 2EFE      RUN1    BIL     RUN1
1055 A620              LDA     #$20          ;WAIT 512MS-DO NOT
1057 CD110A            JSR     WAIT          ;WISH INSTANTANEOUS RESPONSE.
105A 0E410E            BRSET   7,RUNBIT,RUN3
105D 1E41              BSET    7,RUNBIT
105F AE01              LDX     #$01
1061 CD1122            JSR     MESAGE        ;MESS. #1 "WELCOME" ON POWER UP
1064 A654              LDA     #$54
1066 CD1744            JSR     LAMPS         ;ENABLE LAMPS TO BLINK
1069 2000              BRA     RUN3
106B 4F        RUN3    CLRA
106C B162              CMP     SWOLD
106E 2604              BNE     RUN4A         ;IGNORE PAUSE IF IN REPEAT
1070 094061            BRCLR   4,RAMBIT,RUN4
1073 80                RTI
1074 4C        RUN4A   INCA
1075 B162              CMP     SWOLD
1077 2623              BNE     NUBGIN
1079 094001            BRCLR   4,RAMBIT,RUN6

107C 80                RTI                   ;IGNORE 2ND REPEAT
```

```
107D A656      RUN6   LDA    #$56
107F CD1744           JSR    LAMPS              ;TURN ON REPEAT LAMP
1082 1840             BSET   4,RAMBIT           ;PLAOLD BIT
1084 9A               CLI
1085 BE43             LDX    LASTMS
1087 CD1122           JSR    MESAGE             ;REPEAT LAST MESSAGE
108A 1A40             BSET   5,RAMBIT           ;RETURN FROM MESS.BIT
108C 1940             BCLR   4,RAMBIT           ;PLAOLD BIT
108E A601             LDA    #$1
1090 B75D             STA    WAITC              ;FOR QUICK RET. TO PROGRAM
1092 3F59             CLR    SILREG             ;DITTO
1094 1142             BCLR   0,ALLBIT           ;DITTO
1096 A650             LDA    #$50               ;TURN OFF REPEAT LAMP
1098 CD1744           JSR    LAMPS
109B 80               RTI
109C 9C        NUBGIN RSP                       ;NO GOING BACK
109D 3F40             CLR    RAMBIT             ;CLR FLAGS
109F 3F42             CLR    ALLBIT             ;DITTO
10A1 1B01             BCLR   5,PORTB            ;STOP C.P. TRANSDUCER
10A3 A650             LDA    #$50
10A5 CD1744           JSR    LAMPS              ;STOP BLINK & TURN OFF
               ;                                 WAIT AND REPEAT LAMPS
10A8 A602             LDA    #$02
10AA B162             CMP    SWOLD
10AC 2603             BNE    NOTHT
10AE CC1668           JMP    HT
10B1 4C        NOTHT  INCA
10B2 B162             CMP    SWOLD
10B4 2603             BNE    NOTCCR
10B6 CC150A           JMP    CCR
10B9 4C        NOTCCR INCA
10BA B162             CMP    SWOLD
10BC 2603             BNE    NOTSCC
10BE CC143D           JMP    SCC
10C1 4C        NOTSCC INCA
               ;
10C2 B162             CMP    SWOLD
10C4 2603             BNE    NOTHP
10C6 CC13C3           JMP    HP
10C9 4C        NOTHP  INCA
10CA B162             CMP    SWOLD
10CC 2603             BNE    NOTCP
10CE CC1390           JMP    CP
10D1 CC12A0    NOTCP  JMP    VENT
               ;
               ;
10D4 074005    RUN4   BRCLR  3,RAMBIT,RUN7      ;HC BIT
10D7 1740             BCLR   3,RAMBIT           ;DITTO
10D9 1240             BSET   1,RAMBIT           ;RTIBIT
10DB 80               RTI
10DC 1640      RUN7   BSET   3,RAMBIT
               ;
               ;      FOUR ROUTINE
               ;
               ; THIS ROUTINE IS USED WHEN THE PAUSE/RESUME
               ; BUTTON IS PUSHED. IF NO SEQUENCE BUTTON IS PUSHED
               ; WITHIN FOUR MINUTES THE MACHINE TURNS OFF.
               ;
10DE 9A        FOUR   CLI
10DF A6FF             LDA    #$FF
10E1 B761             STA    FORMIN
10E3 A607      SOMEMO LDA    #$7                ;NO OF P/R LAMP
10E5 AD1C             BSR    ON                 ;PART OF LAMP S.R.
10E7 A620             LDA    #$20
10E9 AD1F             BSR    WAIT               ;FOR .5 SEC
10EB B660             LDA    LAMP               ;LAMP HAS # OF PROGRAM
10ED                                            ;LAMP THAT WAS ON
10ED AD12             BSR    LAMPON             ;TURN ON PROGRAM LAMP
10EF A620             LDA    #$20               ;FOR .5 SEC.
10F1 AD17             BSR    WAIT
10F3 034003           BRCLR  1,RAMBIT,TENMO     ;RTI BIT, IF SET
```

```
10F6 1340           BCLR    1,RAMBIT
10F8 80             RTI                     ;RET. TO PROGRAM
10F9 3A61   TENMO   DEC     FORMIN
10FB 26E6           BNE     SOMEMO
10FD 1A00   PWROFF  BSET    5,PORTA         ;PWR. DN
10FF 1C00           BSET    6,PORTA
            ;
            ;       END OF INTERRUPT ROUTINE
            ;
            ;       LAMPON S.R. - TO TURN ON A PROGRAM LAMP
            ;       ENTER WITH A HOLDING LAMP #
            ;
            ;
1101 B760   LAMPON  STA     LAMP    ;NEED THIS FOR P/R FUNCTION
1103 B700   ON      STA     PORTA   ;A2-A0 ARE 4514 INPUTS
1105 1A00           BSET    5,PORTA ;LAMPSTROBE
1107 1B00           BCLR    5,PORTA
1109 81             RTS
            ;
            ;
            ;       WAIT 16 MS SUB-ROUTINE
            ;       ENTER WITH A HOLDING THE NO. OF 16
            ;       MILLISECOND SILENCES.
            ;
110A B75D   WAIT    STA     WAITC   ;COUNTER
110C A64F           LDA     #$4F
110E B709           STA     TCR     ;SET UP TIMER
1110 A6FF   WAITMO  LDA     #$FF    ;AVOIDS DECREMENTING
1112 B15D           CMP     WAITC   ;THRU ZERO THAT
1114 270B           BEQ     GOBAK   ;CAN OCCUR
1116 B708           STA     TDR     ;SET UP TIMER
1118 1F09           BCLR    7,TCR
111A 0F09FD  ZZWAIT  BRCLR   7,TCR,ZZWAIT    ;WAIT HERE
111D                                         ;UNTIL TIMER UP
111D 3A5D   ONWAIT  DEC     WAITC
111F 26EF           BNE     WAITMO
1121 81     GOBAK   RTS
            ;
            ;       MESAGE SUB-ROUTINE
            ;
            ; VOCALIZES THE MESSAGE (#_IS, IN X ON ENTRY)
            ;
            ;
1122 A6FF   MESAGE  LDA     #$FF
1124 B706           STA     CDDR            ;PORTC MUST BE OUTPUT PORT
1126 1C40           BSET    6,RAMBIT        ;MESAGE BIT
1128 094011         BRCLR   4,RAMBIT,PLAOLD ;PLAOLD BIT
112B 5A     MESSA   DECX                    ;MESS. NOS. START FROM 0
112C 58             LSLX                    ;MULTI. X BY 2 AS 2I TAB
            ;                               ;BYTES/MESS.
112D D61812         LDA     I,X             ;PICK UP FIRST I BYTE
1130 44             LSRA                    ;FIRST OF MESS. TAB. BITS
1131 240D           BCC     NOTM
1133 44             LSRA                    ;ITS M DISCARD NEXT BIT
1134 1641           BSET    3,RUNBIT        ;M TABLE FLAG
1136 1541           BCLR    2,RUNBIT        ;L TABLE FLAG
1138 1941           BCLR    4,RUNBIT        ;N TABLE FLAG
113A 2015           BRA     MESSC
113C BF43   PLAOLD  STX     LASTMS
113E 20EB           BRA     MESSA
1140 44     NOTM    LSRA                    ;SECOND MESS. TAB. BIT
1141 2408           BCC     LTAB            ;L TABLE WORD
1143 1841           BSET    4,RUNBIT        ;N TABLE FLAG
1145 1541           BCLR    2,RUNBIT        ;L TABLE FLAG
1147 1741           BCLR    3,RUNBIT        ;M TABLE FLAG
1149 2006           BRA     MESSC
114B 1441   LTAB    BSET    2,RUNBIT        ;M TAB
114D 1741           BCLR    3,RUNBIT        ;N TAB
114F 1941           BCLR    4,RUNBIT        ;P TAB
            ;
            ;
```

```
 1151 B756      MESSC   STA     NUMWRD      ;REST OF BITS = NO. OF WRDS IN MESS.
                ;
 1153 5C                INCX
 1154 D61812            LDA     I,X         ;PICK UP NEXT I BYTE
 1157 B757              STA     WRDOFF      ;OFFSET FROM TOP OF MESS.
 1159                                       ;TABLE TO FIRST WRD
 1159 BE57      NEXWRD  LDX     WRDOFF
 115B 04410D            BRSET   2,RUNBIT,LTABLE
 115E 064105            BRSET   3,RUNBIT,MTABLE
 1161 D61AA5            LDA     N,X         ;N TABLE MESSAGE
 1164 2008              BRA     HEAH
 1166 D619B3    MTABLE  LDA     M,X         ;M TABLE MESSAGE
 1169 2003              BRA     HEAH
 116B D618B6    LTABLE  LDA     L,X         ;L TABLE MESSAGE
 116E A1F8      HEAH    CMP     #$F8        ;WRD # - F8
 1170 2430              BCC     SILBYT      ;BRANCH TO SILBYT IF WRD # IS
 1172                                       ;EQUAL OR GREATER THAN $F8
 1172 034229            BRCLR   1,ALLBIT,REGLAR ;SPECIAL SILENCE AFTER
 1175                                           ;WRD. FLAG
                ;
 1175 1342              BCLR    1,ALLBIT
 1177 AD17      SPK     BSR     LD2LSB      ;S.R. TO LOAD 2LSB'S
 1179                                       ;TO WRD TAB
 1179 A4FC              AND     #$FC        ;WORD NO. IS NOW
 117B B75A              STA     FXWRD       ;MULT BY 4
 117D A604              LDA     #$04
 117F B75E              STA     FOURC       ;4 BYTES/WORD
 1181 A651              LDA     #$051       ;RAM ADD THAT HOLDS

1ST BYTE OF WRD DATA
 1183 B750              STA     WDAR        ;WORD DATA ADD REG.
 1185 BE5A              LDX     FXWRD       ;OFFSET TO GET WRD.
                ;
 1187 B65C      MODATA  LDA     WRDTAB
 1189 264A              BNE     NOTSSS
 118B D61B92            LDA     S,X
 118E 205E              BRA     READY
                ;
                ; LD 2LSB SUB-ROUTINE
                ; ENTER WITH A HOLDING A MESSAGE TABLE BYTE
                ; KNOWN TO BE A SPOKEN WORD.
                ;
 1190 97        LD2LSB  TAX                 ;NOW A&X HOLD BYTE
 1191 A403              AND     #$03        ;ONLY 2LSB'S LEFT IN A
 1193 B75C              STA     WRDTAB
 1195 9F                TXA                 ;MESS. TAB BYTE TO A
 1196 81                RTS
                ;
                ; LD SREG SUB-ROUTINE - THIS IS THE SAME
                ; AS ABOVE BUT 2LSB'S ARE STORED IN SIL REG
                ;
                ;
 1197 97        LDSREG  TAX
 1198 A403              AND     #$3
 119A B759              STA     SILREG
 119C 9F                TXA
 119D 81                RTS
                ;
                ;
 119E ADF7      REGLAR  BSR     LDSREG      ;2 LSBS TO SILREG
 11A0 20D5              BRA     SPK
                ; AT THIS POINT THE MESSAGE TABLE BYTE
                ; IN A IS KNOWN TO BE A SILENCE WORD
                ; F8 = 0MS, F9 = 32MS, FA = 64MS
                ; FB = 128 MS FC = 384MS, FD = 2 SEC,
                ; FE = 4 SEC, FF = 6 SEC.
                ;
 11A2 1242      SILBYT  BSET    1,ALLBIT    ;SPEC SIL. AFTER WRD FLAG.
 11A4 A1FD              CMP     #$FD        ;A - FD
 11A6 2417              BCC     LONG        ;SECONDS OF SILENCE
```

```
11A8 A0F8            SUB     #$F8                    ;0 TO 4 LEFT
11AA A103            CMP     #$3
11AC 2405            BCC     SILO                    ;= 4 OR 3
11AE B759    .SILA   STA     SILREG
11B0 CC1288          JMP     HOP
11B3 A103    SILO    CMP     #$3
11B5 2705            BEQ     SILB                    ; = 3
11B7 48              LSLA                            ; = 4, MULT BY 2 AND ADD 4
11B8 AB04            ADD     #$4
11BA 20F2            BRA     SILA                    ; = TO GET 8 X 16 MS
11BC 4C      SILB    INCA
11BD 20EF            BRA     SILA
11BF A0FC    LONG    SUB     #$FC                    ; = 1, 2, 3
11C1 A101            CMP     #$1
11C3 2708            BEQ     SILC
11C5 A102            CMP     #$2
11C7 2608            BNE     SILD
11C9 A678    SILE    LDA     #$78                    ;4 SEC. OF SIL.
11CB 20E1            BRA     SILA
11CD A63C    SILC    LDA     #$3C                    ;2 SEC. OF SIL.
11CF 20DD            BRA     SILA
11D1 1042    SILD    BSET    0,ALLBIT
11D3 20F4            BRA     SILE
11D5 A601    NOTSSS  LDA     #$01
11D7 B15C            CMP     WRDTAB                  ;01 - WRDTAB
11D9 2605            BNE     NOTTEE
11DB D61C6E          LDA     T,X
11DE 200E            BRA     READY
11E0 A602    NOTTEE  LDA     #$02
11E2 B15C            CMP     WRDTAB
11E4 2605            BNE     VWRD
11E6 D61D56          LDA     U,X
11E9 2003            BRA     READY
11EB D61E32  VWRD    LDA     V,X
11EE BE50    READY   LDX     WDAR                    ;$051 1ST TIME
11F0 F7              STA     0,X                     ;SUH ADD - 051 1ST TIME
11F1 3C5A            INC     FXWRD
11F3 BE5A            LDX     FXWRD                   ;FOR NEXT ADD BYTE
11F5 3C50            INC     WDAR
11F7 3A5E            DEC     FOURC                   ;4 ADD BYTES YET?
11F9 268C            BNE     MODATA                  ;NO
11FB B653            LDA     BUH                     ;YES
11FD A40F            AND     #$0F                    ;GET EPROM WRD IS IN
11FF B75B            STA     EPRES
1201 B653            LDA     BUH                     ;ONLY NEED 4 MSB
1203 44              LSRA
1204 44              LSRA
1205 44              LSRA
1206 44              LSRA
1207 B753            STA     BUH
1209 0A4051  ZZSPK   BRSET   5,RAMBIT,ALLOVR         ;RETURN BIT
120C 1F01            BCLR    7,PORTB                 ;START READ OF A/D
120E 0C03FD  ZZSPK1  BRSET   6,PORTD,ZZSPK1          ;LV WHEN PORT C IS AVAIL
1211 4F              CLRA
1212 B706            STA     CDDR                    ;CHANGE C TO INPUT PORT
1214 1600            BSET    3,PORTA                 ;LATCH A/D
1216 1700            BCLR    3,PORTA
1218 1F01            BCLR    7,PORTB                 ;READ IS DONE
121A 1401            BSET    2,PORTB                 ;EN OUTPUTS OF INPUT PORT
121C B602            LDA     PORTC
121E B78D            STA     SAMPLE
1220 1501            BCLR    2,PORTB                 ;3 STATE I/O PORT OUTPUTS
1222 A6FF            LDA     #$FF
1224 B706            STA     CDDR                    ;PORTC BACT TO SPCH SYN
1226 B65B            LDA     EPRES
1228 B700            STA     PORTA
122A B652            LDA     SLH
122C B702            STA     PORTC                   ;EPROM SELECTED
122E 1600            BSET    3,PORTA                 ;LATCH SLH
1230 1700            BCLR    3,PORTA                 ;SLH IS AT D00-D07
1232 B651            LDA     SUH
```

```
1234 B702              STA     PORTC           ;SUH IS AT CO - C7
                 ;                              SPCH BYTE IS NOW ON
                 ;                              DATA BUS
1236 1E00              BSET    7,PORTA         ;STROBE SPCH.SYN
1238 1F00              BCLR    7,PORTA         ;REMOVE RESET & DRIVES BUSY HI
123A 1701              BCLR    3,PORTB
123C 9D                NOP
123D 1601              BSET    3,PORTB
123F B68D              LDA     SAMPLE
1241 B165              CMP     TH1
1243 250F              BCS     MINCNT
1245 4F        ONMESS  CLRA
1246 B154              CMP     BLH
1248 271A              BEQ     OU
124A 3A54      IN      DEC     BLH
124C A6FF              LDA     #$FF
124E B154              CMP     BLH             ;FF - BLH
1250 2718              BEQ     MINUS
1252 2042              BRA     MORBYT
1254 08BAEE    MINCNT  BRSET   4,SENSIT,ONMESS ;DON'T COUNT IT IF SET
1257 188A              BSET    4,SENSIT        ;SET MIN BIT TO FLAG A TH1 CROSSO
                 VER
1259 3C8C              INC     MINCTR          ;COUNT IT
125B 20E8              BRA     ONMESS
125D 1B40      ALLOVR  BCLR    5,RAMBIT
125F 1800              BSET    4,PORTA
1261 1900              BCLR    4,PORTA
1263 81                RTS
1264 B153      OU      CMP     BUH
1266 2706              BEQ     OUT
1268 20E0              BRA     IN
126A 3A53      MINUS   DEC     BUH
126C 2028              BRA     MORBYT
126E 1800      OUT     BSET    4,PORTA         ;RESET SPCH SYN
1270 1900              BCLR    4,PORTA
1272 3859              LSL     SILREG          ;X 2
1274 B659              LDA     SILREG
1276 2710              BEQ     HOP             ;NO SILENCE
1278 A106              CMP     #$06
127A 2602              BNE     NOT160
127C A608              LDA     #$8
127E CD110A    NOT160  JSR     WAIT
1281 014204            BRCLR   0,ALLBIT,HOP
1284 1142              BCLR    0,ALLBIT
1286 20F6              BRA     NOT160
1288 3A56      HOP     DEC     NUMWRD
128A 2605              BNE     TINUE
128C 1342              BCLR    1,ALLBIT        ;SILENCE AFTER WRD
128E 1D40              BCLR    6,RAMBIT        ;IN MESAGE BIT ROUTINE
1290 81                RTS
                 ;
                 ;
                 ;
1291 3C57      TINUE   INC     WRDOFF          ;MESSAGE TABLE OFFSET
1293 CC1159            JMP     NEXWRD
1296 3C52      MORBYT  INC     SLH
1298 2602              BNE     CUM
129A 3C51              INC     SUH
129C 4F        CUM     CLRA
129D CC1209            JMP     ZZSPK
                 ;
                 ; END OF MESAGE S.R.
                 ;
                 ; VENTILATION ROUTINE
                 ;
12A0 9A        VENT    CLI
12A1 CD1036            JSR     CLRAMO          ;CLR RAM
12A4 A632              LDA     #$32
12A6 B765              STA     TH1
12A8 A603              LDA     #$03            ;SV LAMP # IS 3
12AA CD1101            JSR     LAMPON          ;TURN ON SVLAMP
```

```
12AD AE02           LDX     #$02
12AF BF64           STX     FIRST
12B1 BE64   TALKV   LDX     FIRST
12B3 CD1122         JSR     MESAGE      ;MESS. NOS. 2 THRU 8
12B6 3C64           INC     FIRST
12B8 B664           LDA     FIRST
12BA A109           CMP     #$09
12BC 26F3           BNE     TALKV
12BE 1742   SVAGIN  BCLR    3,ALLBIT    ;A/D BIT
12C0 CD16C1         JSR     AD1         ;GET A VENTILATION SAMPLE
12C3 B666           LDA     MAXVAL
12C5 A17D           CMP     #$7D        ;1.25 LITERS

12C7 243B           BCC     V1
12C9 A602           LDA     #$2
12CB B168           CMP     BADC1       ;THIRD TIME "TOO SHALLOW"?
12CD 260E           BNE     V2          ;NO
12CF 3F68           CLR     BADC1       ;YES - SUGGEST PROBLEM
12D1 AE09           LDX     #$09
12D3 CD1122         JSR     MESAGE      ;MESSAGE NO. 9
12D6 AE0A           LDX     #$0A
12D8 CD1122         JSR     MESAGE      ;MESSAGE NO. 10
12DB 2007           BRA     V3
12DD 3C68   V2      INC     BADC1
12DF AE0B           LDX     #$B
12E1 CD1122         JSR     MESAGE      ;MESS #11
12E4 3C69   V3      INC     BADC
12E6 3F6A           CLR     GOODC
12E8 A605           LDA     #$5
12EA B169           CMP     BADC        ;5 ERRORS TOTAL
12EC 2721           BEQ     V6          ;YES
12EE AE0C   V4      LDX     #$0C        ;NO
12F0 CD1122         JSR     MESAGE      ;MESS #12
12F3 AD03           BSR     MOVIT
12F5 CC12BE         JMP     SVAGIN
            ;
            ;       MOVIT SR
            ;
12F8 1C8A   MOVIT   BSET    6,SENSIT
12FA CD16C1         JSR     AD1
12FD B68B           LDA     ADVAL
12FF B165           CMP     TH1
1301 24F5           BCC     MOVIT
1303 81             RTS
            ;
            ;       END OF MOVIT SR
            ;
            ;
1304 A196   V1      CMP     #$96        ;1.5 LITERS
1306 2412           BCC     V5          ;YES
1308 AE0E           LDX     #$E         ;NO
130A CD1122         JSR     MESAGE      ;MESS 14
130D 20D5           BRA     V3
130F 3F68   V6      CLR     BADC1
1311 3F69           CLR     BADC
1313 AE0D           LDX     #$D
1315 CD1122         JSR     MESAGE
1318 20D4           BRA     V4
131A A1C8   V5      CMP     #$C8        ;2.0 LITERS 131C 2411           BCC     V7          ;YES
131E 3C6A           INC     GOODC       ;NO
1320 3F69           CLR     BADC
1322 B66A           LDA     GOODC
1324 A102           CMP     #$02        ;VENT DONE WELL TWICE?
1326 270E           BEQ     V8          ;YES
1328 AE0F           LDX     #$0F        ;NO
132A CD1122         JSR     MESAGE      ;MESSAGE NO. 15
132D 20BF           BRA     V4
132F AE11   V7      LDX     #$11
1331 CD1122         JSR     MESAGE      ;MESSAGE #17
```

```
1334 20AE              BRA     V3
1336 AE10      V8      LDX     #$10
1338 CD1122            JSR     MESAGE
                ;
                ;
133B AE12              LDX     #$12
133D CD1122            JSR     MESAGE          ;MESS. #18
1340 CD16C1    V9      JSR     AD1             ;GET MAX VAL OF 1ST OF
                ;                               TWO VENTILATIONS
                ;
1343 A67C              LDA     #$7C            ;LOAD VENTILATION BRACKET VALUES
1345 B76B              STA     ABLE
1347 A695              LDA     #$95
1349 B76C              STA     BAKER
134B A6C8              LDA     #$C8
134D B76D              STA     CHUCK
134F A6E1              LDA     #$E1
1351 B76E              STA     DOG
1353 CD174B            JSR     SCORC1          ;COMMENT ON 2 VENTS.
1356 ADA0              BSR     MOVIT
1358 3C6F              INC     MAXC
135A A602              LDA     #$02
135C B16F              CMP     MAXC            ;2 VENTILATIONS COMPLETED?
135E 2702              BEQ     V10             ;YES
1360 20DE              BRA     V9              ;NO
1362 3F6F      V10     CLR     MAXC
1364 B171              CMP     CBIN2           ;BOTH ARE GOOD?
1366 2707              BEQ     V11             ;YES
1368 AE18              LDX     #$18            ;NO
136A CD1122            JSR     MESAGE          ;MESS. #24
136D 2019              BRA     V12             ;GIVE 2 BREATHS AGAIN
                ;
                ;
136F A605      V11     LDA     #$05            ;CP LAMP IS #5
1371 CD1101            JSR     LAMPON          ;TURN ON CP LAMP
1374 A654              LDA     #$54            ;CAUSE IT TO BLINK
1376 CD1744            JSR     LAMPS
1379 AE19              LDX     #$19
137B CD1122            JSR     MESAGE          ;MESS. #25
137E A650              LDA     #$50
1380 CD1744            JSR     LAMPS           ;UNBLINK CP LAMP
1383 A603              LDA     #$03
1385 CD1101            JSR     LAMPON          ;TURN VENT LAMP BACK ON
1388 3F70      V12     CLR     CBIN1
138A 3F71              CLR     CBIN2
138C 3F72              CLR     CBIN3
138E 20B0              BRA     V9
                ;
                ; END OF VENTILATION ROUTINE
                ;
                ; CAROTID PULSE ROUTINE
                ;
1390 9A        CP      CLI
1391 A605              LDA     #$05
1393 CD1101            JSR     LAMPON          ; TURN ON CP LAMP.
1396 1A01              BSET    5,PORTB         ;ACTIVATE CP XDUCER
1398 AE1A              LDX     #$1A
139A BF64              STX     FIRST
139C BE64      TALKCP  LDX     FIRST
139E CD1122            JSR     MESAGE          ;MESS. NOS. 26 THRU 29
13A1 3C64              INC     FIRST
13A3 B664              LDA     FIRST
13A5 A11E              CMP     #$1E
13A7 26F3              BNE     TALKCP
13A9 A6F0              LDA     #$F0
13AB CD110A            JSR     WAIT            ;WAIT 4 SECONDS
13AE 4F                CLRA                    ;TURN ON HPLAMP
13AF CD1101            JSR     LAMPON
13B2 A654              LDA     #$54
13B4 CD1744            JSR     LAMPS           ;CAUSE IT TO BLINK
13B7 AE4E              LDX     #$4E
```

```
13B9 CD1122          JSR    MESAGE         ;MESS. #78 SUGGEST H.P. EXERCISE
13BC A650            LDA    #$50
13BE CD1744          JSR    LAMPS          ;UNBLINK
13C1 20CD            BRA    CP
                ;
                ; END OF CAROTID PULSE ROUTINE
                ;
                ; HAND POSITION ROUTINE
                ;
13C3 9A      HP      CLI
13C4 CD1036          JSR    CLRAM0         ;CLR RAM
13C7 4F              CLRA
13C8 CD1101          JSR    LAMPON         ;H.P. LAMP IS NO. 0
13CB AE1E            LDX    #$1E
13CD BF64            STX    FIRST
13CF BE64   TALKHP   LDX    FIRST
13D1 CD1122          JSR    MESAGE         ;MESS. NOS. 30 THRU 34
13D4 3C64            INC    FIRST
13D6 B664            LDA    FIRST
13D8 A123            CMP    #$23
13DA 26F3            BNE    TALKHP
13DC A619   AGINHP   LDA    #$19           ;THRESHOLD VALUE TO
13DE B765            STA    TH1            ;AVOID FALSE STARTS
13E0 1642            BSET   3,ALLBIT       ;ADC BIT
13E2 1E8A            BSET   7,SENSIT       ;IN HP ROUTINE
13E4 CD16C1          JSR    AD1            ;ROUTINE WILL RETURN
                                            WITH H.P. DATA IN
                ;                           H.P. STOR
                ;
                ;
13E7 B663            LDA    HPSTOR         ;H.P. = F MEANS GOOD
13E9 A10F            CMP    #$F
13EB 262E            BNE    BAD
13ED 3F69            CLR    BADC
13EF 3C6A            INC    GOODC
13F1 B66A            LDA    GOODC
13F3 A102            CMP    #$02
13F5 2707            BEQ    GOOD
13F7 AE23            LDX    #$23
13F9 CD1122          JSR    MESAGE         ;MESS #35
13FC 20DE            BRA    AGINHP
13FE CD1036  GOOD    JSR    CLRAM0
1401 A601            LDA    #$01
1403 CD1101          JSR    LAMPON         ;TURN ON SCC LAMP
1406 A654            LDA    #$54
1408 CD1744          JSR    LAMPS          ;BLINK IT
140B AE24            LDX    #$24
140D CD1122          JSR    MESAGE         ;MESS. #36
1410 A650            LDA    #$50
1412 CD1744          JSR    LAMPS          ;UNBLINK IT
1415 4F              CLRA
1416 CD1101          JSR    LAMPON         ;HP LAMP BACK ON
1419 20C1            BRA    AGINHP
141B 3F6A   BAD      CLR    GOODC
141D 3C69            INC    BADC
141F B669            LDA    BADC
1421 A105            CMP    #$05           ;TOTAL OF 5 BAD TRIES ?
1423 2513            BCS    ON1            ;NO
1425 3F69            CLR    BADC           ;YES
1427 AE25            LDX    #$25
1429 CD1122          JSR    MESAGE         ;MESS. #37
142C AE0D            LDX    #$0D
142E CD1122          JSR    MESAGE         ;MESS. #13
1431 AE0C            LDX    #$0C
1433 CD1122          JSR    MESAGE
1436 20A4            BRA    AGINHP
1438 CD169A  ON1     JSR    HPCHEK
143B 209F            BRA    AGINHP
                ;
                ; END OF H.P. ROUTINE
                ;
                ; SINGLE CHEST COMPRESSION ROUTINE
```

```
                                                    ;
143D  9A       SCC      CLI                         ;CLR SEQ. RAM
143E  CD1036            JSR      CLRAM0
1441  A632              LDA      #$32
1443  B765              STA      TH1
1445  A601              LDA      #$01              ;SCC LAMP # IS 01
1447  CD1101            JSR      LAMPON
144A  AE2A              LDX      #$2A
144C  CD1122            JSR      MESAGE            ;MESS. #42
144F  AE2B              LDX      #$2B
1451  CD1122            JSR      MESAGE            ;MESS #43
1454  AE08              LDX      #$08
1456  CD1122            JSR      MESAGE            ;MESS. #8
1459  1642   RUNC1      BSET     3,ALLBIT          ;ADC BIT
145B  CD16C1            JSR      AD1
145E  B663              LDA      HPSTOR
1460  A10F              CMP      #$F
1462  270A              BEQ      UP                ;H.P. IS OK
1464  AE25              LDX      #$25
1466  CD1122            JSR      MESAGE
1469  CD169A            JSR      HPCHEK            ;H.P. IS N.G. COMMENT & TRY AGAIN
146C  20EB              BRA      RUNC1
146E  B666   UP         LDA      MAXVAL
1470  A17D              CMP      #$7D
1472  2418              BCC      UP1               ;MAXVAL IS GREATER THAN 1.25 IN

1474  A603              LDA      #$03
1476  B168              CMP      BADC1
1478  2609              BNE      UP6
147A  3F68              CLR      BADC1
147C  AE2D              LDX      #$2D
147E  CD1122            JSR      MESAGE            ;MESS. #45
1481  2072              BRA      CLOSER
1483  3C68   UP6        INC      BADC1
1485  AE2C              LDX      #$2C
1487  CD1122            JSR      MESAGE            ;MESS. #44
148A  2069              BRA      CLOSER
148C  A196   UP1        CMP      #$96              ;1.5 IN.
148E  2407              BCC      UP2
1490  AE2E              LDX      #$2E
1492  CD1122            JSR      MESAGE            ;MESS. #46
1495  205E              BRA      CLOSER
                                 ;
                                 ;
1497  A1C9   UP2        CMP      #$C9              ;2.0 IN.
1499  2451              BCC      UP3
149B  3F69              CLR      BADC
149D  3C6A              INC      GOODC
149F  AE0F              LDX      #$0F
14A1  CD1122            JSR      MESAGE            ;MESS. #15
14A4  B66A              LDA      GOODC
14A6  A103              CMP      #$03              ;GOODC - 3
14A8  2707              BEQ      BYBY
14AA  AE0C   UP5        LDX      #$C
14AC  CD1122            JSR      MESAGE
14AF  201F              BRA      UP7
14B1  3F6A   BYBY       CLR      GOODC
14B3  3F69              CLR      BADC
14B5  3F68              CLR      BADC1
14B7  A602              LDA      #$02
14B9  CD1101            JSR      LAMPON            ;TURN ON CCR LAMP
14BC  A654              LDA      #$54
14BE  CD1744            JSR      LAMPS             ;CAUSE IT TO BLINK
14C1  AE31              LDX      #$31
14C3  CD1122            JSR      MESAGE
14C6  A650              LDA      #$50
14C8  CD1744            JSR      LAMPS             ;UNBLINK IT
14CB  A601              LDA      #$01              ;TURN ON SCC LAMP
14CD  CD1101            JSR      LAMPON
14D0  1C8A   UP7        BSET     6,SENSIT          ;SAIDIT BIT
14D2  CD16C1            JSR      AD1
```

```
14D5 B68B            LDA    ADVAL
14D7 B165            CMP    TH1              ;MAXVAL - TH1
14D9 2403            BCC    LETGO
14DB CC1459          JMP    RUNC1
14DE AE29    LETGO   LDX    #$29
14E0 CD1122          JSR    MESAGE
14E3 20EB            BRA    UP7
14E5 AE30    UP4     LDX    #$30
14E7 CD1122          JSR    MESAGE           ;MESS. #48
14EA 2009            BRA    CLOSER
14EC A1F0    UP3     CMP    #$F0             ;MAXVAL - F0
14EE 24F5            BCC    UP4
14F0 AE2F            LDX    #$2F
14F2 CD1122          JSR    MESAGE           ;MESS. #47
14F5 3F6A    CLOSER  CLR    GOODC
14F7 3C69            INC    BADC
14F9 A605            LDA    #$05
14FB B169            CMP    BADC             ;5 - BADC
14FD 26AB            BNE    UP5
14FF 3F69            CLR    BADC
1501 3F68            CLR    BADC1
1503 AE0D            LDX    #$0D
1505 CD1122          JSR    MESAGE           ;MESS #13
1508 20A0            BRA    UP5
             ;
             ; END OF SCC ROUTINE
             ;
             ; CHEST COMPRESSION RHYTHM ROUTINE
             ;
150A 9A      CCR     CLI
150B A602            LDA    #$02             ;TURN ON CCR LAMP
150D CD1101          JSR    LAMPON
1510 AE32            LDX    #$32
1512 CD1122          JSR    MESAGE           ;MESS. #50
1515 AE08            LDX    #$08
1517 CD1122          JSR    MESAGE           ;MESS. #8
151A CD1036  CCRA    JSR    CLRAM0           ;CLEAR RAM
151D A632            LDA    #$32
151F B765            STA    TH1              ;COMPRESSION THRESHOLD DETECT
1521 A67C            LDA    #$7C
1523 B76B            STA    ABLE
1525 A695            LDA    #$95
1527 B76C            STA    BAKER
1529 A6C8            LDA    #$C8
152B B76D            STA    CHUCK
152D A6E1            LDA    #$E1
152F B76E            STA    DOG
1531 1642            BSET   3,ALLBIT         ;ADCBIT
1533 1A8A            BSET   5,SENSIT         ;1ST CC BIT
1535 CD16C1  CCR1    JSR    AD1
1538 B663            LDA    HPSTOR
153A A10F            CMP    #$F
153C 2712            BEQ    CCR2             ;H.P. IS OK
153E 3F6F            CLR    MAXC
1540 AE25            LDX    #$25
1542 CD1122          JSR    MESAGE
1545 CD169A          JSR    HPCHEK           ;H.P. IS NG COMMENT AND TRY AGAIN
1548 20D0            BRA    CCRA
154A CC160A  CCR13   JMP    CCR3
154D CC1605  CCR14   JMP    CCRB
1550 A670    CCR2    LDA    #$70
1552 B709            STA    TCR
1554 0A8AF3          BRSET  5,SENSIT,CCR13
1557 B608            LDA    TDR
1559 BE6F            LDX    MAXC
155B 5A              DECX
155C E77A            STA    PERIOD,X
155E B796            STA    NEWNUM
1560 CD1613          JSR    ADDIT            ;SUM PERIODS IN TOTMSB ,TOTLSB
1563 3F08    CCR4    CLR    TDR              ;START NEW COUNT
1565 CD174B          JSR    SCORC1           ;COMMENT ON COMPRESSION DEPTH
```

```
1568 1C8A      COMEUP  BSET    6,SENSIT        ;SAID IT BIT
156A CD16C1            JSR     AD1
156D B68B              LDA     ADVAL
156F A12D              CMP     #$2D
1571 2514              BCS     REST
1573 B608              LDA     TDR
1575 A1CF              CMP     #$CF
1577 2502              BCS     TIMEUP
1579 20ED              BRA     COMEUP
157B AE49      TIMEUP  LDX     #$49
157D CD1122            JSR     MESAGE          ;MESS. # 73
1580 AE4A              LDX     #$4A
1582 CD1122            JSR     MESAGE          ;MESS. # 74
1585 2093              BRA     CCRA
1587 A60E      REST    LDA     #$0E
1589 B16F              CMP     MAXC            ;14 - MAXC
158B 26C0              BNE     CCR14
158D AD06              BSR     MEAN            ;15 CC ARE DONE. SUM IS IN TOTMSB
                                               & TOTLSB
               ;                               ;NOW COMPUTE AVG PERIOD
158F B69C              LDA     QUOTNT
1591 B778              STA     XBAR
1593 2013              BRA     AVGDEV
               ;
               ; COMPUTE THE MEAN SR
               ;
1595 B695      MEAN    LDA     TOTMSB          ;LOAD TOTALS
1597 B799              STA     DNDMSB
1599 B694              LDA     TOTLSB
159B B79A              STA     DNDLSB
159D 4F                CLRA                    ;LOAD DIVISOR
159E B797              STA     SORMSB
15A0 A60E              LDA     #$E
15A2 B798              STA     SORLSB
15A4 CD161E            JSR     DIV             ;ANSWER IS IN QUOTNT
15A7 81                RTS
               ;
               ;
15A8 3F96      AVGDEV  CLR     NEWNUM
15AA 3F94              CLR     TOTLSB
15AC 3F95              CLR     TOTMSB
15AE 5F                CLRX                    ;COMPUTE SUM OF X-XBAR/14 (AVG DE
                                               VIATION)
15AF E67A      LOOP4   LDA     PERIOD,X        ;SAMPLE TO A
15B1 B078              SUB     XBAR
15B3 2401              BCC     POSTIV
15B5 40                NEGA                    ;POSITIVE # ONLY
15B6 E77A      POSTIV  STA     PERIOD,X        ;ADD IT TO PREV. TOTAL
15B8 B796              STA     NEWNUM          ;SUM OF ABSOLUTE VAL. OF X-XBAR
15BA CD1613            JSR     ADDIT
               ;                               ;IS ADDED TO TOTMSB ,TOTLSB
15BD 5C                INCX
15BE A30E              CPX     #$E
15C0 26ED              BNE     LOOP4           ;14 X-XBAR ARE IN PERIOD,0 - PERI
                                               OD,13
15C2 ADD1              BSR     MEAN            ;COMPUTE AVG DEVIATION
15C4 B69C              LDA     QUOTNT
15C6 B779              STA     SIGMA
15C8 3F6F              CLR     MAXC
15CA CD177C            JSR     SCORC2          ;GIVE REPORT ON CC DEPTHS
15CD A640              LDA     #$40
15CF CD110A            JSR     WAIT
15D2 CD17C5            JSR     SCORC3          ;GIVE REPORT ON CC RHYTHM
15D5 A640              LDA     #$40
15D7 CD110A            JSR     WAIT
15DA 048A1F            BRSET   2,SENSIT,CCR5   ;SC BIT
15DD 028A2F            BRSET   1,SENSIT,CCR11  ;RHYTHM BIT
15E0 A604              LDA     #$4
15E2 CD1101            JSR     LAMPON          ;HT LAMP
15E5 A654              LDA     #$54
15E7 CD1744            JSR     LAMPS           ;BLINK IT
```

```
15EA AE4C              LDX     #$4C
15EC CD1122            JSR     MESAGE          ;MESS. #76
15EF A650              LDA     #$50
15F1 CD1744            JSR     LAMPS           ;STOP BLINK
15F4 A602              LDA     #$02
15F6 CD1101            JSR     LAMPON          ;TURN CCR LAMP BACK ON
15F9 CC151A  CCR7      JMP     CCRA            ;START AGAIN
15FC 158A    CCR5      BCLR    2,SENSIT
15FE AE4A    CCR8      LDX     #$4A
1600 CD1122            JSR     MESAGE          ;MESS. #74
1603 20F4              BRA     CCR7
1605 3C6F    CCR6      INC     MAXC
1607 CC1535            JMP     CCR1
160A 1B8A    CCR3      BCLR    5,SENSIT        ;1ST CC BIT
160C CC1563            JMP     CCR4
160F 138A    CCR11     BCLR    1,SENSIT        ;RHYTHM BIT
1611 20EB              BRA     CCR8
                  ;
                  ; END OF CCR SEQUENCE
                  ;
                  ;
                  ;
                  ; ADD 8 BIT NUMBERS
                  ;
                  ;
1613 B694    ADDIT     LDA     TOTLSB
1615 BB96              ADD     NEWNUM
1617 B794              STA     TOTLSB
1619 2402              BCC     FIN
161B 3C95              INC     TOTMSB
161D 81      FIN       RTS
                  ;
                  ;
                  ; DIVIDE 16 BIT X 16 BIT
                  ;
                  ;
161E A602    DIV       LDA     #$2
1620 B79B              STA     TEMP2           ;SHIFT CTR
1622 B697              LDA     SORMSB          ;MSBYTE OF DIVSOR
1624 BE98              LDX     SORLSB          ;LSBYTE OF DIVSOR
1626 2608              BNE     NOZERO          ;CHECK FOR DIV BY 0
1628 4D                TSTA
1629 2606              BNE     DIV01
162B A6FF              LDA     #$FF
162D B79C              STA     QUOTNT
162F 81                RTS                     ;RET WITH FF IF DIV BY 0
1630 4D      NOZERO    TSTA                    ;SHIFT ENTIRE DIVSOR LEFT
                                               ;TILL SIGN BIT = 1
1631 2B06    DIV01     BMI     OUTD            ;SIGN BIT = 1
1633 3C9B    LOOP3     INC     TEMP2           ;INC SHIFT COUNT
1635 58                LSLX
1636 49                ROLA
1637 2AFA              BPL     LOOP3           ;KEEP SHIFTING
1639 B797    OUTD      STA     SORMSB          ;RESTORE DIVSOR
163B BF98              STX     SORLSB          ;
163D 5F                CLRX                    ;CLEAR PLACE FOR QUOTIENT
                  ;
                  ; MAIN LOOP
                  ;
163E B69A    LOOP      LDA     DNDLSB          ;DIVDND -DIVSOR = NEW DIVDND
1640 B098              SUB     SORLSB
1642 B79A              STA     DNDLSB
1644 B699              LDA     DNDMSB
1646 B297              SBC     SORMSB
1648 2409              BCC     ZOT
164A B69A              LDA     DNDLSB
164C BB98              ADD     SORLSB
164E B79A              STA     DNDLSB
1650 58                LSLX
1651 2004              BRA     OVER
1653 B799    ZOT       STA     DNDMSB
```

```
1655 99              SEC
1656 59              ROLX
1657 49       OVER   ROLA
1658 3497           LSR    SORMSB
165A 3698           ROR    SORLSB
165C 3A9B           DEC    TEMP2
165E 26DE           BNE    LOOP
1660 44             LSRA
1661 56             RORX
1662 9F             TXA
1663 A900           ADC    #$0
1665 B79C           STA    QUOTNT
1667 81             RTS
;
;
;
; HEIMLICK THRUST ROUTINE
;
;
1668 9A       HT     CLI
1669 A604           LDA    #$04
166B CD1101         JSR    LAMPON           ;TURN ON HT LAMP
166E AE4F           LDX    #$4F
1670 BF64           STX    FIRST
1672 BE64     TALKHT LDX   FIRST
1674 CD1122         JSR    MESAGE           ;VOICE MESSAGES
1677 3C64           INC    FIRST
1679 B664           LDA    FIRST            ;79 THRU 81
167B A152           CMP    #$52
167D 26F3           BNE    TALKHT
167F A6F0           LDA    #$F0
1681 CD110A         JSR    WAIT             ;WAIT 4 SECS.
1684 A603           LDA    #$03             ;BLINK VENT LAMP
1686 CD1101         JSR    LAMPON
1689 A654           LDA    #$54
168B CD1744         JSR    LAMPS
168E AE52           LDX    #$52
1690 CD1122         JSR    MESAGE           ;MESS. #82
1693 A650           LDA    #$50
1695 CD1744         JSR    LAMPS            ;UNBLINK VENT. LAMP
1698 20CE           BRA    HT
;
;
;
; HAND POSITION CHECK SUB-ROUTINE
; (ENTER WITH H.P. DATA IN H.P. STOR)
;
169A 056316   HPCHEK BRCLR 2,HPSTOR,HI
169D 03630C   HP2    BRCLR 1,HPSTOR,TOOLOW
16A0 016317   HP3    BRCLR 0,HPSTOR,OFFC
16A3 076314          BRCLR 3,HPSTOR,OFFC
16A6 AE29     HP4    LDX   #$29
16A8 CD1122          JSR   MESAGE           ;MESS. #41
16AB 81              RTS
16AC AE27     TOOLOW LDX   #$27
16AE CD1122          JSR   MESAGE           ;MESS. #39
16B1 20ED            BRA   HP3
16B3 AE26     HI     LDX   #$26
16B5 CD1122          JSR   MESAGE           ;MESS. #38
16B8 20E3            BRA   HP2
16BA AE28     OFFC   LDX   #$28
16BC CD1122          JSR   MESAGE           ;MES. #40
16BF 20E5            BRA   HP4
;
; END OF HPCHECK  SUB-ROUTINE
;
; THIS ROUTINE GETS THE MAXIMUM VALUE OF A CHEST
; COMPRESSION DEPTH ,HAND POSITION DATA OR THE MAXIMUM
; VENTILATION.
;
```

```
; A TO D SUB-ROUTINE
;
16C1 3F76      AD1     CLR     SMPOL1          ;CLR RAM
16C3 3F77              CLR     SMPOL2
16C5 A655              LDA     #$55
16C7 CD1744            JSR     LAMPS           ;TURN ON WAIT LAMP
16CA 1701      RUNC2   BCLR    3,PORTB         ;START A/D CONVER.
16CC 9D                NOP                     ;DRIVE A/D INTR HI
16CD 9D                NOP
16CE 9D                NOP
16CF 1601              BSET    3,PORTB
16D1 0803FD    CONV    BRSET   4,PORTD,CONV    ;WAIT HERE TILL A/D INTR
16D4                                           ;GOES LOW AT END OF CONV.
16D4 074204            BRCLR   3,ALLBIT,ADV2
16D7 1F01              BCLR    7,PORTB         ;START READ OF A/D CC
16D9 2002              BRA     READO
16DB 1901      ADV2    BCLR    4,PORTB         ;START READ A/D VENT
16DD 1600      READO   BSET    3,PORTA         ;LATCH AD DATA INTO IN PORT
16DF 9D                NOP
16E0 9D                NOP
16E1 9D                NOP
16E2 1700              BCLR    3,PORTA
16E4 1E01              BSET    7,PORTB         ;REMOVE READ A/D
16E6 1801              BSET    4,PORTB
16E8 4F                CLRA
16E9 B706              STA     CDDR            ;PORTC BECOMES INPUT PORT
16EB 1401              BSET    2,PORTB         ;OUTPUT A/D DATA FROM EXTER.
16ED 9D                NOP                     ;I/O LATCHES TO I/O OUTPUTS
16EE B602              LDA     PORTC
16F0 1501              BCLR    2,PORTB         ;3 STATE I/O OUTPUTS
16F2 B767              STA     SMPNEW
16F4 B78B              STA     ADVAL           ;FOR USE ON WAY DOWN
16F6 A6FF              LDA     #$FF
16F8 B706              STA     CDDR            ;PORTC BACK TO OUTPUT PORT
16FA 0C8A08            BRSET   6,SENSIT,JUSTAD         ;FOR RELEASE OF CC
16FD B665              LDA     TH1
16FF B167              CMP     SMPNEW          ;TH1 - SAMPLE
1701 2506              BCS     RUNC3
1703 20C5              BRA     RUNC2
1705 1D8A      JUSTAD  BCLR    6,SENSIT        ;SAIDIT BIT
1707 2033              BRA     TELLIT
               ;
               ;
1709 1442      RUNC3   BSET    2,ALLBIT        ;TH1BIT
170B 1C01              BSET    6,PORTB         ;EN A (HP) SIDE OF MUX
170D B603              LDA     PORTD           ;HP SW DATA IS A3-A0
                                               INPUT HP SW DATA
170F 1D01              BCLR    6,PORTB         ;EN B (MEMBRANE SW) SIDE OF MUX
1711 A40F              AND     #$0F            ;ZERO A7-A3
1713 B763              STA     HPSTOR          ;HAND POSITION SW DATA
1715 0E8A1C            BRSET   7,SENSIT,GOTIT
1718 B667              LDA     SMPNEW
171A AB05              ADD     #$5
171C B176              CMP     SMPOL1          ;SMPNEW - SMPOLD
171E 2518              BCS     RUNC5           ;SMPNEW NOT GREATER
1720 B676              LDA     SMPOL1
1722 B177              CMP     SMPOL2          ;SMPOL1 - SMPOL2
1724 2406              BCC     BIGGER
1726 B677              LDA     SMPOL2
1728 B776              STA     SMPOL1
172A 209E              BRA     RUNC2
172C B777      BIGGER  STA     SMPOL2
172E B667              LDA     SMPNEW
1730 B776              STA     SMPOL1
1732 2096              BRA     RUNC2
1734 1F8A      GOTIT   BCLR    7,SENSIT        ;HP ROUTINE BIT
1736 2004              BRA     TELLIT
1738 B676      RUNC5   LDA     SMPOL1
173A B766              STA     MAXVAL
173C 1542      TELLIT  BCLR    2,ALLBIT
173E A650              LDA     #$50            ;CLR WAIT BIT
```

```
1740 CD1744         JSR       LAMPS           ;TURN OFF WAIT LAMP
1743 81             RTS
                    ;
                    ; END OF AD1 S.R. ON RETURN MAX. VALUE
                    ; OF COMPRESSION IS IN MAXVAL AND HAND
                    ; POSITION DATA IS IN HP STOR AND ACCUM.
                    ;
                    ;
                    ; LAMPS SUB ROUTINE
                    ;
1744 B700      LAMPS STA       PORTA           ;RAISE APPRO. BITS
1746 1D00            BCLR      6,PORTA         ;DROP STROBE
1748 1900            BCLR      4,PORTA
174A 81              RTS

; SCORC1 SUB-ROUTINE
                    ;
                    ;THIS ROUTINE GIVES VOICE COACHING DURING EACH CHEST COMPRESSION
                    ;# OF TOO DEEP,TOO SHALLOW,&GOOD ONES ARE TALLIED
                    ;
                    ;
174B B666      SCORC1 LDA      MAXVAL
174D AE13            LDX       #$13            ;INITIALIZE X TO
                    ;                           MESS. NO. 19
174F B16B            CMP       ABLE
1751 240D            BCC       SCOR1
1753 3C70      SCOR5 INC       CBIN1
                    ;
                    ;
                    ;
                    ;
1755 1701      SCOR4 BCLR      3,PORTB         ;START A/D CONV
1757 9D              NOP
1758 1601            BSET      3,PORTB
175A 198A            BCLR      4,SENSIT        ;FLAGS A NEW MAX TO MES. SR
175C CD1122          JSR       MESAGE          ;COMMENT ON DEPTH
                    ;                           OF CC.
175F 81              RTS
1760 5C        SCOR1 INCX                      ;INDEX TO NEXT HIGHER MESS.
1761 B16C            CMP       BAKER           ;A - 150
1763 2402            BCC       SCOR6           ;MAXVAL IS HIGHER
1765 20EC            BRA       SCOR5           ;TALLY IN SAME BIN
1767 5C        SCOR6 INCX
1768 B16D            CMP       CHUCK
176A 2404            BCC       SCOR7
176C 3C71            INC       CBIN2
176E 20E5            BRA       SCOR4
1770 5C        SCOR7 INCX                      ;INDEX TO NEXT HIGHER MESS.
1771 B16E            CMP       DOG
1773 2404            BCC       SCOR8
1775 3C72      SCOR2 INC       CBIN3
1777 20DC            BRA       SCOR4
1779 5C        SCOR8 INCX                      ;INDEX TO NEXT HIGHER MESS.
177A 20F9            BRA       SCOR2           ;SAME BIN

;
                    ; END OF SCORC1 SUB-ROUTINE
                    ;
                    ; SCORC2 SUB-ROUTINE
                    ;
                    ; VOCALIZATION OF OVERALL PERFORMANCE WITH RESPECT TO
                    ; DEPTH OF CHEST COMPRESSIONS
                    ;
177C 158A      SCORC2 BCLR     2,SENSIT        ;SC BIT
177E A620            LDA       #$20
1780 CD110A          JSR       WAIT            ;PAUSE BEFOR MESAGE
1783 BE70            LDX       CBIN1
1785 270C            BEQ       NXBIN1
1787 AD34            BSR       NUMBER
1789 AE2C            LDX       #$2C
178B CD1122          JSR       MESAGE          ;"TOO SHALLOW"
178E A620            LDA       #$20
```

```
1790 CD110A            JSR     WAIT            ;PAUSE BEFOR MESAGE
1793 BE71      NXBIN1  LDX     CBIN2
1795 270C              BEQ     NXBIN2
1797 AD24              BSR     NUMBER
1799 AE15              LDX     #$15            ;"GREAT"
179B CD1122            JSR     MESAGE
179E A620              LDA     #$20
17A0 CD110A            JSR     WAIT            ;PAUSE BEFOR MESAGE
17A3 BE72      NXBIN2  LDX     CBIN3
17A5 270C              BEQ     FINE
17A7 AD14              BSR     NUMBER
17A9 AE30              LDX     #$30
17AB CD1122            JSR     MESAGE          ;"TOO DEEP"
17AE A620              LDA     #$20
17B0 CD110A            JSR     WAIT            ;PAUSE BEFOR MESAGE
17B3 A609      FINE    LDA     #$9
17B5 B171              CMP     CBIN2
17B7 2401              BCC     NOGD
17B9 81                RTS
17BA 148A      NOGD    BSET    2,SENSIT        ;FLAG FOR NOT GOOD ENOUGH
17BC 81                RTS
                       ;
                       ; NUMBER SUB-ROUTINE
                       ;
                       ;
17BD 9F        NUMBER  TXA                     ;BIN VAL TO A
17BE AB33              ADD     #$33            ;ADD 51
17C0 97                TAX
17C1 CD1122            JSR     MESAGE          ;MESS. #52 - 66
17C4 81                RTS
                       ;
                       ; END OF SCORC2 SUB-ROUTINE
                       ;
                       ; SCORC3 SUB-ROUTINE
                       ;
                       ;THIS ROUTINE VOCALIZES AN ASSESMENT OF THE TIMING
                       ;OF THE CC.
                       ;
17C5 138A      SCORC3  BCLR    1,SENSIT        ;CC RHYTHM BIT
17C7 B678              LDA     XBAR            ;MEAN PERIOD
17C9 A1B5              CMP     #$B5
17CB 2513              BCS     C31
17CD B679              LDA     SIGMA
17CF A105              CMP     #$05
17D1 252A              BCS     C32
17D3 AE43              LDX     #$43
17D5 CD1122            JSR     MESAGE          ;MESS. #67
17D8 AE33      C33     LDX     #$33
17DA CD1122            JSR     MESAGE          ;MESS #51
17DD 128A              BSET    1,SENSIT        ;RHYTHM BIT
17DF 81        C35     RTS
17E0 A1A2      C31     CMP     #$A2
17E2 250C              BCS     C34
17E4 B679              LDA     SIGMA
17E6 A105              CMP     #$05
17E8 241A              BCC     C36
17EA AE48              LDX     #$48
17EC CD1122            JSR     MESAGE          ;MESS. #72
17EF 81                RTS
17F0 B679      C34     LDA     SIGMA
17F2 A105              CMP     #$05
17F4 2415              BCC     C37
17F6 AE46              LDX     #$46
17F8 CD1122            JSR     MESAGE          ;MESS. #70
17FB 20DB              BRA     C33
17FD AE44      C32     LDX     #$44
17FF CD1122            JSR     MESAGE          ;MESS #68
1802 20D4              BRA     C33
1804 AE47      C36     LDX     #$47
1806 CD1122            JSR     MESAGE          ;MESS. #71
1809 20CD              BRA     C33
```

```
180B AE45      C37      LDX      #$45
180D CD1122             JSR      MESAGE          ;MESS. #69
1810 20C6               BRA      C33
                ;
                ; END OF SCORC3 SUB-ROUTINE
                ;
                ;** START OF TABLES **
                ;Index Table
1812 0C        I        DB       $C       ; Msg#  0
1813 00                 DB       $0
1814 38                 DB       $38      ; Msg#  1
1815 03                 DB       $3
1816 38                 DB       $38      ; Msg#  2
1817 11                 DB       $11
1818 60                 DB       $60      ; Msg#  3
1819 1F                 DB       $1F
181A 08                 DB       $8       ; Msg#  4
181B 37                 DB       $37
181C 14                 DB       $14      ; Msg#  5
181D 39                 DB       $39
181E 50                 DB       $50      ; Msg#  6
181F 3E                 DB       $3E
1820 10                 DB       $10      ; Msg#  7
1821 52                 DB       $52
1822 08                 DB       $8       ; Msg#  8
1823 56                 DB       $56
1824 3C                 DB       $3C      ; Msg#  9
1825 58                 DB       $58
1826 0C                 DB       $C       ; Msg# 10
1827 67                 DB       $67
1828 0C                 DB       $C       ; Msg# 11
1829 6A                 DB       $6A
182A 18                 DB       $18      ; Msg# 12
182B 6D                 DB       $6D
182C 18                 DB       $18      ; Msg# 13
182D 73                 DB       $73
182E 08                 DB       $8       ; Msg# 14
182F 79                 DB       $79
1830 2C                 DB       $2C      ; Msg# 15
1831 7B                 DB       $7B
1832 18                 DB       $18      ; Msg# 16
1833 86                 DB       $86
1834 48                 DB       $48      ; Msg# 17
1835 8C                 DB       $8C
1836 04                 DB       $4       ; Msg# 18
1837 9E                 DB       $9E
1838 04                 DB       $4       ; Msg# 19
1839 9F                 DB       $9F
183A 04                 DB       $4       ; Msg# 20
183B A0                 DB       $A0
183C 04                 DB       $4       ; Msg# 21
183D A1                 DB       $A1
183E 04                 DB       $4       ; Msg# 22
183F A2                 DB       $A2
1840 14                 DB       $14      ; Msg# 23
1841 A3                 DB       $A3
1842 90                 DB       $90      ; Msg# 24
1843 A8                 DB       $A8
1844 34                 DB       $34      ; Msg# 25
1845 CC                 DB       $CC
1846 38                 DB       $38      ; Msg# 26
1847 D9                 DB       $D9
1848 20                 DB       $20      ; Msg# 27
1849 E7                 DB       $E7
184A 38                 DB       $38      ; Msg# 28
184B EF                 DB       $EF
184C 79                 DB       $79      ; Msg# 29
184D 00                 DB       $0
184E 21                 DB       $21      ; Msg# 30
184F 1E                 DB       $1E
1850 5D                 DB       $5D      ; Msg# 31
```

```
1851 26      DB    $26
1852 2D      DB    $2D    ; Msg# 32
1853 3D      DB    $3D
1854 29      DB    $29    ; Msg# 33
1855 48      DB    $48
1856 31      DB    $31    ; Msg# 34
1857 52      DB    $52
1858 79      DB    $79    ; Msg# 35
1859 5E      DB    $5E
185A 29      DB    $29    ; Msg# 36
185B 7C      DB    $7C
185C 11      DB    $11    ; Msg# 37
185D 86      DB    $86
185E 11      DB    $11    ; Msg# 38
185F 8A      DB    $8A
1860 0D      DB    $D     ; Msg# 39
1861 8E      DB    $8E
1862 29      DB    $29    ; Msg# 40
1863 91      DB    $91
1864 4D      DB    $4D    ; Msg# 41
1865 9B      DB    $9B
1866 49      DB    $49    ; Msg# 42
1867 AE      DB    $AE
1868 11      DB    $11    ; Msg# 43
1869 C0      DB    $C0
186A 55      DB    $55    ; Msg# 44
186B C4      DB    $C4
186C 19      DB    $19    ; Msg# 45
186D D9      DB    $D9
186E 11      DB    $11    ; Msg# 46
186F DF      DB    $DF
1870 09      DB    $9     ; Msg# 47
1871 E3      DB    $E3
1872 35      DB    $35    ; Msg# 48
1873 E5      DB    $E5
1874 AA      DB    $AA    ; Msg# 49
1875 00      DB    $0
1876 1A      DB    $1A    ; Msg# 50
1877 2A      DB    $2A
1878 0A      DB    $A     ; Msg# 51
1879 30      DB    $30
187A 12      DB    $12    ; Msg# 52
187B 32      DB    $32
187C 0E      DB    $E     ; Msg# 53
187D 36      DB    $36
187E 0E      DB    $E     ; Msg# 54
187F 39      DB    $39
1880 0E      DB    $E     ; Msg# 55
1881 3C      DB    $3C
1882 0E      DB    $E     ; Msg# 56
1883 3F      DB    $3F
1884 0E      DB    $E     ; Msg# 57
1885 42      DB    $42
1886 0E      DB    $E     ; Msg# 58
1887 45      DB    $45
1888 0E      DB    $E     ; Msg# 59
1889 48      DB    $48
188A 0E      DB    $E     ; Msg# 60
188B 4B      DB    $4B
188C 0E      DB    $E     ; Msg# 61
188D 4E      DB    $4E
188E 0E      DB    $E     ; Msg# 62
188F 51      DB    $51
1890 16      DB    $16    ; Msg# 63
1891 54      DB    $54
1892 16      DB    $16    ; Msg# 64
1893 59      DB    $59
1894 12      DB    $12    ; Msg# 65
1895 5E      DB    $5E
1896 1A      DB    $1A    ; Msg# 66
1897 62      DB    $62
1898 0E      DB    $E     ; Msg# 67
```

```
1899 68              DB    $68
189A 1A              DB    $1A      ; Msg# 68
189B 6B              DB    $6B
189C 0E              DB    $E       ; Msg# 69
189D 71              DB    $71
189E 0E              DB    $E       ; Msg# 70
189F 74              DB    $74
18A0 0E              DB    $E       ; Msg# 71
18A1 77              DB    $77
18A2 16              DB    $16      ; Msg# 72
18A3 7A              DB    $7A
18A4 2E              DB    $2E      ; Msg# 73
18A5 7F              DB    $7F
18A6 1A              DB    $1A      ; Msg# 74
18A7 8A              DB    $8A
18A8 6A              DB    $6A      ; Msg# 75
18A9 90              DB    $90
18AA 12              DB    $12      ; Msg# 76
18AB AA              DB    $AA
18AC 2A              DB    $2A      ; Msg# 77
18AD AE              DB    $AE
18AE 1E              DB    $1E      ; Msg# 78
18AF B8              DB    $B8
18B0 3A              DB    $3A      ; Msg# 79
18B1 BF              DB    $BF
18B2 5A              DB    $5A      ; Msg# 80
18B3 CD              DB    $CD
18B4 2A              DB    $2A      ; Msg# 81
18B5 E3              DB    $E3
          ;    L Table
18B6 D2   L          DB    $D2      ;Msg#  0, WEL
18B7 FD              DB    $FD               COME_TO_COACH_ANDY
18B8 27              DB    $27
18B9 FD              DB    $FD      ;Msg#  1, VENTILATION
18BA DB              DB    $DB
18BB 84              DB    $84      ;         OPEN_THE_AIRWAY
18BC F8              DB    $F8      ;         BY
18BD 13              DB    $13
18BE 32              DB    $32      ;         GENTLY
18BF C0              DB    $C0      ;         TILT1
18C0 F9              DB    $F9      ;         ING
18C1 40              DB    $40
18C2 F9              DB    $F9      ;         THE3
18C3 A6              DB    $A6
18C4 73              DB    $73      ;         HEAD
18C5 FE              DB    $FE      ;         WAY_BACK
18C6 CE              DB    $CE
18C7 75              DB    $75      ;Msg#  2, PRESS1
18C8 F9              DB    $F9      ;         DOWN
18C9 3F              DB    $3F
18CA F9              DB    $F9      ;         ON
18CB 78              DB    $78
18CC FA              DB    $FA      ;         THE_MANIKINS
18CD A9              DB    $A9
18CE 2E              DB    $2E      ;         FOREHEAD
18CF DD              DB    $DD      ;         WITH_THE
18D0 8C              DB    $8C      ;         PALM
18D1 74              DB    $74      ;         OF
18D2 69              DB    $69      ;         ONE2
18D3 FC              DB    $FC      ;         HAND
18D4 6B              DB    $6B
18D5 D5              DB    $D5      ;Msg#  3, WITH1
18D6 E5              DB    $E5      ;         YOUR_OTHER
18D7 6B              DB    $6B      ;         HAND
18D8 55              DB    $55      ;         LIFT
18D9 F8              DB    $F8      ;         EITHER
18DA 47              DB    $47
18DB CC              DB    $CC      ;         UNDER_THE
18DC 93              DB    $93      ;         NECK
18DD F9              DB    $F9      ;         NEAR_THE
18DE 4A              DB    $4A
```

```
18DF  FC          DB      $FC     ;       BASE_OF_THE_HEAD
18E0  07          DB      $7
18E1  FA          DB      $FA     ;       OR
18E2  6D          DB      $6D
18E3  F8          DB      $F8     ;       WITH_THE
18E4  DD          DB      $DD
18E5  53          DB      $53     ;       FINGERTIPS
18E6  CC          DB      $CC     ;       UNDER_THE
18E7  29          DB      $29     ;       BONY_PART
18E8  9B          DB      $9B     ;       OF_THE_JAW
18E9  F8          DB      $F8     ;       NEAR_THE
18EA  4A          DB      $4A
18EB  FE          DB      $FE     ;       CHIN
18EC  1F          DB      $1F
18ED  FC          DB      $FC     ;Msg#  4, !
18EE  02          DB      $2
18EF  6A          DB      $6A     ;Msg#  5, PINCH_OFF
18F0  A9          DB      $A9     ;       THE_MANIKINS
18F1  68          DB      $68     ;       NOSTRIL
18F2  FD          DB      $FD     ;       S
18F3  89          DB      $89
18F4  62          DB      $62     ;Msg#  6, OPEN_YOUR_MOUTH
18F5  DF          DB      $DF     ;       WIDE
18F6  9A          DB      $9A     ;       TAKE_A
18F7  33          DB      $33     ;       DEEP
18F8  88          DB      $88     ;       P
18F9  FB          DB      $FB     ;       BREATH
18FA  08          DB      $8
18FB  19          DB      $19     ;       AND_MAKE_A
18FC  B2          DB      $B2     ;       TIGHT_SEAL
18FD  D1          DB      $D1     ;       WITH
18FE  A9          DB      $A9     ;       THE_MANIKINS
18FF  46          DB      $46     ;       MOUTH
1900  04          DB      $4      ;       ANND
1901  FC          DB      $FC     ;       BLOW1
1902  0F          DB      $F
1903  C2          DB      $C2     ;       TRY_A
1904  FA          DB      $FA     ;       SINGLE
1905  95          DB      $95
1906  FC          DB      $FC     ;       VENTILATION
1907  DB          DB      $DB
1908  F9          DB      $F9     ;Msg#  7, I_WILL
1909  4C          DB      $4C
190A  F8          DB      $F8     ;       TELL_YOU_HOW_YOU_DID
190B  C3          DB      $C3
190C  FC          DB      $FC     ;Msg#  8, MORE_AIR
190D  8F          DB      $8F
190E  21          DB      $21     ;Msg#  9, BE_SURE_THAT
190F  E1          DB      $E1     ;       YOURE
1910  9E          DB      $9E     ;       TAKING_A
1911  33          DB      $33     ;       DEEP
1912  F9          DB      $F9     ;       P
1913  88          DB      $88
1914  FA          DB      $FA     ;       BREATH
1915  08          DB      $8
1916  15          DB      $15     ;       AND_KEEPING_A
1917  B2          DB      $B2     ;       TIGHT_SEAL
1918  D1          DB      $D1     ;       WITH
1919  A9          DB      $A9     ;       THE_MANIKINS
191A  68          DB      $68     ;       NOSTRIL
191B  FC          DB      $FC     ;       S
191C  89          DB      $89
191D  0A          DB      $A      ;Msg# 10, BLOW2
191E  FC          DB      $FC     ;       HARDER
191F  6F          DB      $6F
1920  C4          DB      $C4     ;Msg# 11, TRY_IT
1921  F8          DB      $F8     ;       AGAIN
1922  03          DB      $3
1923  71          DB      $71     ;Msg# 12, PLEASE_ASK
1924  F9          DB      $F9     ;       THE
1925  B0          DB      $B0
1926  3A          DB      $3A     ;       INSTRUCTOR
```

```
1927 FC        DB    $FC    ;         FOR_HELP
1928 5F        DB    $5F
1929 FC        DB    $FC    ;Msg# 13, CLOSE
192A 23        DB    $23
192B 0E        DB    $E     ;         BUT
192C 0A        DB    $A     ;         BLOW2
192D FC        DB    $FC    ;         HARDER
192E 6F        DB    $6F
192F FC        DB    $FC    ;Msg# 14, EXCELLENT
1930 41        DB    $41
1931 FC        DB    $FC    ;Msg# 15, PERFECT
1932 A3        DB    $A3
1933 F9        DB    $F9    ;         NOW
1934 6C        DB    $6C
1935 FA        DB    $FA    ;         TRY_GIVING
1936 B9        DB    $B9
1937 C8        DB    $C8    ;         TWO
1938 8E        DB    $8E    ;         SLOW
1939 08        DB    $8     ;         BREATH
193A FD        DB    $FD    ;         S
193B 89        DB    $89
193C 67        DB    $67    ;Msg# 16, GOOD
193D F9        DB    $F9    ;         BUT
193E 0E        DB    $E
193F 25        DB    $25    ;         BLOW_LESS
1940 FC        DB    $FC    ;         FORCEFULLY
1941 57        DB    $57
1942 F8        DB    $F8    ;Msg# 17, BLOW2
1943 0A        DB    $A
1944 44        DB    $44    ;         INTO
1945 A9        DB    $A9    ;         THE_MANIKINS
1946 FB        DB    $FB    ;         MOUTH
1947 46        DB    $46
1948 D7        DB    $D7    ;         TWICE
1949 D5        DB    $D5    ;         WITH1
194A 1A        DB    $1A    ;         COMPLETE
194B 7E        DB    $7E    ;         RE
194C F8        DB    $F8    ;         FILLING_OF_YOUR_LUNG
194D 4B        DB    $4B
194E FA        DB    $FA    ;         S
194F 89        DB    $89
1950 FA        DB    $FA    ;         AFTER_EACH
1951 09        DB    $9
1952 FB        DB    $FB    ;         BREATH
1953 08        DB    $8
1954 60        DB    $60    ;Msg# 18, MORE!
1955 5C        DB    $5C    ;Msg# 19, MORE
1956 30        DB    $30    ;Msg# 20, GREAT
1957 54        DB    $54    ;Msg# 21, LESS
1958 58        DB    $58    ;Msg# 22, LESS!
1959 B9        DB    $B9    ;Msg# 23, TRY_GIVING
195A C8        DB    $C8    ;         TWO
195B 08        DB    $8     ;         BREATH
195C 89        DB    $89    ;         S
195D 03        DB    $3     ;         AGAIN
195E FC        DB    $FC    ;Msg# 24, !
195F 02        DB    $2
1960 41        DB    $41    ;         EXCELLENT
1961 FC        DB    $FC    ;         VENTILATION
1962 DB        DB    $DB
1963 38        DB    $38    ;         IF
1964 D0        DB    $D0    ;         YOU1
1965 1C        DB    $1C    ;         FEEL
1966 FC        DB    $FC    ;         CONFIDENT
1967 2B        DB    $2B
1968 F9        DB    $F9    ;         PRACTICE
1969 72        DB    $72
196A F8        DB    $F8    ;         CHECK
196B 31        DB    $31
196C F9        DB    $F9    ;         ING
196D 40        DB    $40
```

```
196E FA         DB      $FA     ;           THE
196F B0         DB      $B0
1970 2D         DB      $2D     ;           CAROTID
1971 FC         DB      $FC     ;           PULSE
1972 AB         DB      $AB
1973 FC         DB      $FC     ;           !
1974 02         DB      $2
1975 38         DB      $38     ;           IF
1976 D0         DB      $D0     ;           YOU1
1977 FC         DB      $FC     ;           DONT
1978 3B         DB      $3B
1979 FC         DB      $FC     ;           !
197A 02         DB      $2
197B FA         DB      $FA     ;           TRY_GIVING
197C B9         DB      $B9
197D C8         DB      $C8     ;           TWO
197E 08         DB      $8      ;           BREATH
197F FB         DB      $FB     ;           S
1980 89         DB      $89
1981 03         DB      $3      ;           AGAIN
1982 2D         DB      $2D     ;Msg# 25,   CAROTID
1983 FD         DB      $FD     ;           PULSE
1984 AB         DB      $AB
1985 A6         DB      $A6     ;           THE3
1986 2D         DB      $2D     ;           CAROTID
1987 F9         DB      $F9     ;           PULSE
1988 AB         DB      $AB
1989 F9         DB      $F9     ;           IS
198A 48         DB      $48
198B 59         DB      $59     ;           LOCATED_ON_EITHER_
198C 91         DB      $91     ;           SIDE_OF
198D FD         DB      $FD     ;           THE_ADAMS_APPLE
198E C7         DB      $C7
198F 32         DB      $32     ;Msg# 26,   GENTLY
1990 FA         DB      $FA     ;           TRY_TO
1991 BD         DB      $BD
1992 98         DB      $98     ;           SENSE
1993 FA         DB      $FA     ;           IT
1994 83         DB      $83
1995 DD         DB      $DD     ;           WITH_THE
1996 3C         DB      $3C     ;           INDEX_AND_MIDDLE
1997 24         DB      $24     ;           FINGER1
1998 89         DB      $89     ;           S
1999 74         DB      $74     ;           OF
199A 69         DB      $69     ;           ONE2
199B FD         DB      $FD     ;           HAND
199C 6B         DB      $6B
199D 5D         DB      $5D     ;Msg# 27,   MAINTAIN_THE_HEAD
199E B6         DB      $B6     ;           TILT2
199F DD         DB      $DD     ;           WITH_THE
19A0 8C         DB      $8C     ;           PALM
19A1 74         DB      $74     ;           OF
19A2 E5         DB      $E5     ;           YOUR_OTHER
19A3 FF         DB      $FF     ;           HAND
19A4 6B         DB      $6B
19A5 FA         DB      $FA     ;Msg# 28,   IF_YOU_HAVE_DIFFICULTY
19A6 4D         DB      $4D
19A7 F8         DB      $F8     ;           CHECK
19A8 31         DB      $31
19A9 40         DB      $40     ;           ING
19AA FC         DB      $FC     ;           IT
19AB 83         DB      $83
19AC FB         DB      $FB     ;           PLEASE_ASK
19AD 71         DB      $71
19AE F9         DB      $F9     ;           THE3
19AF A6         DB      $A6
19B0 3A         DB      $3A     ;           INSTRUCTOR
19B1 FF         DB      $FF     ;           FOR_HELP
19B2 5F         DB      $5F
                ; M Table
19B3 F8     M   DB      $F8     ;Msg# 29,   !
19B4 02         DB      $2
```

| | | | | |
|---|---|---|---|---|
| 19B5 FA | DB | $FA | ; | HAND1 |
| 19B6 34 | DB | $34 | | |
| 19B7 FD | DB | $FD | ; | POSITION |
| 19B8 A7 | DB | $A7 | | |
| 19B9 FA | DB | $FA | ; | FEEL |
| 19BA 1C | DB | $1C | | |
| 19BB F8 | DB | $F8 | ; | FOR_THE_BORDER_OF |
| 19BC 63 | DB | $63 | | |
| 19BD A9 | DB | $A9 | ; | THE_MANIKINS |
| 19BE 94 | DB | $94 | ; | RIB |
| 19BF FC | DB | $FC | ; | S |
| 19C0 89 | DB | $89 | | |
| 19C1 DD | DB | $DD | ; | WITH_THE |
| 19C2 3C | DB | $3C | ; | INDEX_AND_MIDDLE |
| 19C3 24 | DB | $24 | ; | FINGER1 |
| 19C4 FB | DB | $FB | ; | S |
| 19C5 89 | DB | $89 | | |
| 19C6 65 | DB | $65 | ; | OF_THE |
| 19C7 FB | DB | $FB | ; | HAND1 |
| 19C8 34 | DB | $34 | | |
| 19C9 FB | DB | $FB | ; | CLOSEST |
| 19CA 10 | DB | $10 | | |
| 19CB F8 | DB | $F8 | ; | TO |
| 19CC CF | DB | $CF | | |
| 19CD F8 | DB | $F8 | ; | THE_MANIKINS |
| 19CE A9 | DB | $A9 | | |
| 19CF FE | DB | $FE | ; | WAIST |
| 19D0 CA | DB | $CA | | |
| 19D1 64 | DB | $64 | ;Msg# 30, | MOVE_THEM_UPWARD |
| 19D2 FC | DB | $FC | ; | ALONG_THE_RIBCAGE |
| 19D3 0D | DB | $D | | |
| 19D4 C5 | DB | $C5 | ; | UNTIL_YOU_REACH |
| 19D5 F9 | DB | $F9 | ; | THE_RIBCAGE |
| 19D6 86 | DB | $86 | | |
| 19D7 FE | DB | $FE | ; | NOTCH |
| 19D8 97 | DB | $97 | | |
| 19D9 F9 | DB | $F9 | ;Msg# 31, | PLACE |
| 19DA 6E | DB | $6E | | |
| 19DB B4 | DB | $B4 | ; | THE_HEEL_OF |
| 19DC F8 | DB | $F8 | ; | YOUR_OTHER |
| 19DD E5 | DB | $E5 | | |
| 19DE FC | DB | $FC | ; | HAND1 |
| 19DF 34 | DB | $34 | | |
| 19E0 FA | DB | $FA | ; | JUST |
| 19E1 50 | DB | $50 | | |
| 19E2 FA | DB | $FA | ; | ABOVE_THE_TWO |
| 19E3 05 | DB | $5 | | |
| 19E4 28 | DB | $28 | ; | FINGER2 |
| 19E5 FD | DB | $FD | ; | S |
| 19E6 89 | DB | $89 | | |
| 19E7 A1 | DB | $A1 | ; | THEN |
| 19E8 6E | DB | $6E | ; | PLACE |
| 19E9 A6 | DB | $A6 | ; | THE3 |
| 19EA FA | DB | $FA | ; | FIRST |
| 19EB 2C | DB | $2C | | |
| 19EC F9 | DB | $F9 | ; | HAND1 |
| 19ED 34 | DB | $34 | | |
| 19EE FD | DB | $FD | ; | ON_TOP_OF_IT |
| 19EF 9F | DB | $9F | | |
| 19F0 51 | DB | $51 | ;Msg# 32, | KEEP |
| 19F1 F9 | DB | $F9 | ; | YOUR |
| 19F2 D8 | DB | $D8 | | |
| 19F3 28 | DB | $28 | ; | FINGER2 |
| 19F4 89 | DB | $89 | ; | S |
| 19F5 56 | DB | $56 | ; | OFF |
| 19F6 F8 | DB | $F8 | ; | THE_MANIKINS |
| 19F7 A9 | DB | $A9 | | |
| 19F8 94 | DB | $94 | ; | RIB |
| 19F9 FD | DB | $FD | ; | S |
| 19FA 89 | DB | $89 | | |
| 19FB 7D | DB | $7D | ;Msg# 33, | PUSH |

```
19FC  FC            DB       $FC      ;              DOWN
19FD  3F            DB       $3F
19FE  4C            DB       $4C      ;              I_WILL
19FF  31            DB       $31      ;              CHECK
1A00  D8            DB       $D8      ;              YOUR
1A01  FA            DB       $FA      ;              HAND1
1A02  34            DB       $34
1A03  F8            DB       $F8      ;              POSITION
1A04  A7            DB       $A7
1A05  FD            DB       $FD      ;Msg# 34,      FINE
1A06  4F            DB       $4F
1A07  81            DB       $81      ;              REMOVE_AND
1A08  90            DB       $90      ;              RESET_YOUR
1A09  34            DB       $34      ;              HAND1
1A0A  FC            DB       $FC      ;              S
1A0B  89            DB       $89
1A0C  FC            DB       $FC      ;              !
1A0D  02            DB       $2
1A0E  C4            DB       $C4      ;              TRY_IT
1A0F  F8            DB       $F8      ;              AGAIN
1A10  03            DB       $3
1A11  FC            DB       $FC      ;Msg# 35,      GOOD
1A12  67            DB       $67
1A13  38            DB       $38      ;              IF
1A14  D0            DB       $D0      ;              YOU1
1A15  1C            DB       $1C      ;              FEEL
1A16  FC            DB       $FC      ;              CONFIDENT
1A17  2B            DB       $2B
1A18  D4            DB       $D4      ;              YOU2
1A19  A0            DB       $A0      ;              SHOULD
1A1A  6C            DB       $6C      ;              NOW
1A1B  FB            DB       $FB      ;              PRACTICE
1A1C  72            DB       $72
1A1D  01            DB       $1       ;              A
1A1E  FA            DB       $FA      ;              SINGLE
1A1F  95            DB       $95
1A20  F9            DB       $F9      ;              CHEST
1A21  0C            DB       $C
1A22  FC            DB       $FC      ;              COMPRESSION
1A23  14            DB       $14
1A24  FC            DB       $FC      ;              !
1A25  02            DB       $2
1A26  38            DB       $38      ;              IF
1A27  D0            DB       $D0      ;              YOU1
1A28  FC            DB       $FC      ;              DONT
1A29  3B            DB       $3B
1A2A  FC            DB       $FC      ;              !
1A2B  02            DB       $2
1A2C  C4            DB       $C4      ;              TRY_IT
1A2D  F8            DB       $F8      ;              AGAIN
1A2E  03            DB       $3
1A2F  D8            DB       $D8      ;Msg# 36,      YOUR
1A30  34            DB       $34      ;              HAND1
1A31  F9            DB       $F9      ;              POSITION
1A32  A7            DB       $A7
1A33  F9            DB       $F9      ;              IS
1A34  48            DB       $48
1A35  4E            DB       $4E      ;              NOT
1A36  7A            DB       $7A      ;              QUITE
1A37  FC            DB       $FC      ;              RIGHT
1A38  B3            DB       $B3
1A39  F9            DB       $F9      ;Msg# 37,      TOO
1A3A  BE            DB       $BE
1A3B  FC            DB       $FC      ;              HIGH
1A3C  77            DB       $77
1A3D  F9            DB       $F9      ;Msg# 38,      TOO
1A3E  BE            DB       $BE
1A3F  FC            DB       $FC      ;              LOW
1A40  87            DB       $87
1A41  56            DB       $56      ;Msg# 39,      OFF
1A42  FC            DB       $FC      ;              CENTER
1A43  1B            DB       $1B
```

```
1A44 82      DB      $82     ;Msg# 40, RELEASE
1A45 FC      DB      $FC     ;         COMPRESSION
1A46 14      DB      $14
1A47 FC      DB      $FC     ;         !
1A48 02      DB      $2
1A49 C4      DB      $C4     ;         TRY_IT
1A4A FC      DB      $FC     ;         AGAIN
1A4B 03      DB      $3
1A4C FC      DB      $FC     ;         !
1A4D 02      DB      $2
1A4E 95      DB      $95     ;Msg# 41, SINGLE
1A4F 0C      DB      $C      ;         CHEST
1A50 FD      DB      $FD     ;         COMPRESSION
1A51 14      DB      $14
1A52 96      DB      $96     ;         TAKE
1A53 A6      DB      $A6     ;         THE3
1A54 FA      DB      $FA     ;         CORRECT
1A55 2F      DB      $2F
1A56 F9      DB      $F9     ;         HAND1
1A57 34      DB      $34
1A58 FC      DB      $FC     ;         POSITION
1A59 A7      DB      $A7
1A5A D8      DB      $D8     ;         YOUR
1A5B 2A      DB      $2A     ;         ELBOWS_LOCKED
1A5C 00      DB      $0      ;         AND_YOUR_SHOULDER
1A5D 89      DB      $89     ;         S
1A5E 22      DB      $22     ;         DIRECTLY_OVER_THE
1A5F FE      DB      $FE     ;         STERNUM
1A60 BF      DB      $BF
1A61 A6      DB      $A6     ;Msg# 42, THE3
1A62 35      DB      $35     ;         CHEST_SHOULD_BE
1A63 1E      DB      $1E     ;         COMPRESSED
1A64 BB      DB      $BB     ;         SMOOTHLY
1A65 5A      DB      $5A     ;         ONE_AND_ONE_HALF
1A66 FA      DB      $FA     ;         TO
1A67 CF      DB      $CF
1A68 FA      DB      $FA     ;         TWO
1A69 C8      DB      $C8
1A6A FC      DB      $FC     ;         INCHES
1A6B 7B      DB      $7B
1A6C FC      DB      $FC     ;         !
1A6D 02      DB      $2
1A6E C2      DB      $C2     ;         TRY_A
1A6F 95      DB      $95     ;         SINGLE
1A70 0C      DB      $C      ;         CHEST
1A71 FC      DB      $FC     ;         COMPRESSION
1A72 14      DB      $14
1A73 F9      DB      $F9     ;Msg# 43, TOO
1A74 BE      DB      $BE
1A75 FC      DB      $FC     ;         SHALLOW
1A76 B7      DB      $B7
1A77 F9      DB      $F9     ;Msg# 44, TOO
1A78 BE      DB      $BE
1A79 FC      DB      $FC     ;         SHALLOW
1A7A B7      DB      $B7
1A7B FC      DB      $FC     ;         !
1A7C 02      DB      $2
1A7D 21      DB      $21     ;         BE_SURE_THAT
1A7E E1      DB      $E1     ;         YOURE
1A7F F8      DB      $F8     ;         PRESS1
1A80 75      DB      $75
1A81 FA      DB      $FA     ;         ING
1A82 40      DB      $40
1A83 92      DB      $92     ;         STRAIGHT
1A84 3F      DB      $3F     ;         DOWN
1A85 D8      DB      $D8     ;         YOUR
1A86 2A      DB      $2A     ;         ELBOWS_LOCKED
1A87 00      DB      $0      ;         AND_YOUR_SHOULDER
1A88 89      DB      $89     ;         S
1A89 22      DB      $22     ;         DIRECTLY_OVER_THE
1A8A FC      DB      $FC     ;         STERNUM
```

```
1A8B BF          DB    $BF
1A8C 23          DB    $23    ;Msg# 45, CLOSE
1A8D 0E          DB    $E     ;         BUT
1A8E F9          DB    $F9    ;         TOO
1A8F BE          DB    $BE
1A90 FC          DB    $FC    ;         SHALLOW
1A91 B7          DB    $B7
1A92 23          DB    $23    ;Msg# 46, CLOSE
1A93 0E          DB    $E     ;         BUT
1A94 FC          DB    $FC    ;         TOO_DEEP
1A95 D3          DB    $D3
1A96 FC          DB    $FC    ;Msg# 47, TOO_DEEP
1A97 D3          DB    $D3
1A98 FB          DB    $FB    ;Msg# 48, GREAT
1A99 30          DB    $30
1A9A F9          DB    $F9    ;         NOW
1A9B 6C          DB    $6C
1A9C 72          DB    $72    ;         PRACTICE
1A9D 0C          DB    $C     ;         CHEST
1A9E 14          DB    $14    ;         COMPRESSION
1A9F FC          DB    $FC    ;         RHYTHM
1AA0 AF          DB    $AF
1AA1 66          DB    $66    ;         OR1
1AA2 C4          DB    $C4    ;         TRY_IT
1AA3 F8          DB    $F8    ;         AGAIN
1AA4 03          DB    $3
                 ; N Table
1AA5 0C     N    DB    $C     ;Msg# 49, CHEST
1AA6 14          DB    $14    ;         COMPRESSION
1AA7 FD          DB    $FD    ;         RHYTHM
1AA8 AF          DB    $AF
1AA9 36          DB    $36    ;         GIVE
1AAA 20          DB    $20    ;         FIF
1AAB AC          DB    $AC    ;         TEEN
1AAC 0C          DB    $C     ;         CHEST
1AAD 14          DB    $14    ;         COMPRESSION
1AAE FA          DB    $FA    ;         S
1AAF 89          DB    $89
1AB0 FC          DB    $FC    ;         SMOOTHLY
1AB1 BB          DB    $BB
1AB2 70          DB    $70    ;         NO_BOUNCE
1AB3 FB          DB    $FB    ;         ING
1AB4 40          DB    $40
1AB5 C9          DB    $C9    ;         USING_A
1AB6 80          DB    $80    ;         ONE1
1AB7 04          DB    $4     ;         ANND
1AB8 F9          DB    $F9    ;         TWO
1AB9 C8          DB    $C8
1ABA F9          DB    $F9    ;         ANND
1ABB 04          DB    $4
1ABC AD          DB    $AD    ;         THREE
1ABD F9          DB    $F9    ;         ANND
1ABE 04          DB    $4
1ABF FB          DB    $FB    ;         FOUR
1AC0 49          DB    $49
1AC1 FA          DB    $FA    ;         TO
1AC2 CF          DB    $CF
1AC3 20          DB    $20    ;         FIF
1AC4 FA          DB    $FA    ;         TEEN
1AC5 AC          DB    $AC
1AC6 FC          DB    $FC    ;         CADENCE
1AC7 17          DB    $17
1AC8 FC          DB    $FC    ;         !
1AC9 02          DB    $2
1ACA 16          DB    $16    ;         COME_ALL_THE_WAY_UP
1ACB 1D          DB    $1D    ;         BETWEEN
1ACC 14          DB    $14    ;         COMPRESSION
1ACD FC          DB    $FC    ;         S
1ACE 89          DB    $89
1ACF 9C          DB    $9C    ;Msg# 50, SET_THE
1AD0 17          DB    $17    ;         CADENCE
1AD1 F9          DB    $F9    ;         SWITCH
```

```
1AD2 A8      DB    $A8
1AD3 FC      DB    $FC    ;           FOR_A_CADENCE
1AD4 5B      DB    $5B
1AD5 F8      DB    $F8    ;Msg# 51,   ONE_WAS
1AD6 5E      DB    $5E
1AD7 F9      DB    $F9    ;Msg# 52,   TWO
1AD8 C8      DB    $C8
1AD9 F8      DB    $F8    ;           WERE
1ADA D6      DB    $D6
1ADB AD      DB    $AD    ;Msg# 53,   THREE
1ADC F8      DB    $F8    ;           WERE
1ADD D6      DB    $D6
1ADE 49      DB    $49    ;Msg# 54,   FOUR
1ADF F8      DB    $F8    ;           WERE
1AE0 D6      DB    $D6
1AE1 45      DB    $45    ;Msg# 55,   FIVE
1AE2 F8      DB    $F8    ;           WERE
1AE3 D6      DB    $D6
1AE4 99      DB    $99    ;Msg# 56,   SIX
1AE5 F8      DB    $F8    ;           WERE
1AE6 D6      DB    $D6
1AE7 8D      DB    $8D    ;Msg# 57,   SEVEN
1AE8 F8      DB    $F8    ;           WERE
1AE9 D6      DB    $D6
1AEA 39      DB    $39    ;Msg# 58,   EIGHT
1AEB F8      DB    $F8    ;           WERE
1AEC D6      DB    $D6
1AED 61      DB    $61    ;Msg# 59,   NINE
1AEE F8      DB    $F8    ;           WERE
1AEF D6      DB    $D6
1AF0 9D      DB    $9D    ;Msg# 60,   TEN
1AF1 F8      DB    $F8    ;           WERE
1AF2 D6      DB    $D6
1AF3 3D      DB    $3D    ;Msg# 61,   ELEVEN
1AF4 F8      DB    $F8    ;           WERE
1AF5 D6      DB    $D6
1AF6 C1      DB    $C1    ;Msg# 62,   TWELVE
1AF7 F8      DB    $F8    ;           WERE
1AF8 D6      DB    $D6
1AF9 B8      DB    $B8    ;Msg# 63,   THIR
1AFA F9      DB    $F9    ;           TEEN
1AFB AC      DB    $AC
1AFC F8      DB    $F8    ;           WERE
1AFD D6      DB    $D6
1AFE 49      DB    $49    ;Msg# 64,   FOUR
1AFF F9      DB    $F9    ;           TEEN
1B00 AC      DB    $AC
1B01 F8      DB    $F8    ;           WERE
1B02 D6      DB    $D6
1B03 20      DB    $20    ;Msg# 65,   FIF
1B04 AC      DB    $AC    ;           TEEN
1B05 F8      DB    $F8    ;           WERE
1B06 D6      DB    $D6
1B07 85      DB    $85    ;Msg# 66,   RHYTHM_IS
1B08 B1      DB    $B1    ;           TOO_FAST
1C9F 16      DB    $16
1CA0 30      DB    $30
1CA1 C1      DB    $C1
1CA2 88      DB    $88    ;CHEST_SHOULD_BE
1CA3 83      DB    $83
1CA4 A0      DB    $A0
1CA5 0E      DB    $E
1CA6 A8      DB    $A8    ;EIGHT
1CA7 7B      DB    $7B
1CA8 34      DB    $34
1CA9 C0      DB    $C0
1CAA 0A      DB    $A     ;ELEVEN
1CAB 01      DB    $1
1CAC 63      DB    $63
1CAD D0      DB    $D0
1CAE 03      DB    $3     ;EXCELLENT
```

```
1CAF D1       DB      $D1
1CB0 60       DB      $60
1CB1 C0       DB      $C0
1CB2 B4       DB      $B4     ;FIVE
1CB3 99       DB      $99
1CB4 53       DB      $53
1CB5 00       DB      $0
1CB6 7B       DB      $7B     ;FOUR
1CB7 6E       DB      $6E
1CB8 43       DB      $43
1CB9 3F       DB      $3F
1CBA 55       DB      $55     ;IF_YOU_HAVE_DIFFICULTY
1CBB D6       DB      $D6
1CBC C1       DB      $C1
1CBD E6       DB      $E6
1CBE E6       DB      $E6     ;KEEP
1CBF 37       DB      $37
1CC0 21       DB      $21
1CC1 C0       DB      $C0
1CC2 1B       DB      $1B     ;LIFT
1CC3 C4       DB      $C4
1CC4 42       DB      $42
1CC5 C0       DB      $C0
1CC6 4B       DB      $4B     ;LOCATED_ON_EITHER
1CC7 C1       DB      $C1
1CC8 D4       DB      $D4
1CC9 78       DB      $78
1CCA C4       DB      $C4     ;MAINTAIN_THE_HEAD
1CCB 9A       DB      $9A
1CCC E3       DB      $E3
1CCD 67       DB      $67
1CCE DC       DB      $DC     ;NINE
1CCF 1C       DB      $1C
1CD0 43       DB      $43
1CD1 80       DB      $80
1CD2 4F       DB      $4F     ;OF_THE
1CD3 CD       DB      $CD
1CD4 23       DB      $23
1CD5 00       DB      $0
1CD6 18       DB      $18     ;ONE2
1CD7 84       DB      $84
1CD8 32       DB      $32
1CD9 40       DB      $40
1CDA 34       DB      $34     ;OR
1CDB 47       DB      $47
1CDC 22       DB      $22
1CDD E0       DB      $E0
1CDE 6F       DB      $6F     ;PLEASE_ASK
1CDF CF       DB      $CF
1CE0 80       DB      $80
1CE1 C6       DB      $C6
1CE2 C4       DB      $C4     ;PRESS1
1CE3 F4       DB      $F4
1CE4 30       DB      $30
1CE5 F5       DB      $F5
1CE6 EC       DB      $EC     ;PRESS2
1CE7 7A       DB      $7A
1CE8 34       DB      $34
1CE9 BF       DB      $BF
1CEA 73       DB      $73     ;PUSH
1CEB E3       DB      $E3
1CEC 42       DB      $42
1CED 41       DB      $41
1CEE 40       DB      $40     ;REMOVE_AND
1CEF 6A       DB      $6A
1CF0 70       DB      $70
1CF1 4D       DB      $4D
1CF2 61       DB      $61     ;RHYTHM_IS
1CF3 39       DB      $39
1CF4 74       DB      $74
1CF5 60       DB      $60
1CF6 CD       DB      $CD     ;S
```

```
1CF7 E1       DB    $E1
1CF8 10       DB    $10
1CF9 FF       DB    $FF
1CFA BC       DB    $BC      ;SEVEN
1CFB D9       DB    $D9
1CFC 53       DB    $53
1CFD 01       DB    $1
1CFE 59       DB    $59      ;SIDE_OF
1CFF 39       DB    $39
1D00 44       DB    $44
1D01 00       DB    $0
1D02 24       DB    $24      ;SINGLE
1D03 81       DB    $81
1D04 44       DB    $44
1D05 50       DB    $50
1D06 B9       DB    $B9      ;SIX
1D07 99       DB    $99
1D08 33       DB    $33
1D09 40       DB    $40
1D0A 05       DB    $5       ;TEN
1D0B C1       DB    $C1
1D0C 43       DB    $43
1D0D 40       DB    $40
1D0E 4F       DB    $4F      ;THEN
1D0F BA       DB    $BA
1D10 30       DB    $30
1D11 40       DB    $40
1D12 14       DB    $14      ;THE_INTENT
1D13 19       DB    $19
1D14 85       DB    $85
1D15 98       DB    $98
1D16 3A       DB    $3A      ;THE_MANIKINS
1D17 CC       DB    $CC
1D18 83       DB    $83
1D19 80       DB    $80
1D1A B1       DB    $B1      ;THREE
1D1B D9       DB    $D9
1D1C 23       DB    $23
1D1D C0       DB    $C0
1D1E 82       DB    $82      ;TOO_FAST
1D1F B0       DB    $B0
1D20 84       DB    $84
1D21 4F       DB    $4F
1D22 8A       DB    $8A      ;TOO_SLOW
1D23 FF       DB    $FF
1D24 74       DB    $74
1D25 B0       DB    $B0
1D26 78       DB    $78      ;TRY_GIVING
1D27 61       DB    $61
1D28 74       DB    $74
1D29 9F       DB    $9F
1D2A F7       DB    $F7      ;TRY_TO
1D2B 04       DB    $4
1D2C 53       DB    $53
1D2D 68       DB    $68
1D2E 10       DB    $10      ;TWELVE
1D2F D1       DB    $D1
1D30 53       DB    $53
1D31 8E       DB    $8E
1D32 64       DB    $64      ;UNTIL_YOU_REACH
1D33 0E       DB    $E
1D34 A3       DB    $A3
1D35 8F       DB    $8F
1D36 8C       DB    $8C      ;USING_A
1D37 81       DB    $81
1D38 62       DB    $62
1D39 59       DB    $59
1D3A CF       DB    $CF      ;VENTILATING
1D3B E0       DB    $E0
1D3C 60       DB    $60
1D3D F6       DB    $F6
1D3E 00       DB    $0       ;WITH
```

```
1D3F 00           DB    $0
1D40 21           DB    $21
1D41 E7           DB    $E7
1D42 E0           DB    $E0     ;WITH1
1D43 9C           DB    $9C
1D44 23           DB    $23
1D45 E8           DB    $E8
1D46 FC           DB    $FC     ;WITH3
1D47 38           DB    $38
1D48 24           DB    $24
1D49 FF           DB    $FF
1D4A 48           DB    $48     ;WITH_THE
1D4B 4C           DB    $4C
1D4C 33           DB    $33
1D4D 00           DB    $0
1D4E 7B           DB    $7B     ;YOURE
1D4F DD           DB    $DD
1D50 31           DB    $31
1D51 C0           DB    $C0
1D52 80           DB    $80     ;YOUR_OTHER
1D53 00           DB    $0
1D54 73           DB    $73
1D55 01           DB    $1
                  ;U word table
1D56 30        U  DB    $30     ;!
1D57 E8           DB    $E8
1D58 03           DB    $3
1D59 04           DB    $4
1D5A 0A           DB    $A      ;AND_DELIVERED_WITH
1D5B 01           DB    $1
1D5C A5           DB    $A5
1D5D 18           DB    $18
1D5E 71           DB    $71     ;BLOW2
1D5F 39           DB    $39
1D60 44           DB    $44
1D61 08           DB    $8
1D62 2D           DB    $2D     ;BUT
1D63 3B           DB    $3B
1D64 21           DB    $21
1D65 47           DB    $47
1D66 1C           DB    $1C     ;CLEARING_THE_AIRWAY
1D67 B1           DB    $B1
1D68 D5           DB    $D5
1D69 C0           DB    $C0
1D6A E8           DB    $E8     ;COME_ALL_THE_WAY_UP
1D6B F7           DB    $F7
1D6C E1           DB    $E1
1D6D 00           DB    $0
1D6E 48           DB    $48     ;COMPLETE
1D6F A4           DB    $A4
1D70 51           DB    $51
1D71 A1           DB    $A1
1D72 78           DB    $78     ;COMPRESSED
1D73 95           DB    $95
1D74 70           DB    $70
1D75 00           DB    $0
1D76 0A           DB    $A      ;DIRECTLY_OVER_THE
1D77 85           DB    $85
1D78 B4           DB    $B4
1D79 58           DB    $58
1D7A 4E           DB    $4E     ;EACH
1D7B 95           DB    $95
1D7C 45           DB    $45
1D7D 17           DB    $17
1D7E 62           DB    $62     ;ELBOWS_LOCKED
1D7F 24           DB    $24
1D80 D2           DB    $D2
1D81 00           DB    $0
1D82 0C           DB    $C      ;FOREHEAD
1D83 C1           DB    $C1
1D84 52           DB    $52
1D85 C1           DB    $C1
```

```
1D86 AC         DB      $AC     ;GENTLY
1D87 06         DB      $6
1D88 62         DB      $62
1D89 C4         DB      $C4
1D8A 80         DB      $80     ;GIVE
1D8B 00         DB      $0
1D8C 42         DB      $42
1D8D 01         DB      $1
1D8E 80         DB      $80     ;INSTRUCTOR
1D8F 00         DB      $0
1D90 80         DB      $80
1D91 83         DB      $83
1D92 F0         DB      $F0     ;INTO_THE_ABDOMEN
1D93 39         DB      $39
1D94 B4         DB      $B4
1D95 FF         DB      $FF
1D96 AC         DB      $AC     ;KNEEL_ASTRIDE
1D97 3B         DB      $3B
1D98 D4         DB      $D4
1D99 80         DB      $80
1D9A 28         DB      $28     ;MOUTH
1D9B 96         DB      $96
1D9C 41         DB      $41
1D9D A5         DB      $A5
1D9E 30         DB      $30     ;NEAR_THE
1D9F 06         DB      $6
1DA0 42         DB      $42
1DA1 41         DB      $41
1DA2 B3         DB      $B3     ;NOT
1DA3 D7         DB      $D7
1DA4 30         DB      $30
1DA5 40         DB      $40
1DA6 5D         DB      $5D     ;OF1
1DA7 01         DB      $1
1DA8 15         DB      $15
1DA9 80         DB      $80
1DAA 9F         DB      $9F     ;OFF
1DAB E6         DB      $E6
1DAC 44         DB      $44
1DAD 7F         DB      $7F
1DAE 99         DB      $99     ;ONE_AND_ONE_HALF
1DAF 0B         DB      $B
1DB0 C0         DB      $C0
1DB1 98         DB      $98
1DB2 F5         DB      $F5     ;ONE_WAS
1DB3 6F         DB      $6F
1DB4 A2         DB      $A2
1DB5 80         DB      $80
1DB6 17         DB      $17     ;OPEN_YOUR_MOUTH
1DB7 D6         DB      $D6
1DB8 91         DB      $91
1DB9 41         DB      $41
1DBA 80         DB      $80     ;OR1
1DBB 00         DB      $0
1DBC 24         DB      $24
1DBD B0         DB      $B0
1DBE 31         DB      $31     ;PINCH_OFF
1DBF 21         DB      $21
1DC0 64         DB      $64
1DC1 C0         DB      $C0
1DC2 66         DB      $66     ;PLACE
1DC3 19         DB      $19
1DC4 31         DB      $31
1DC5 C0         DB      $C0
1DC6 2A         DB      $2A     ;PRACTICE
1DC7 5E         DB      $5E
1DC8 50         DB      $50
1DC9 C2         DB      $C2
1DCA 40         DB      $40     ;QUICK
1DCB 00         DB      $0
1DCC 35         DB      $35
```

```
1DCD 80          DB      $80
1DCE B7          DB      $B7     ;QUITE
1DCF 17          DB      $17
1DD0 30          DB      $30
1DD1 C0          DB      $C0
1DD2 85          DB      $85     ;RE
1DD3 31          DB      $31
1DD4 21          DB      $21
1DD5 FF          DB      $FF
1DD6 BE          DB      $BE     ;RELEASE
1DD7 F7          DB      $F7
1DD8 50          DB      $50
1DD9 FD          DB      $FD
1DDA C4          DB      $C4     ;THE_RIBCAGE
1DDB 00          DB      $0
1DDC A1          DB      $A1
1DDD 77          DB      $77
1DDE C6          DB      $C6     ;SLIGHTLY_ABOVE
1DDF BA          DB      $BA
1DE0 B4          DB      $B4
1DE1 01          DB      $1
1DE2 8C          DB      $8C     ;SLOW
1DE3 C0          DB      $C0
1DE4 54          DB      $54
1DE5 EF          DB      $EF
1DE6 77          DB      $77     ;STRAIGHT
1DE7 DC          DB      $DC
1DE8 41          DB      $41
1DE9 01          DB      $1
1DEA 5A          DB      $5A     ;TAKE
1DEB 9A          DB      $9A
1DEC 32          DB      $32
1DED 0A          DB      $A
1DEE FC          DB      $FC     ;TAKE_A
1DEF 3B          DB      $3B
1DF0 30          DB      $30
1DF1 C5          DB      $C5
1DF2 80          DB      $80     ;TAKING_A
1DF3 00          DB      $0
1DF4 51          DB      $51
1DF5 31          DB      $31
1DF6 2E          DB      $2E     ;TEN_TIMES
1DF7 51          DB      $51
1DF8 D5          DB      $D5
1DF9 00          DB      $0
1DFA 00          DB      $0      ;THE3
1DFB 00          DB      $0
1DFC 10          DB      $10
1DFD 49          DB      $49
1DFE E5          DB      $E5     ;THE_NAVEL
1DFF 7B          DB      $7B
1E00 64          DB      $64
1E01 FF          DB      $FF
1E02 B9          DB      $B9     ;THIGHS
1E03 BB          DB      $BB
1E04 84          DB      $84
1E05 C0          DB      $C0
1E06 F4          DB      $F4     ;TIGHT_SEAL
1E07 3C          DB      $3C
1E08 70          DB      $70
1E09 FF          DB      $FF
1E0A D3          DB      $D3     ;TILT2
1E0B 80          DB      $80
1E0C 23          DB      $23
1E0D 9C          DB      $9C
1E0E A5          DB      $A5     ;TO1
1E0F A3          DB      $A3
1E10 00          DB      $0
1E11 93          DB      $93
1E12 52          DB      $52     ;TOO
1E13 FA          DB      $FA
```

```
1E14 20              DB    $20
1E15 50              DB    $50
1E16 20              DB    $20    ;TRY_A
1E17 01              DB    $1
1E18 44              DB    $44
1E19 80              DB    $80
1E1A 43              DB    $43    ;UPWARD
1E1B 80              DB    $80
1E1C 55              DB    $55
1E1D 57              DB    $57
1E1E A9              DB    $A9    ;WAIST
1E1F 70              DB    $70
1E20 71              DB    $71
1E21 80              DB    $80
1E22 04              DB    $4     ;WAY_BACK
1E23 C1              DB    $C1
1E24 82              DB    $82
1E25 00              DB    $0
1E26 20              DB    $20    ;WEL
1E27 1C              DB    $1C
1E28 33              DB    $33
1E29 18              DB    $18
1E2A 00              DB    $0     ;WERE
1E2B 00              DB    $0
1E2C 53              DB    $53
1E2D C1              DB    $C1
1E2E 3B              DB    $3B    ;WHEN_YOU
1E2F 51              DB    $51
1E30 45              DB    $45
1E31 30              DB    $30
              ;V word table
1E32 6A       V      DB    $6A    ;AGAIN
1E33 49              DB    $49
1E34 50              DB    $50
1E35 86              DB    $86
1E36 E3              DB    $E3    ;BASE_OF_THE_HEAD
1E37 84              DB    $84
1E38 B3              DB    $B3
1E39 C0              DB    $C0
1E3A 69              DB    $69    ;BATTERY
1E3B D9              DB    $D9
1E3C 51              DB    $51
1E3D C0              DB    $C0
1E3E 02              DB    $2     ;BLOW1
1E3F E7              DB    $E7
1E40 41              DB    $41
1E41 C0              DB    $C0
1E42 A8              DB    $A8    ;BY
1E43 4A              DB    $4A
1E44 32              DB    $32
1E45 BC              DB    $BC
1E46 98              DB    $98    ;CADENCE
1E47 81              DB    $81
1E48 63              DB    $63
1E49 18              DB    $18
1E4A A4              DB    $A4    ;CENTER
1E4B 65              DB    $65
1E4C 44              DB    $44
1E4D 17              DB    $17
1E4E 4A              DB    $4A    ;CHIN
1E4F 28              DB    $28
1E50 62              DB    $62
1E51 32              DB    $32
1E52 5F              DB    $5F    ;CLOSE
1E53 89              DB    $89
1E54 60              DB    $60
1E55 61              DB    $61
1E56 23              DB    $23    ;COME_TO_COACH_ANDY
1E57 34              DB    $34
1E58 D3              DB    $D3
1E59 B8              DB    $B8
```

```
1E5A  18        DB      $18     ;CONFIDENT
1E5B  A0        DB      $A0
1E5C  80        DB      $80
1E5D  00        DB      $0
1E5E  5D        DB      $5D     ;CORRECT
1E5F  A4        DB      $A4
1E60  42        DB      $42
1E61  80        DB      $80
1E62  21        DB      $21     ;DEEP
1E63  17        DB      $17
1E64  11        DB      $11
1E65  C0        DB      $C0
1E66  00        DB      $0      ;DISTINCT
1E67  00        DB      $0
1E68  A5        DB      $A5
1E69  01        DB      $1
1E6A  3E        DB      $3E     ;DONT
1E6B  20        DB      $20
1E6C  20        DB      $20
1E6D  4A        DB      $4A
1E6E  15        DB      $15     ;DOWN
1E6F  DD        DB      $DD
1E70  74        DB      $74
1E71  40        DB      $40
1E72  2A        DB      $2A     ;DO_IT
1E73  71        DB      $71
1E74  35        DB      $35
1E75  E0        DB      $E0
1E76  20        DB      $20     ;EITHER
1E77  84        DB      $84
1E78  42        DB      $42
1E79  BF        DB      $BF
1E7A  88        DB      $88     ;FILLING_OF_YOUR_LUNG
1E7B  30        DB      $30
1E7C  C1        DB      $C1
1E7D  68        DB      $68
1E7E  C3        DB      $C3     ;FINE
1E7F  4E        DB      $4E
1E80  62        DB      $62
1E81  40        DB      $40
1E82  37        DB      $37     ;FINGERTIPS
1E83  27        DB      $27
1E84  92        DB      $92
1E85  C0        DB      $C0
1E86  41        DB      $41     ;FORCEFULLY
1E87  43        DB      $43
1E88  71        DB      $71
1E89  61        DB      $61
1E8A  A3        DB      $A3     ;FOR_A_CADENCE
1E8B  1B        DB      $1B
1E8C  B3        DB      $B3
1E8D  3E        DB      $3E
1E8E  18        DB      $18     ;FOR_HELP
1E8F  CD        DB      $CD
1E90  73        DB      $73
1E91  4F        DB      $4F
1E92  30        DB      $30     ;FOR_THE_BORDER_OF
1E93  EC        DB      $EC
1E94  93        DB      $93
1E95  E0        DB      $E0
1E96  BD        DB      $BD     ;GOOD
1E97  CE        DB      $CE
1E98  52        DB      $52
1E99  80        DB      $80
1E9A  D6        DB      $D6     ;HAND
1E9B  1C        DB      $1C
1E9C  63        DB      $63
1E9D  00        DB      $0
1E9E  50        DB      $50     ;HARDER
1E9F  5A        DB      $5A
1EA0  42        DB      $42
```

```
1EA1 C0        DB    $C0
1EA2 00        DB    $0      ;HEAD
1EA3 00        DB    $0
1EA4 42        DB    $42
1EA5 C1        DB    $C1
1EA6 55        DB    $55     ;HIGH
1EA7 4A        DB    $4A
1EA8 50        DB    $50
1EA9 7F        DB    $7F
1EAA A6        DB    $A6     ;INCHES
1EAB 36        DB    $36
1EAC 50        DB    $50
1EAD 81        DB    $81
1EAE 68        DB    $68     ;IRREGULAR
1EAF 99        DB    $99
1EB0 84        DB    $84
1EB1 A0        DB    $A0
1EB2 1D        DB    $1D     ;IT
1EB3 1E        DB    $1E
1EB4 24        DB    $24
1EB5 E2        DB    $E2
1EB6 5A        DB    $5A     ;LOW
1EB7 C9        DB    $C9
1EB8 40        DB    $40
1EB9 C0        DB    $C0
1EBA D8        DB    $D8     ;MANIKIN
1EBB 16        DB    $16
1EBC 70        DB    $70
1EBD 47        DB    $47
1EBE D1        DB    $D1     ;MORE_AIR
1EBF 4E        DB    $4E
1EC0 B2        DB    $B2
1EC1 C0        DB    $C0
1EC2 2B        DB    $2B     ;NECK
1EC3 85        DB    $85
1EC4 42        DB    $42
1EC5 81        DB    $81
1EC6 75        DB    $75     ;NOTCH
1EC7 40        DB    $40
1EC8 63        DB    $63
1EC9 2C        DB    $2C
1ECA EF        DB    $EF     ;OF_THE_JAW
1ECB 44        DB    $44
1ECC 73        DB    $73
1ECD C0        DB    $C0
1ECE DA        DB    $DA     ;ON_TOP_OF_IT
1ECF B7        DB    $B7
1ED0 B1        DB    $B1
1ED1 80        DB    $80
1ED2 C9        DB    $C9     ;PERFECT
1ED3 8E        DB    $8E
1ED4 72        DB    $72
1ED5 C0        DB    $C0
1ED6 0A        DB    $A      ;POSITION
1ED7 91        DB    $91
1ED8 60        DB    $60
1ED9 BF        DB    $BF
1EDA 35        DB    $35     ;PULSE
1EDB C2        DB    $C2
1EDC 41        DB    $41
1EDD 00        DB    $0
1EDE C8        DB    $C8     ;RHYTHM
1EDF E9        DB    $E9
1EE0 40        DB    $40
1EE1 F8        DB    $F8
1EE2 BA        DB    $BA     ;RIGHT
1EE3 D7        DB    $D7
1EE4 40        DB    $40
1EE5 20        DB    $20
1EE6 9D        DB    $9D     ;SHALLOW
1EE7 AF        DB    $AF
1EE8 61        DB    $61
```

```
1EE9 FF              DB      $FF
1EEA 92              DB      $92     ;SMOOTHLY
1EEB 91              DB      $91
1EEC 60              DB      $60
1EED 7A              DB      $7A
1EEE 6F              DB      $6F     ;STERNUM
1EEF 24              DB      $24
1EF0 42              DB      $42
1EF1 C0              DB      $C0
1EF2 92              DB      $92     ;TELL_YOU_HOW_YOU_DID
1EF3 AE              DB      $AE
1EF4 D4              DB      $D4
1EF5 38              DB      $38
1EF6 40              DB      $40     ;THE_ADAMS_APPLE
1EF7 01              DB      $1
1EF8 B4              DB      $B4
1EF9 C0              DB      $C0
1EFA 52              DB      $52     ;THRUST2
1EFB AC              DB      $AC
1EFC 45              DB      $45
1EFD 9F              DB      $9F
1EFE 64              DB      $64     ;TO
1EFF BB              DB      $BB
1F00 11              DB      $11
1F01 5E              DB      $5E
1F02 D1              DB      $D1     ;TOO_DEEP
1F03 BB              DB      $BB
1F04 94              DB      $94
1F05 00              DB      $0
1F06 55              DB      $55     ;TWICE
1F07 1A              DB      $1A
1F08 52              DB      $52
1F09 80              DB      $80
1F0A 28              DB      $28     ;VENTILATION
1F0B D1              DB      $D1
1F0C 84              DB      $84
1F0D 50              DB      $50
1F0E E4              DB      $E4     ;WIDE
1F0F 1B              DB      $1B
1F10 60              DB      $60
1F11 38              DB      $38
                ;** END OF TABLES **
                ;
                ;** VECTORS **
1FF4                 ORG     $1FF4   ;$1FF4 FOR 6305XXXXXXXXXXXX
1FF4 1000            DW      INIT
1FF6 1000            DW      INIT
1FF8 1000            DW      INIT
1FFA 103F            DW      INT     ;INSERT DW INIT LATERXXXXXX
1FFC 1000            DW      INIT
1FFE 1000            DW      INIT
0000                 END
```

---- SYMBOL TABLE ----

| | | | | | |
|---|---|---|---|---|---|
| ABLE | 006B | CONV | 16D1 | LTABLE | 116B |
| AD1 | 16C1 | CP | 1390 | M | 19B3 |
| ADDIT | 1613 | CUM | 129C | MAXC | 006F |
| ADDR | 0004 | CYCLE | 0089 | MAXVAL | 0066 |
| ADV2 | 16DB | DDDR | 0007 | MEAN | 1595 |
| ADVAL | 008B | DIV | 161E | MESAGE | 1122 |
| AGINHP | 13DC | DIV01 | 1631 | MESSA | 112B |
| ALLBIT | 0042 | DNDLSB | 009A | MESSC | 1151 |
| ALLOVR | 125D | DNDMSB | 0099 | MINCNT | 1254 |
| ANSLSB | 0092 | DOG | 006E | MINCTR | 008C |
| ANSMSB | 0091 | EPRES | 005B | MINTOT | 0074 |
| AVGDEV | 15A8 | FIN | 161D | MINUS | 126A |
| BAD | 141B | FINE | 17B3 | MODATA | 1187 |
| BADC | 0069 | FIRST | 0064 | MORBYT | 1296 |
| BADC1 | 0068 | FORMIN | 0061 | MOVIT | 12F8 |
| BAKER | 006C | FOUR | 10DE | MR | 000A |

| | | | | | |
|---|---|---|---|---|---|
| BDDR | 0005 | FOURC | 005E | MTABLE | 1166 |
| BIGGER | 172C | FXWRD | 005A | N | 1AA5 |
| BLH | 0054 | GOBAK | 1121 | NEWNUM | 0096 |
| BUH | 0053 | GOOD | 13FE | NEXWRD | 1159 |
| BYBY | 14B1 | GOODC | 006A | NOGD | 17BA |
| C31 | 17E0 | GOTIT | 1734 | NOT160 | 127E |
| C32 | 17FD | HEAH | 116E | NOTCCR | 10B9 |
| C33 | 17D8 | HI | 16B3 | NOTCP | 10D1 |
| C34 | 17F0 | HOP | 1288 | NOTHP | 10C9 |
| C35 | 17DF | HP | 13C3 | NOTHT | 10B1 |
| C36 | 1804 | HP2 | 169D | NOTM | 1140 |
| C37 | 180B | HP3 | 16A0 | NOTSCC | 10C1 |
| CANSTR | 008E | HP4 | 16A6 | NOTSSS | 11D5 |
| CBIN1 | 0070 | HPCHEK | 169A | NOTTEE | 11E0 |
| CBIN2 | 0071 | HPSTOR | 0063 | NOZERO | 1630 |
| CBIN3 | 0072 | HT | 1668 | NUBGIN | 109C |
| CCR | 150A | I | 1812 | NUMBER | 17BD |
| CCR1 | 1535 | IN | 124A | NUMWRD | 0056 |
| CCR11 | 160F | INIT | 1000 | NXBIN1 | 1793 |
| CCR13 | 154A | INT | 103F | NXBIN2 | 17A3 |
| CCR14 | 154D | JUSTAD | 1705 | OFFC | 16BA |
| CCR2 | 1550 | L | 18B6 | ON | 1103 |
| CCR3 | 160A | LAMP | 0060 | ON1 | 1438 |
| CCR4 | 1563 | LAMPON | 1101 | ONMESS | 1245 |
| CCR5 | 15FC | LAMPS | 1744 | ONWAIT | 111D |
| CCR7 | 15F9 | LASTMS | 0043 | OU | 1264 |
| CCR8 | 15FE | LD2LSB | 1190 | OUT | 126E |
| CCRA | 151A | LDSREG | 1197 | OUTD | 1639 |
| CCRB | 1605 | LETGO | 14DE | OVER | 1657 |
| CDDR | 0006 | LICAND | 008F | PERCTR | 0073 |
| CHUCK | 006D | LONG | 11BF | PERIOD | 007A |
| CLEAR | 1038 | LOOP | 163E | PLAOLD | 113C |
| CLOSER | 14F5 | LOOP3 | 1633 | PLIER | 0090 |
| CLRAMO | 1036 | LOOP4 | 15AF | PORTA | 0000 |
| COMEUP | 1568 | LTAB | 114B | PORTB | 0001 |
| PORTC | 0002 | SENSIT | 008A | TOOLOW | 16AC |
| PORTD | 0003 | SIGMA | 0079 | TOTLSB | 0094 |
| POSTIV | 15B6 | SILA | 11AE | TOTMSB | 0095 |
| PWROFF | 10FD | SILB | 11BC | U | 1D56 |
| QUOTNT | 009C | SILBYT | 11A2 | UP | 146E |
| RAMBIT | 0040 | SILC | 11CD | UP1 | 148C |
| READO | 16DD | SILD | 11D1 | UP2 | 1497 |
| READY | 11EE | SILE | 11C9 | UP3 | 14EC |
| REGLAR | 119E | SILO | 11B3 | UP4 | 14E5 |
| REST | 1587 | SILREG | 0059 | UP5 | 14AA |
| RUN1 | 1053 | SLH | 0052 | UP6 | 1483 |
| RUN3 | 106B | SMPNEW | 0067 | UP7 | 14D0 |
| RUN4 | 10D4 | SMPOL1 | 0076 | V | 1E32 |
| RUN4A | 1074 | SMPOL2 | 0077 | V1 | 1304 |
| RUN6 | 107D | SMPOLD | 0075 | V10 | 1362 |
| RUN7 | 10DC | SOMEMO | 10E3 | V11 | 136F |
| RUNBIT | 0041 | SORLSB | 0098 | V12 | 1388 |
| RUNC1 | 1459 | SORMSB | 0097 | V2 | 12DD |
| RUNC2 | 16CA | SPK | 1177 | V3 | 12E4 |
| RUNC3 | 1709 | SSAW | 0058 | V4 | 12EE |
| RUNC5 | 1738 | ST | 1032 | V5 | 131A |
| S | 1B92 | SUH | 0051 | V6 | 130F |
| SAM | 0055 | SVAGIN | 12BE | V7 | 132F |
| SAMPLE | 008D | SWOLD | 0062 | V8 | 1336 |
| SCC | 143D | T | 1C6E | V9 | 1340 |
| SCICR | 0010 | TALKCP | 139C | VENT | 12A0 |
| SCIDR | 0012 | TALKHP | 13CF | VWRD | 11EB |
| SCISR | 0011 | TALKHT | 1672 | WAIT | 110A |
| SCOR1 | 1760 | TALKV | 12B1 | WAITC | 005D |
| SCOR2 | 1775 | TCR | 0009 | WAITMO | 1110 |
| SCOR4 | 1755 | TDR | 0008 | WDAR | 0050 |
| SCOR5 | 1753 | TELLIT | 173C | WRDOFF | 0057 |
| SCOR6 | 1767 | TEMP1 | 0093 | WRDTAB | 005C |
| SCOR7 | 1770 | TEMP2 | 009B | XBAR | 0078 |
| SCOR8 | 1779 | TENMO | 10F9 | ZOT | 1653 |
| SCORC1 | 174B | TH1 | 0065 | ZZSPK | 1209 |
| SCORC2 | 177C | TIMEUP | 157B | ZZSPK1 | 120E |
| SCORC3 | 17C5 | TINUE | 1291 | ZZWAIT | 111A |

The invention claimed is:

1. A chest compression training device comprising:
means for simulating a compressible chest of a patient and including a correct hand position area for chest compression;
means for detecting the existence and direction of an error in hand position committed by a student employing said training device;
and a read-out comprising correct hand position indicium means for indicating the location of said correct hand position area, a plurality of hand position error indicator means arranged in a ring surrounding said correct hand position indicium means, and means responsive to the detection of a hand position error by said detecting means to activate whichever of said hand position error indicator means represent the direction of said detected hand position error in relation to said correct hand position indicium means.

* * * * *